(12) United States Patent
Grotmol et al.

(10) Patent No.: US 9,604,359 B1
(45) Date of Patent: Mar. 28, 2017

(54) APPARATUS AND METHODS FOR TRAINING PATH NAVIGATION BY ROBOTS

(71) Applicant: BRAIN CORPORATION, San Diego, CA (US)

(72) Inventors: Oyvind Grotmol, San Diego, CA (US); Oleg Sinyavskiy, San Diego, CA (US)

(73) Assignee: Brain Corporation, San Diego, CA (US)

( * ) Notice: Subject to any disclaimer, the term of this patent is extended or adjusted under 35 U.S.C. 154(b) by 0 days.

(21) Appl. No.: 14/607,018

(22) Filed: Jan. 27, 2015

Related U.S. Application Data

(60) Provisional application No. 62/059,039, filed on Oct. 2, 2014.

(51) Int. Cl.
  *G05B 19/18* (2006.01)
  *B25J 9/16* (2006.01)
(52) U.S. Cl.
  CPC .............. *B25J 9/163* (2013.01); *Y10S 901/01* (2013.01); *Y10S 901/47* (2013.01)
(58) Field of Classification Search
  USPC ....... 700/245, 246, 247, 249, 250, 253, 254, 700/258, 259, 255
  See application file for complete search history.

(56) References Cited

U.S. PATENT DOCUMENTS

| | | |
|---|---|---|
| 3,920,972 A | 11/1975 | Corwin, Jr. et al. |
| 4,468,617 A | 8/1984 | Ringwall |
| 4,617,502 A | 10/1986 | Sakaue et al. |
| 4,638,445 A | 1/1987 | Mattaboni |
| 4,706,204 A | 11/1987 | Hattori |
| 4,763,276 A | 8/1988 | Perreirra et al. |
| 4,852,018 A | 7/1989 | Grossberg |

(Continued)

FOREIGN PATENT DOCUMENTS

| | | |
|---|---|---|
| CN | 102226740 A | 10/2011 |
| EP | 2384863 A2 | 11/2011 |

(Continued)

OTHER PUBLICATIONS

Abbott et al. (2000), "Synaptic plasticity: taming the beast", Nature Neuroscience, 3, 1178-1183.

(Continued)

*Primary Examiner* — Ronnie Mancho
(74) *Attorney, Agent, or Firm* — Gazdzinski & Associates, PC

(57) ABSTRACT

An apparatus and methods for training and/or operating a robotic device to follow a trajectory. A robotic vehicle may utilize a camera and stores the sequence of images of a visual scene seen when following a trajectory during training in an ordered buffer. Motor commands associated with a given image may be stored. During autonomous operation, an acquired image may be compared with one or more images from the training buffer in order to determine the most likely match. An evaluation may be performed in order to determine if the image may correspond to a shifted (e.g., left/right) version of a stored image as previously observed. If the new image is shifted left, right turn command may be issued. If the new image is shifted right then left turn command may be issued.

20 Claims, 22 Drawing Sheets

(56) References Cited

U.S. PATENT DOCUMENTS

| | | |
|---|---|---|
| 5,063,603 A | 11/1991 | Burt |
| 5,092,343 A | 3/1992 | Spitzer |
| 5,121,497 A | 6/1992 | Kerr et al. |
| 5,245,672 A | 9/1993 | Wilson |
| 5,303,384 A | 4/1994 | Rodriguez et al. |
| 5,355,435 A | 10/1994 | DeYong |
| 5,388,186 A | 2/1995 | Bose |
| 5,408,588 A | 4/1995 | Ulug |
| 5,467,428 A | 11/1995 | Ulug |
| 5,579,440 A | 11/1996 | Brown |
| 5,602,761 A | 2/1997 | Spoerre et al. |
| 5,612,883 A * | 3/1997 | Shaffer .............. B60K 31/0008 340/435 |
| 5,638,359 A | 6/1997 | Peltola |
| 5,673,367 A | 9/1997 | Buckley |
| 5,687,294 A | 11/1997 | Jeong |
| 5,719,480 A | 2/1998 | Bock |
| 5,739,811 A | 4/1998 | Rosenberg et al. |
| 5,841,959 A | 11/1998 | Guiremand |
| 5,875,108 A | 2/1999 | Hoffberg |
| 5,994,864 A | 11/1999 | Inoue et al. |
| 6,009,418 A | 12/1999 | Cooper |
| 6,014,653 A | 1/2000 | Thaler |
| 6,169,981 B1 | 1/2001 | Werbos |
| 6,218,802 B1 | 4/2001 | Onoue et al. |
| 6,259,988 B1 | 7/2001 | Galkowski et al. |
| 6,272,479 B1 | 8/2001 | Farry et al. |
| 6,363,369 B1 | 3/2002 | Liaw |
| 6,366,293 B1 | 4/2002 | Hamilton |
| 6,442,451 B1 | 8/2002 | Lapham |
| 6,458,157 B1 | 10/2002 | Suaning |
| 6,489,741 B1 | 12/2002 | Genov |
| 6,493,686 B1 | 12/2002 | Francone et al. |
| 6,545,705 B1 | 4/2003 | Sigel |
| 6,545,708 B1 | 4/2003 | Tamayama |
| 6,546,291 B2 | 4/2003 | Merfeld |
| 6,581,046 B1 | 6/2003 | Ahissar |
| 6,601,049 B1 | 7/2003 | Cooper |
| 6,636,781 B1 | 10/2003 | Shen |
| 6,643,627 B2 | 11/2003 | Liaw |
| 6,697,711 B2 | 2/2004 | Yokono |
| 6,703,550 B2 | 3/2004 | Chu |
| 6,760,645 B2 | 7/2004 | Kaplan et al. |
| 6,961,060 B1 | 11/2005 | Mochizuki et al. |
| 7,002,585 B1 | 2/2006 | Watanabe |
| 7,024,276 B2 | 4/2006 | Ito |
| 7,243,334 B1 | 7/2007 | Berger et al. |
| 7,324,870 B2 | 1/2008 | Lee |
| 7,342,589 B2 | 3/2008 | Miserocchi |
| 7,395,251 B2 | 7/2008 | Linsker |
| 7,398,259 B2 | 7/2008 | Nugent |
| 7,426,501 B2 | 9/2008 | Nugent |
| 7,668,605 B2 | 2/2010 | Braun |
| 7,672,920 B2 | 3/2010 | Ito |
| 7,752,544 B2 | 7/2010 | Cheng |
| 7,849,030 B2 | 12/2010 | Ellingsworth |
| 8,015,130 B2 | 9/2011 | Matsugu |
| 8,145,355 B2 | 3/2012 | Danko |
| 8,214,062 B2 | 7/2012 | Eguchi et al. |
| 8,271,134 B2 | 9/2012 | Kato et al. |
| 8,315,305 B2 | 11/2012 | Petre |
| 8,364,314 B2 | 1/2013 | Abdallah et al. |
| 8,380,652 B1 | 2/2013 | Francis, Jr. |
| 8,419,804 B2 | 4/2013 | Herr et al. |
| 8,452,448 B2 | 5/2013 | Pack et al. |
| 8,467,623 B2 | 6/2013 | Izhikevich |
| 8,509,951 B2 | 8/2013 | Gienger |
| 8,571,706 B2 | 10/2013 | Zhang et al. |
| 8,639,644 B1 | 1/2014 | Hickman et al. |
| 8,655,815 B2 | 2/2014 | Palmer et al. |
| 8,751,042 B2 | 6/2014 | Lee |
| 8,793,205 B1 | 7/2014 | Fisher |
| 8,924,021 B2 | 12/2014 | Dariush et al. |
| 8,958,912 B2 | 2/2015 | Blumberg et al. |
| 8,972,315 B2 | 3/2015 | Szatmary et al. |
| 8,990,133 B1 | 3/2015 | Ponulak et al. |
| 9,008,840 B1 | 4/2015 | Ponulak et al. |
| 9,015,092 B2 | 4/2015 | Sinyavskiy et al. |
| 9,015,093 B1 | 4/2015 | Commons |
| 9,047,568 B1 | 6/2015 | Fisher et al. |
| 9,056,396 B1 | 6/2015 | Linnell |
| 9,070,039 B2 | 6/2015 | Richert |
| 9,082,079 B1 | 7/2015 | Coenen |
| 9,104,186 B2 | 8/2015 | Sinyavskiy et al. |
| 9,144,907 B2 | 9/2015 | Summer et al. |
| 9,177,245 B2 | 11/2015 | Richert et al. |
| 9,186,793 B1 | 11/2015 | Meier |
| 9,189,730 B1 | 11/2015 | Coenen et al. |
| 9,193,075 B1 | 11/2015 | Cipollini et al. |
| 9,195,934 B1 | 11/2015 | Hunt et al. |
| 9,213,937 B2 | 12/2015 | Ponulak |
| 9,242,372 B2 | 1/2016 | Laurent et al. |
| 2001/0045809 A1 | 11/2001 | Mukai |
| 2002/0038294 A1 | 3/2002 | Matsugu |
| 2002/0103576 A1 | 8/2002 | Takamura et al. |
| 2002/0158599 A1 | 10/2002 | Fujita et al. |
| 2002/0169733 A1 | 11/2002 | Peters |
| 2002/0175894 A1 | 11/2002 | Grillo |
| 2002/0198854 A1 | 12/2002 | Berenji et al. |
| 2003/0023347 A1 | 1/2003 | Konno |
| 2003/0050903 A1 | 3/2003 | Liaw |
| 2003/0108415 A1 | 6/2003 | Hosek et al. |
| 2003/0144764 A1 | 7/2003 | Yokono et al. |
| 2003/0220714 A1 | 11/2003 | Nakamura et al. |
| 2004/0030449 A1 | 2/2004 | Solomon |
| 2004/0036437 A1 | 2/2004 | Ito |
| 2004/0051493 A1 | 3/2004 | Furuta |
| 2004/0128028 A1 | 7/2004 | Miyamoto et al. |
| 2004/0131998 A1 | 7/2004 | Marom et al. |
| 2004/0136439 A1 | 7/2004 | Dewberry |
| 2004/0158358 A1 | 8/2004 | Anezaki et al. |
| 2004/0162638 A1 | 8/2004 | Solomon |
| 2004/0167641 A1 | 8/2004 | Kawai et al. |
| 2004/0172168 A1 | 9/2004 | Watanabe et al. |
| 2004/0193670 A1 | 9/2004 | Langan |
| 2004/0267404 A1 | 12/2004 | Danko |
| 2005/0004710 A1 | 1/2005 | Shimomura |
| 2005/0008227 A1 | 1/2005 | Duan et al. |
| 2005/0015351 A1 | 1/2005 | Nugent |
| 2005/0036649 A1 | 2/2005 | Yokono |
| 2005/0049749 A1 | 3/2005 | Watanabe et al. |
| 2005/0065651 A1 | 3/2005 | Ayers |
| 2005/0069207 A1 | 3/2005 | Zakrzewski et al. |
| 2005/0113973 A1 | 5/2005 | Endo et al. |
| 2005/0119791 A1 | 6/2005 | Nagashima |
| 2005/0125099 A1 | 6/2005 | Mikami et al. |
| 2005/0283450 A1 | 12/2005 | Matsugu |
| 2006/0069448 A1 | 3/2006 | Yasui |
| 2006/0082340 A1 | 4/2006 | Watanabe et al. |
| 2006/0094001 A1 | 5/2006 | Torre |
| 2006/0129277 A1 | 6/2006 | Wu et al. |
| 2006/0129506 A1 | 6/2006 | Edelman et al. |
| 2006/0149489 A1 | 7/2006 | Joublin et al. |
| 2006/0161218 A1 | 7/2006 | Danilov |
| 2006/0161300 A1 | 7/2006 | Gonzalez-Banos et al. |
| 2006/0167530 A1 | 7/2006 | Flaherty et al. |
| 2006/0181236 A1 | 8/2006 | Brogardh et al. |
| 2006/0189900 A1 | 8/2006 | Flaherty et al. |
| 2006/0207419 A1 | 9/2006 | Okazaki et al. |
| 2006/0250101 A1 | 11/2006 | Khatib et al. |
| 2007/0022068 A1 | 1/2007 | Linsker |
| 2007/0074177 A1 | 3/2007 | Kurita et al. |
| 2007/0100780 A1 | 5/2007 | Fleischer et al. |
| 2007/0112700 A1 | 5/2007 | Den et al. |
| 2007/0151389 A1 | 7/2007 | Prisco et al. |
| 2007/0176643 A1 | 8/2007 | Nugent |
| 2007/0200525 A1 | 8/2007 | Kanaoka |
| 2007/0208678 A1 | 9/2007 | Matsugu |
| 2007/0250464 A1 | 10/2007 | Hamilton |
| 2007/0255454 A1 | 11/2007 | Dariush et al. |
| 2007/0260356 A1 | 11/2007 | Kock |
| 2008/0024345 A1 | 1/2008 | Watson |
| 2008/0040040 A1 | 2/2008 | Goto et al. |
| 2008/0097644 A1 | 4/2008 | Kaznov |

(56) References Cited

U.S. PATENT DOCUMENTS

| | | |
|---|---|---|
| 2008/0100482 A1 | 5/2008 | Lazar |
| 2008/0112596 A1 | 5/2008 | Rhoads et al. |
| 2008/0133052 A1 | 6/2008 | Jones |
| 2008/0140257 A1 | 6/2008 | Sato et al. |
| 2008/0154428 A1 | 6/2008 | Nagatsuka |
| 2008/0162391 A1 | 7/2008 | Izhikevich |
| 2008/0294074 A1 | 11/2008 | Tong et al. |
| 2008/0319929 A1 | 12/2008 | Kaplan et al. |
| 2009/0037033 A1 | 2/2009 | Phillips et al. |
| 2009/0043722 A1 | 2/2009 | Nugent |
| 2009/0069943 A1 | 3/2009 | Akashi et al. |
| 2009/0105786 A1 | 4/2009 | Fetz et al. |
| 2009/0231359 A1 | 9/2009 | Bass, II et al. |
| 2009/0234501 A1 | 9/2009 | Ishizaki |
| 2009/0265036 A1 | 10/2009 | Jamieson et al. |
| 2009/0272585 A1 | 11/2009 | Nagasaka |
| 2009/0287624 A1 | 11/2009 | Rouat |
| 2009/0299751 A1 | 12/2009 | Jung |
| 2009/0312817 A1 | 12/2009 | Hogle et al. |
| 2010/0036457 A1 | 2/2010 | Sarpeshkar |
| 2010/0081958 A1 | 4/2010 | She |
| 2010/0086171 A1 | 4/2010 | Lapstun |
| 2010/0152896 A1 | 6/2010 | Komatsu et al. |
| 2010/0152899 A1 | 6/2010 | Chang et al. |
| 2010/0166320 A1 | 7/2010 | Paquier |
| 2010/0169098 A1 | 7/2010 | Patch |
| 2010/0198765 A1 | 8/2010 | Fiorillo |
| 2010/0222924 A1 | 9/2010 | Gienger |
| 2010/0225824 A1 | 9/2010 | Lazar |
| 2010/0228264 A1 | 9/2010 | Robinson et al. |
| 2010/0286824 A1 | 11/2010 | Solomon |
| 2010/0292835 A1 | 11/2010 | Sugiura et al. |
| 2010/0299101 A1 | 11/2010 | Shimada |
| 2010/0305758 A1 | 12/2010 | Nishi et al. |
| 2010/0312730 A1 | 12/2010 | Weng et al. |
| 2011/0010006 A1 | 1/2011 | Tani et al. |
| 2011/0016071 A1 | 1/2011 | Guillen |
| 2011/0026770 A1 | 2/2011 | Brookshire |
| 2011/0035052 A1 | 2/2011 | McLurkin |
| 2011/0035188 A1 | 2/2011 | Martinez-Heras et al. |
| 2011/0040405 A1 | 2/2011 | Lim et al. |
| 2011/0060460 A1 | 3/2011 | Oga et al. |
| 2011/0060461 A1 | 3/2011 | Velliste et al. |
| 2011/0067479 A1 | 3/2011 | Davis et al. |
| 2011/0071676 A1 | 3/2011 | Sanders et al. |
| 2011/0107270 A1 | 5/2011 | Wang et al. |
| 2011/0110006 A1 | 5/2011 | Meyer et al. |
| 2011/0119214 A1 | 5/2011 | Breitwisch |
| 2011/0119215 A1 | 5/2011 | Elmegreen |
| 2011/0144802 A1 | 6/2011 | Jang |
| 2011/0158476 A1 | 6/2011 | Fahn et al. |
| 2011/0160741 A1 | 6/2011 | Asano et al. |
| 2011/0160906 A1 | 6/2011 | Orita et al. |
| 2011/0160907 A1 | 6/2011 | Orita |
| 2011/0196199 A1 | 8/2011 | Donhowe |
| 2011/0208350 A1 | 8/2011 | Eliuk et al. |
| 2011/0218676 A1 | 9/2011 | Okazaki |
| 2011/0231016 A1 | 9/2011 | Goulding |
| 2011/0244919 A1 | 10/2011 | Aller et al. |
| 2011/0282169 A1 | 11/2011 | Grudic et al. |
| 2011/0296944 A1 | 12/2011 | Carter |
| 2011/0319714 A1 | 12/2011 | Roelle et al. |
| 2012/0008838 A1 | 1/2012 | Guyon et al. |
| 2012/0011090 A1 | 1/2012 | Tang |
| 2012/0011093 A1 | 1/2012 | Aparin et al. |
| 2012/0017232 A1 | 1/2012 | Hoffberg et al. |
| 2012/0036099 A1 | 2/2012 | Venkatraman et al. |
| 2012/0045068 A1 | 2/2012 | Kim et al. |
| 2012/0053728 A1 | 3/2012 | Theodorus |
| 2012/0109866 A1 | 5/2012 | Modha |
| 2012/0143495 A1 | 6/2012 | Dantu |
| 2012/0144242 A1 | 6/2012 | Vichare et al. |
| 2012/0150777 A1 | 6/2012 | Setoguchi et al. |
| 2012/0150781 A1 | 6/2012 | Arthur |
| 2012/0173021 A1 | 7/2012 | Tsusaka |
| 2012/0185092 A1 | 7/2012 | Ku |
| 2012/0197439 A1 | 8/2012 | Wang |
| 2012/0209428 A1 | 8/2012 | Mizutani |
| 2012/0209432 A1 | 8/2012 | Fleischer |
| 2012/0221147 A1 | 8/2012 | Goldberg et al. |
| 2012/0296471 A1 | 11/2012 | Inaba et al. |
| 2012/0303091 A1 | 11/2012 | Izhikevich |
| 2012/0303160 A1 | 11/2012 | Ziegler et al. |
| 2012/0308076 A1 | 12/2012 | Piekniewski |
| 2012/0308136 A1 | 12/2012 | Izhikevich |
| 2013/0000480 A1 | 1/2013 | Komatsu et al. |
| 2013/0006468 A1 | 1/2013 | Koehrsen |
| 2013/0019325 A1 | 1/2013 | Deisseroth |
| 2013/0066468 A1 | 3/2013 | Choi et al. |
| 2013/0073080 A1 | 3/2013 | Ponulak |
| 2013/0073484 A1 | 3/2013 | Izhikevich |
| 2013/0073491 A1 | 3/2013 | Izhikevich |
| 2013/0073492 A1 | 3/2013 | Izhikevich |
| 2013/0073493 A1 | 3/2013 | Modha |
| 2013/0073495 A1 | 3/2013 | Izhikevich |
| 2013/0073496 A1 | 3/2013 | Szatmary |
| 2013/0073498 A1 | 3/2013 | Izhikevich |
| 2013/0073499 A1 | 3/2013 | Izhikevich |
| 2013/0073500 A1 | 3/2013 | Szatmary |
| 2013/0096719 A1 | 4/2013 | Sanders |
| 2013/0116827 A1 | 5/2013 | Inazumi |
| 2013/0151442 A1 | 6/2013 | Suh et al. |
| 2013/0151448 A1 | 6/2013 | Ponulak |
| 2013/0151449 A1 | 6/2013 | Ponulak |
| 2013/0151450 A1 | 6/2013 | Ponulak |
| 2013/0172906 A1 | 7/2013 | Olson et al. |
| 2013/0173060 A1 | 7/2013 | Yoo et al. |
| 2013/0218339 A1 | 8/2013 | Maisonnier et al. |
| 2013/0218821 A1 | 8/2013 | Szatmary |
| 2013/0245829 A1 | 9/2013 | Ohta et al. |
| 2013/0251278 A1 | 9/2013 | Izhikevich |
| 2013/0297541 A1 | 11/2013 | Piekniewski et al. |
| 2013/0297542 A1 | 11/2013 | Piekniewski |
| 2013/0310979 A1 | 11/2013 | Herr et al. |
| 2013/0325244 A1 | 12/2013 | Wang |
| 2013/0325766 A1 | 12/2013 | Petre et al. |
| 2013/0325768 A1 | 12/2013 | Sinyavskiy |
| 2013/0325773 A1 | 12/2013 | Sinyavskiy |
| 2013/0325774 A1 | 12/2013 | Sinyavskiy et al. |
| 2013/0325775 A1 | 12/2013 | Sinyavskiy |
| 2013/0325776 A1 | 12/2013 | Ponulak |
| 2013/0325777 A1 | 12/2013 | Petre |
| 2013/0345718 A1 | 12/2013 | Crawford et al. |
| 2013/0346347 A1 | 12/2013 | Patterson et al. |
| 2014/0012788 A1 | 1/2014 | Piekniewski |
| 2014/0016858 A1 | 1/2014 | Richert |
| 2014/0025613 A1 | 1/2014 | Ponulak |
| 2014/0027718 A1 | 1/2014 | Zhao |
| 2014/0032458 A1 | 1/2014 | Sinyavskiy et al. |
| 2014/0032459 A1 | 1/2014 | Sinyavskiy et al. |
| 2014/0052679 A1 | 2/2014 | Sinyavskiy et al. |
| 2014/0081895 A1 | 3/2014 | Coenen |
| 2014/0089232 A1 | 3/2014 | Buibas |
| 2014/0114479 A1 | 4/2014 | Okazaki |
| 2014/0122397 A1 | 5/2014 | Richert et al. |
| 2014/0122398 A1 | 5/2014 | Richert |
| 2014/0156574 A1 | 6/2014 | Piekniewski et al. |
| 2014/0163729 A1 | 6/2014 | Shi et al. |
| 2014/0187519 A1* | 7/2014 | Cooke ............... G01N 33/6893 514/165 |
| 2014/0193066 A1 | 7/2014 | Richert |
| 2014/0222739 A1 | 8/2014 | Ponulak |
| 2014/0229411 A1 | 8/2014 | Richert et al. |
| 2014/0244557 A1 | 8/2014 | Piekniewski et al. |
| 2014/0277718 A1* | 9/2014 | Izhikevich ............... B25J 9/163 700/250 |
| 2014/0277744 A1 | 9/2014 | Coenen |
| 2014/0309659 A1 | 10/2014 | Roh et al. |
| 2014/0350723 A1 | 11/2014 | Prieto et al. |
| 2014/0358284 A1 | 12/2014 | Laurent et al. |
| 2014/0358828 A1 | 12/2014 | Phillpps et al. |
| 2014/0369558 A1 | 12/2014 | Holz |
| 2014/0371907 A1 | 12/2014 | Passot et al. |
| 2014/0371912 A1 | 12/2014 | Passot et al. |

(56) References Cited

U.S. PATENT DOCUMENTS

| | | | |
|---|---|---|---|
| 2015/0032258 A1* | 1/2015 | Passot | B25J 9/1656 700/250 |
| 2015/0094850 A1 | 4/2015 | Passot et al. | |
| 2015/0094852 A1 | 4/2015 | Laurent et al. | |
| 2015/0127149 A1 | 5/2015 | Sinyavskiy et al. | |
| 2015/0127154 A1 | 5/2015 | Passot et al. | |
| 2015/0127155 A1* | 5/2015 | Passot | B25J 9/163 700/257 |
| 2015/0148956 A1 | 5/2015 | Negishi | |
| 2015/0204559 A1 | 7/2015 | Hoffberg et al. | |
| 2015/0283701 A1 | 10/2015 | Izhikevich et al. | |
| 2015/0283702 A1 | 10/2015 | Izhikevich et al. | |
| 2015/0283703 A1 | 10/2015 | Izhikevich et al. | |
| 2015/0306761 A1* | 10/2015 | O'Connor | G06N 3/008 700/250 |
| 2015/0317357 A1 | 11/2015 | Harmsen et al. | |
| 2015/0338204 A1 | 11/2015 | Richert et al. | |
| 2015/0339589 A1 | 11/2015 | Fisher | |
| 2015/0339826 A1 | 11/2015 | Buibas et al. | |
| 2015/0341633 A1 | 11/2015 | Richert | |
| 2016/0004923 A1 | 1/2016 | Piekniewski et al. | |
| 2016/0014426 A1 | 1/2016 | Richert | |

FOREIGN PATENT DOCUMENTS

| | | |
|---|---|---|
| JP | 4087423 | 3/1992 |
| JP | 2003175480 | 6/2003 |
| RU | 2108612 C1 | 10/1998 |
| WO | 2008083335 A2 | 7/2008 |
| WO | 20100136961 | 12/2010 |
| WO | WO-2011039542 A1 | 4/2011 |
| WO | WO-2012151585 A2 | 11/2012 |

OTHER PUBLICATIONS

Bartlett et al., "Convexity, Classification, and Risk Bounds" Jun. 16, 2005, pp. 1-61.

Bartlett et al., "Large margin classifiers: convex loss, low noise, and convergence rates" Dec. 8, 2003, 8 pgs.

Bohte, 'Spiking Nueral Networks' Doctorate at the University of Leiden, Holland, Mar. 5, 2003, pp. 1-133 [retrieved on Nov. 14, 2012]. Retrieved from the internet: <URL: http://holnepages,cwi ,n11-sbolltedmblica6ond)hdthesislxif>.

Brette et al., Brian: a simple and flexible simulator for spiking neural networks, The Neuromorphic Engineer, Jul. 1, 2009, pp. 1-4, doi: 10.2417/1200906.1659.

Cessac et al. 'Overview of facts and issues about neural coding by spikes.' Journal of Physiology, Paris 104.1 (2010): pp. 5-18.

Cuntz et al., 'One Rule to Grow Them All: A General Theory of Neuronal Branching and Its Paractical Application' PLOS Computational Biology, 6 (8), Published Aug. 5, 2010, pp. 1-14.

Davison et al., PyNN: A common interface for neuronal network simulators, Frontiers in Neuroinformatics, Jan. 2009, pp. 1-10, vol. 2, Article 11.

Djurfeldt, Mikael, The Connection-set Algebra: A formalism for the representation of connectivity structure in neuronal network models, implementations in Python and C++, and their use in simulators BMC Neuroscience Jul. 18, 2011 1 pg. (Suppl 1):P80.

Dorval et al. 'Probability distributions of the logarithm of inter-spike intervals yield accurate entropy estimates from small datasets.' Journal of neuroscience methods 173.1 (2008): 129-139, doi:10.1016/j.jneumeth.2008.05.013 28 pgs.

Fidjeland et al. 'Accelerated Simulation of Spiking Neural Networks Using GPUs' WCCI 2010 IEEE World Congress on Computational Intelligience, Jul. 18-23, 2010—CCIB, Barcelona, Spain, pp. 536-543, [retrieved on Nov. 14, 2012]. Retrieved from the Internet: <URL:http://www.doc.ic.ac.ukl-mpsha/IJCNN10b. pdf>.

Floreano et al., 'Neuroevolution: from architectures to learning' Evol. Intel. Jan. 1, 2008: pp. 47-62, [retrieved Dec. 30, 2013] [retrieved online from URL:<http://inforscience.epfl.ch/record/ 112676/files/FloreanoDuerrMattiussi2008.p df>.

Gewaltig et al., 'NEST (Neural Simulation Tool)', Scholarpedia, 2007, pp. 1-15, 2(4): 1430, doi 1 0.4249/scholarpedia.1430.

Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.

Gollisch et al. 'Rapid neural coding in the retina with relative spike latencies.' Science 319.5866 (2008): pp. 1108-1111.

Goodman et al., Brian: A simulator for spiking neural networks in Python, Frontiers in Neuroinformatics, Nov. 2008, pp. 1-10, vol. 2, Article 5.

Gorchetchnikov et al., NineML: Declarative, mathematically-explicit descriptions of spiking neuronal networks, Frontiers in Neuroinformatics, Conference Abstract: 4th INCF Congress of Neuroinformatics, doi: 1 0.3389/conf.fninf.2011.08.00098, 2 pgs.

Graham, Lyle J., The Surf-Hippo Reference Manual, http://www. neurophys.biomedicale.univparis5. fr/-graham/surf-hippo-files/ Surf-Hippo%20Reference%20Manual.pdf, Mar. 2002, pp. 1-128.

Izhikevich, 'Polychronization: Computation with Spikes', Neural Computation, 25, 2006, 18, 245-282.

Izhikevich et al., 'Relating STDP to BCM', Neural Computation (2003) 15, pp. 1511-1523.

Izhikevich, 'Simple Model of Spiking Neurons', IEEE Transactions on Neural Networks, vol. 14, No. 6, Nov. 2003, pp. 1569-1572.

Jin et al. (2010) 'Implementing Spike-Timing-Dependent Plasticity on SpiNNaker Neuromorphic Hardware', WCCI 2010, IEEE World Congress on Computational Intelligence, 8 pgs.

Karbowski et al., 'Multispikes and Synchronization in a Large Neural Network with Temporal Delays', Neural Computation 12; (2000), pp. 1573-1606.

Khotanzad, 'Classification of invariant image representations using a neural network' IEEF. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/ Khotanzad.pdf>.

Laurent, 'The Neural Network Query Language (NNQL) Reference' [retrieved on Nov. 12, 2013]. 1 pg., Retrieved from the Internet: <URL'https://code.google.com/p/nnql/issues/ detail?id=1>.

Laurent, 'Issue 1—nnql—Refactor Nucleus into its own file—Neural Network Query Language' 47 pgs [retrieved on Nov. 12, 2013]. Retrieved from the Internet: URL:https://code.google.com/ p/nnql/issues/detail?id=1.

Lazar et al. 'A video time encoding machine', in Proceedings of the 15th IEEE International Conference on Image Processing (ICIP '08}, 2008, pp. 717-720.

Lazar et al. 'Consistent recovery of sensory stimuli encoded with MIMO neural circuits.' Computational intelligence and neuroscience (2010): 2, 13 pgs.

Lazar et al. 'Multichannel time encoding with integrate-and-fire neurons.' Neurocomputing 65 (2005): pp. 401-407.

Masquelier, Timothee. 'Relative spike time coding and STOP-based orientation selectivity in the early visual system in natural continuous and saccadic vision: A computational model.' Journal of computational neuroscience 32.3 (2012): pp. 425-441.

Nguyen et al., "Estimating divergence functionals and the likelihood ratio by penalized convex risk minimization" 2007, pp. 1-8.

Nichols, A Reconfigurable Computing Architecture for Implementing Artificial Neural Networks on FPGA, Master's Thesis, The University of Guelph, 2003, pp. 1-235.

Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com], 5 pgs.

Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu/ viewdoc/download?doi=10.1.1.5.4346&rep=rep1&type=pdf.

(56) References Cited

OTHER PUBLICATIONS

Sato et al., 'Pulse interval and width modulation for video transmission.' Cable Television, IEEE Transactions on 4 (1978): pp. 165-173.
Schemmel et al., Implementing synaptic plasticity in a VLSI spiking neural network model in Proceedings of the 2006 International Joint Conference on Neural Networks (IJCNN'06), IEEE Press (2006) Jul. 16-21, 2006, pp. 1-6 [online], [retrieved on Dec. 10, 2013], Retrieved from the Internet <URL: http://www.kip.uni-heidelberg.de/veroeffentlichungen/download.egi/4620/ps/1774.pdf.
Simulink.RTM. model [online], [Retrieved on Dec. 10, 2013] Retrieved from URL: http://www.mathworks.com/ products/ simulink/index.html> (2 pgs).
Sinyavskiy et al. 'Reinforcement learning of a spiking neural network in the task of control of an agent in a virtual discrete environment' Rus. J. Nonlin. Dyn., 2011, vol. 7, No. 4 (Mobile Robots), pp. 859-875, chapters 1-8 (Russian Article with English Abstract).
Szatmary et al., 'Spike-timing Theory of Working Memory' PLoS Computational Biology, vol. 6, Issue 8, Aug. 19, 2010 [retrieved on Dec. 30, 2013]. Retrieved from the Internet: <URL: http://www.ploscompbiol.org/article/info%3Adoi%2F10.1371 %2Fjournal.pcbi.10008 79#> (11 pgs).
Wang 'The time dimension for scene analysis.' Neural Networks, IEEE Transactions on 16.6 (2005): pp. 1401-1426.
Sjostrom et al., 'Spike-Timing Dependent Plasticity' Scholarpedia, 5(2):1362 (2010), pp. 1-18.
Lazar et al. "Consistent recovery of sensory stimuli encoded with MIMO neural circuits." Computational intelligence and neuroscience (2009): 2. (13 pgs).
Alvarez, 'Review of approximation techniques', PhD thesis, chapter 2, pp. 7-14, University of Bradford, 2000.
Makridakis et al., 'Evaluating Accuracy (or Error) Measures', INSEAD Technical Report, 1995/18/TM (41 pgs).
Miller III, "Real-Time Application of Neural Networks for Sensor-Based Control of Robots with Vision", IEEE Transactions on Systems, Man, and Cypernetics Jul./Aug. 1989, pp. 825-831, vol. 19, No. 4.
Walters, "Implementation of Self-Organizing Neural Networks for Visuo-Motor Control of an Industrial Robot", IEEE Transactions on Neural Networks, vol. 4, No. 1, Jan. 1993, pp. 86-95.
Froemke et al., "Temporal Modulation of Spike-Timing-Dependent Plasticity", Frontiers in Synaptic Neuroscience, vol. 2, article 19, Jun. 2010, pp. 1-16.
Grollman et al., 2007 "Dogged Learning for Robots" IEEE International Conference on Robotics and Automation (ICRA) (6 pgs).
PCT International Search Report for PCT/US2014/040407 dated Oct. 17, 2014 (2 pgs).
PCT International Search Report for International Application PCT/US2013/026738 dated Jul. 21, 2014 (10 pgs).
Asensio et al., "Robot Learning Control Based on Neural Network Prediction" ASME 8th Annual Dynamic Systems and Control Conference joint with the JSME 11th Motion and Vibration Conference 2012 [Retrieved on: Jun. 24, 2014]. Retrieved fro internet: <http://msc.berkely.edu/wjchen/publications/DSC12_8726_Fl.pdf> (11 pgs).
Bouganis et al., Training a Spiking Neural Network to Control a 4-DoF Robotic Arm based on Spiking Timing-Dependent Plasticity in WCCI 2010 IEEE World Congress on Computational Intelligence Jul. 2010 [Retrieved on Jun. 24, 2014] Retrieved from internet: http://www.doc.ic.ac.uk/~mpsha/IJCNN10a.pdf> (8 pgs).
Kasabov, "Evolving Spiking Neural Networks for Spatio-and Spectro-Temporal Pattern Recognition", IEEE 6th International Conference Intelligent Systems' 2012 (6 pgs) [Retrieved on Jun. 24, 2014], Retrieved from internet: <http://ncs.ethz.ch/projects/evospike/publications/evolving-spiking-neural-networks for-spatio-and-spectro-temporal-pattern-recognition-plenary-talk-ieee-is>.
PCT International Search Report and Written Opinion for PCT/US14/48512 dated Jan. 23, 2015, pp. 1-14.
Branca, et al. (1995), A Neural Network for Ego-motion Estimation from Optical Flow BMC'95 Proceedings of the 1995 British conference on machine vision (vol. 1), pp. 247-256.
Graham The Surf Hippo User Manual Version 3.0 B". Unite de Neurosiences Integratives et Computationnelles Institut Federatif de Neurobiologie Alfred Fessard CNRS. France. Mar. 2002 [retrieved Jan. 16, 2014]. [retrieved biomedical.univ-paris5.fr ] ".
Hatsopoulos, Visual Navigation with a Neural Network, Published 1991.
http://www.braincorporation.com/specs/13StemSpecSheet_Rev_Nov11_2013.pdf.
Huang, Fall Detection Using Modular Neural Networks with Backprojected Optical Flow, Published 2007.
Masquelier, Timothee, 'Relative spike time coding and STOP-based orientation selectivity in the early visual system in natural continuous and saccadic vision: a computational model.' Journal of computational neuroscience 32.3 (2012): 425-441.
Park., et al., Transfer of Skills between Human Operators through Haptic Training with Robot Coordination. International Conference on Robotics and Automation Anchorage Convention District, Anchorage, Alaska, USA, pp. 229-235 [online], 2010 [retrieved Dec. 3, 2015]. Retrieved from the Internet:<url:https:></url:https:>.
Specification, figures and EFS receipt of U.S. Appl. No. 14/244,888, filed Apr. 3, 2014 and entitled "Learning apparatus and methods for control of robotic devices via spoofing" (100 pages).
Specification, figures and EFS receipt of U.S. Appl. No. 14/244,890, filed Apr. 3, 2014 and entitled "Apparatus and methods for remotely controlling robotic devices" (91 pages).
Specification, figures and EFS receipt of U.S. Appl. No. 14/265,113, filed Apr. 3, 2014 and entitled "Spoofing remote control apparatus and methods" (95 pages).
Specification, figures and EFS receipt of U.S. Appl. No. 14/285,385, filed Apr. 29, 2014 and entitled "Trainable convolutional network apparatus and methods for operating a robotic vehicle" (71 pages).
Specification, figures and EFS receipt of U.S. Appl. No. 14/285,414, filed May 22, 2014 and entitled "Apparatus and methods for real time estimation of diffrential motion in live video" (42 pages).
Specification, figures and EFS receipt of U.S. Appl. No. 14/285,414, filed May 22, 2014 and entitled "Apparatus and methods for distance estimation using multiple image sensors" (63 pages).
Specification, figures and EFS receipt of U.S. Appl. No. 14/285,466, filed May 22, 2014 and entitled "Apparatus and methods for robotic operation using video imagery" (64 pages).
Specification, figures and EFS receipt of U.S. Appl. No. 14/321,736, filed Jul. 1, 2014 and entitled "Optical detection apparatus and methods" (49 pages).
Specification, figures and EFS receipt of U.S. Appl. No. 14/326,374, filed Jul. 8, 2014 and entitled "Apparatus and methods for distance estimation using stereo imagery" (75 pages).
Specification, figures and EFS receipt of U.S. Appl. No. 14/489,242, filed Sep. 17, 2014 and entitled "Apparatus and methods for remotely controlling robotic devices" (100 pages).
Specification, figures and EFS receipt of U.S. Appl. No. 14/542,391, filed Nov. 14, 2014 and entitled "Feature detection apparatus and methods for training of robotic navigation" (83 pages).
Specification, figures and EFS receipt of U.S. Appl. No. 14/588,168, filed Dec. 31, 2014 and entitled -Apparatus and methods for training robots (101 pages).
Specification, figures and EFS receipt of U.S. Appl. No. 14/637,138, filed Mar. 3, 2015 and entitled "Salient features tracking apparatus and methods using visual initialization" (66 pages).
Specification, figures and EFS receipt of U.S. Appl. No. 14/637,164, filed Mar. 3, 2015 and entitled "Apparatus and methods for tracking salient features" (66 pages).
Specification, figures and EFS receipt of U.S. Appl. No. 14/637,191, filed Mar. 3, 2015 and entitled "Apparatus and methods for saliency detection based on color occurrence analysis" (66 pages).
Specification, figures and EFS receipt of U.S. Appl. No. 14/705,487, filed May 6, 2015 and entitled -Persistent predictor apparatus and methods for task switching (119 pages).

(56) References Cited

OTHER PUBLICATIONS

Zhou, Computation of Optical Flow Usinga Neural Network, Published 1988.

* cited by examiner

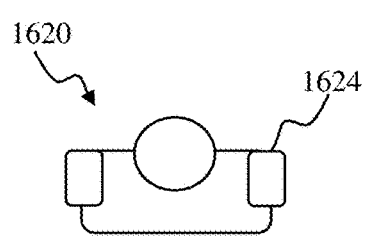
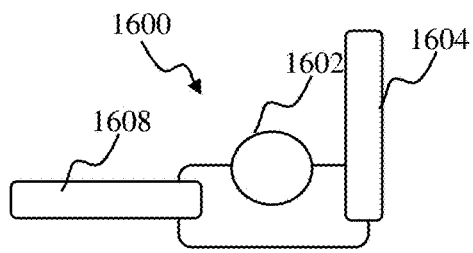
FIG. 16A         FIG. 16B
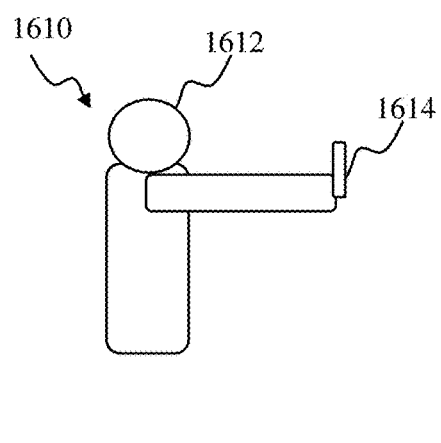
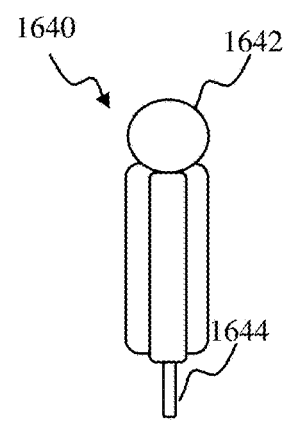
FIG. 16C         FIG. 16D
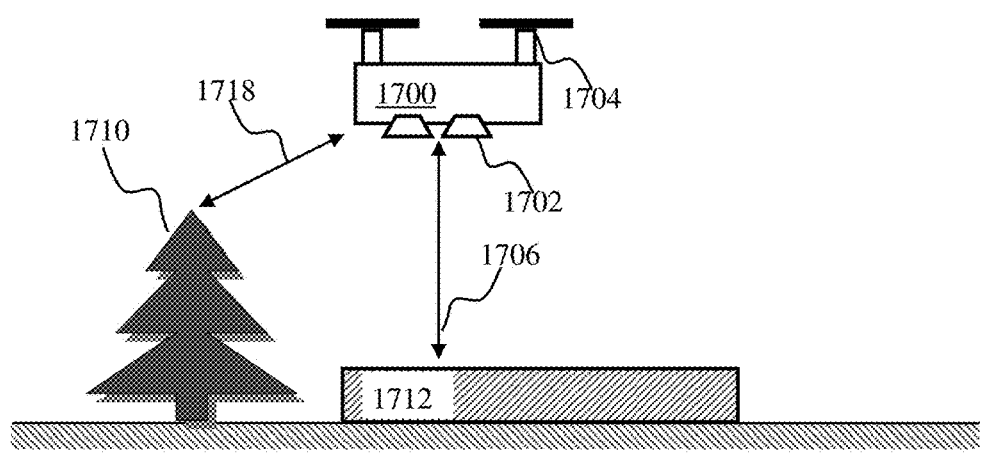
FIG. 17

```
class InvertedPendulumVORControl(object):
    def __init__(self, robot, mode="gyro"):
        self.robot = robot
        self.dpos_per_rad = 1. / np.pi
        self.reset()

def reset(self):
        '''
        Reset the focus point to a neutral one.
        In this example, focus point is defined by two values,
pan and tilt
        Both are comprised between 0 and 1, 0.5 being the neutral
(middle) position
        '''
        self.set_focus_point(pan=0.5, tilt=0.5)
        self.desired_pos = [0.5, 0.5]
        self.set_eye_position(tilt=self.desired_pos[0],
pan=self.desired_pos[1])

def set_eye_position(self, pan, tilt):
        '''
        This is the function to be called to send the output of
the VOR module
        We assume that the robot as a function write_eyes_servos
that take
        two arguments, pan and tilt, and that will set the
position
        '''
        self.robot.write_eyes_servos(pan=pan, tilt=tilt)

def set_focus_point(self, pan=0.5, tilt=0.5):
        '''
        Set the internal variable default_pos
        This function can be used by an external method/function
to set a new
        focus point for the VOR
        '''
        self.default_pos = [tilt, pan]

def execute(self, desired_turning, d_orientation, dt,
inhibit):
        '''
        desired_turning: motor command (turn) sent to the robot
        d_orientation: velocity of acceleration on pitch and yaw
axis
```

FIG. 25A

```
        dt: time step
        '''
        if inhibit:
            # Inhibit might be true if higher process decides to
control the eyes movement
            # VOR should not interfere
            self.default_pos = [self.robot._eyes_position_tilt,
self.robot._eyes_position_pan]
            self.desired_pos = [self.robot._eyes_position_tilt,
self.robot._eyes_position_pan]

# Yaw axis, compensate for sensed unexpected turn
        orientation_horizontal_dt = d_orientation[1]
        # Remove actual desired command sent by the motor control
process
        orientation_horizontal_dt -= desired_turning

# Next computations calculate the new desired position
(tilt and pan) of the camera servo
        # We assume a dpos_per_radian variable (servo dependent)
that convert an angle into a servo position
        self.desired_pos[0] = self.default_pos[0] -
dpos_per_radian * d_orientation[0]
        self.desired_pos[1] = self.desired_pos[1] -
orientation_horizontal_dt * dt self.set_eye_position(
            pan=self.desired_pos[1], tilt=self.desired_pos[0])

# Slowly goes back to the focus point position if no user
input is provided
        self.desired_pos[
            1] -= (self.desired_pos[1] - self.default_pos[1])*dt
```

FIG. 25B

APPARATUS AND METHODS FOR TRAINING PATH NAVIGATION BY ROBOTS

CROSS-REFERENCE TO RELATED APPLICATIONS

This application claims the priority benefit of co-owned U.S. Provisional Patent Application Ser. No. 62/059,039 entitled "LEARNING APPARATUS AND METHODS", filed Oct. 2, 2014, which is incorporated herein by reference in its entirety. This application is related to co-owned U.S. patent application Ser. No. 14/588,168 entitled "APPARATUS AND METHODS FOR TRAINING OF ROBOTS", filed Dec. 31, 2014, co-owned U.S. patent application Ser. No. 14/244,890 entitled "APPARATUS AND METHODS FOR REMOTELY CONTROLLING ROBOTIC DEVICES", filed Apr. 3, 2014, co-owned U.S. patent application Ser. No. 13/918,338 entitled "ROBOTIC TRAINING APPARATUS AND METHODS", filed Jun. 14, 2013, co-owned U.S. patent application Ser. No. 13/918,298 entitled "HIERARCHICAL ROBOTIC CONTROLLER APPARATUS AND METHODS", filed Jun. 14, 2013, co-owned U.S. patent application Ser. No. 13/907,734 entitled "ADAPTIVE ROBOTIC INTERFACE APPARATUS AND METHODS", filed May 31, 2013, co-owned U.S. patent application Ser. No. 13/842,530 entitled "ADAPTIVE PREDICTOR APPARATUS AND METHODS", filed Mar. 15, 2013, co-owned U.S. patent application Ser. No. 13/842,562 entitled "ADAPTIVE PREDICTOR APPARATUS AND METHODS FOR ROBOTIC CONTROL", filed Mar. 15, 2013, co-owned U.S. patent application Ser. No. 13/842,616 entitled "ROBOTIC APPARATUS AND METHODS FOR DEVELOPING A HIERARCHY OF MOTOR PRIMITIVES", filed Mar. 15, 2013, co-owned U.S. patent application Ser. No. 13/842,647 entitled "MULTICHANNEL ROBOTIC CONTROLLER APPARATUS AND METHODS", filed Mar. 15, 2013, and co-owned U.S. patent application Ser. No. 13/842,583 entitled "APPARATUS AND METHODS FOR TRAINING OF ROBOTIC DEVICES", filed Mar. 15, 2013, each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE DISCLOSURE

The present disclosure relates to, inter alia, computerized apparatus and methods for training of robotic devices to perform path navigation tasks.

BACKGROUND

According to conventional approaches, given a task in which a user wants to train a robot to navigate along a path from location A to location B (A and B may be the same location, in which case the path takes the form of a loop), the user may first control the robot one time or multiple times to move along the desired path. This may constitute the training of the robot. Thereafter, the robot may be expected to perform the same navigation autonomously.

One typical approach may be to store the motor commands that were executed during the training phase, and then simply replay them. This, however, may not work well in practice, at least because there may be some variability in how the motor commands translate into actual movement in physical space. In general, if the robot is slightly off course, it may continue to drift more and more off course.

SUMMARY

One aspect of the disclosure relates to a method of determining a control signal for a robot. The method may be performed by a special purpose computing platform having one or more processors executing instructions stored by a non-transitory computer-readable storage medium. The method may comprise receiving first input features of a first type and second input features of a second type. The method may comprise determining a subset of features by randomly selecting at least one of the first input features and at least one of the second input features. The method may comprise comparing individual features of the subset to corresponding features of a plurality of training feature sets. Individual ones of the plurality of training feature sets may comprise a number of training features. The number may be equal to or greater than the quantity of features within the subset of features. The method may comprise, based on the comparison, determining a similarity measure for a given training set of the plurality of training feature sets. The similarity measure may characterize similarity between features of the subset and features of the given training set. The method may comprise, responsive to the similarity measure breaching a threshold, selecting one or more training sets from the plurality of training sets. The method may comprise determining one or more potential control signals for the robot. Individual ones of the one or more potential control signals may be associated with a corresponding training set of the plurality of training sets. The method may comprise determining the control signal based on a transformation obtained from the one or more potential control signals. Individual ones of the plurality of training feature sets may comprise features of the first type and at least one feature of the second type. Individual ones of the plurality of training feature sets may be obtained during training operation of the robot. The training operation may be performed responsive to receiving a training signal from the robot. Individual ones of the one or more potential control signals may be determined based on the training signal and the features of the given training set.

In some implementations, the similarity measure may be determined based on a difference between values of the features of the subset and values of the features of the given training set.

In some implementations, the similarity measure may be determined based on a distance metric between individual features of the subset of features and corresponding features of the given training set.

In some implementations, selecting one or more training sets may comprise selecting a training set associated with a smallest distance metric.

In some implementations, selecting one or more training sets may comprise selecting N training sets associated with a lowest percentile of the distance metric. N may be greater than two.

In some implementations, the transformation may comprise a statistical operation performed on individual ones of the one or more potential control signals associated with the selected N training sets.

In some implementations, the statistical operation may be selected from the group including mean and percentile.

In some implementations, the transformation may comprise a weighted sum of a product of individual ones of the one or more potential control signals and a corresponding distance measure associated with the selected N training sets.

In some implementations, the control signal may be configured to cause the robot to execute the action. The first input type may comprise a digital image comprising a plurality of pixel values. The second input type may comprise a binary indication associated with the action being executed.

In some implementations, the training may comprise a plurality of iterations configured based on the training signal. A given iteration may be characterized by a control command and a performance measure associated with the action execution based on the control command.

In some implementations, the plurality of pixels may comprises at least 10 pixels. The random selection may be performed based on a random number generation operation.

Another aspect of the disclosure relates to a self-contained robotic apparatus. The apparatus may comprise a platform, a first sensor, a second sensor, a memory component, and one or more physical processors. The platform may comprise a motor. The first sensor component may be configured to provide a signal conveying a video frame comprising a plurality of pixels. The second sensor component may be configured to provide a binary sensor signal characterized by one of two states. The memory component may be configured to store training sets. A given training set may comprise an instance of the video frame, an instance of the binary signal, and an instance of a motor control indication configured to cause the robot to execute an action. The one or more physical processors may configured to operate a random k-nearest neighbors learning process to determine a motor control indication by at least: determining a subset of features comprising the binary signal and a set of pixels randomly selected from the plurality of pixels; scaling individual pixels of the set of pixels by a scaling factor; scaling features of the subset by a scaling factor; comparing individual scaled features of the subset to corresponding features of individual ones of the training sets; based on the comparison, determining a similarity measure for a given training set, the similarity measure characterizing similarity between features of the subset and features of the given training set; based on an evaluation of the similarity measure, selecting one or more of the training sets; determining one or more potential control signals for the robot, individual ones of the one or more potential control signals being associated with a corresponding training set; and determining the control signal based on a transformation obtained from the one or more potential control signals. Individual ones of the plurality of training feature sets may comprise features of the first type and at least one feature of the second type. Individual ones of the plurality of training feature sets may be obtained during training operation of the robot. The training operation may be performed responsive to receiving a training signal from the robot. Individual ones of the one or more potential control signals may be determined based on the training signal and the features of the given training set.

In some implementations, scaling may comprise a multiplication of the first input by the scaling factor. The scaling factor may be determined based on a number of pixels in the subset.

In some implementations, the scaling factor may be determined based on a ratio of a range of pixel values to a range of the binary values.

In some implementations, the action may comprise target-approach-obstacle-avoidance. Scaling may be performed based on a size of obstacle or object as it appears in the video frame.

In some implementations, scaling is a pixel specific.

Yet another aspect of the disclosure relates to a non-transitory computer-readable storage medium having instructions embodied thereon, the instructions being executable by a processor to perform a method of selecting an outcome of a plurality of outcomes. The method may comprise determining a history of sensory input. The method may comprise applying a transformation to an instance of the sensory input. The transformation may be configured to produce scaled input based on analysis of the history. The method may comprise determining a set of features comprising features of a first type randomly selected from the scaled input and at least one feature of a second type. The method may comprise comparing individual features of the set to corresponding features of a plurality of training feature sets. Individual ones of the plurality of training feature sets may comprise a number of training features. The number may be equal to or greater than the quantity of features within the set of features. The method may comprise, based on the comparison, determining a similarity measure for a given training set of the plurality of training feature sets. The similarity measure may characterize similarity between features of the subset and features of the given training set. The method may comprise, responsive to the similarity measure breaching a threshold, selecting one or more training sets from the plurality of training sets. The method may comprise determining one or more potential control signals for the robot. Individual ones of the one or more potential control signals may be associated with a corresponding training set of the plurality of training sets. The method may comprise determining the control signal based on a transformation obtained from the one or more potential control signals. Individual ones of the plurality of training feature sets may comprise features of the first type and at least one feature of the second type. Individual ones of the plurality of training feature sets may be obtained during training operation of the robot. The training operation may be performed responsive to receiving a training signal from the robot. Individual ones of the one or more potential control signals being determined based on the training signal and the features of the given training set.

In some implementations, the analysis of the history may comprise a determination of feature mean and feature standard deviation. The transformation may comprise subtracting the feature mean and dividing the outcome by the feature standard deviation.

In some implementations, the set may comprise a plurality of set features, individual ones of the set features characterized by a pointer. The feature mean and the feature standard deviation may be configured for a respective pointer.

In some implementations, the input of the first type may comprise a matrix of values. The pointer may identify a value within the matrix. The feature mean and the feature standard deviation may be configured for a given location within the matrix.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

FIGS. 16A-16D illustrate use of gestures by a human operator for communicating control indications to a robotic device, in accordance with one or more implementations.

FIG. 17 is a graphical illustration depicting an exemplary unmanned robotic apparatus comprising salient feature determination apparatus of the disclosure configured for autonomous navigation, in accordance with one or more implementations.

FIG. 25A is first portion of an exemplary code listing that may be utilized with a two-wheeled, self-balancing, robotic platform (e.g., similar to a Segway-type configuration), compensating for pan and tilt, in accordance with one or more implementations.

FIG. 25B is a second portion of an exemplary code listing that may be utilized with a two-wheeled, self-balancing, robotic platform (e.g., similar to a Segway-type configuration), compensating for pan and tilt, in accordance with one or more implementations.

Figure 1:
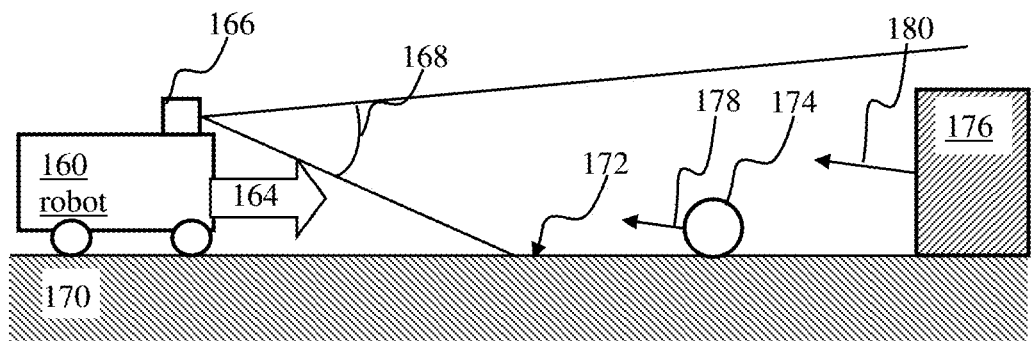
FIG. 1 is a graphical illustration depicting a robotic apparatus comprising an adaptive controller configured for autonomous navigation, in accordance with one or more implementations.

All Figures disclosed herein are © Copyright 2015 Brain Corporation. All rights reserved.

DETAILED DESCRIPTION

Implementations of the present disclosure will now be described in detail with reference to the drawings, which are provided as illustrative examples so as to enable those skilled in the art to practice the present technology. Notably, the figures and examples below are not meant to limit the scope of the present disclosure to a single implementation, but other implementations are possible by way of interchange of or combination with some or all of the described or illustrated elements. Wherever convenient, the same reference numbers will be used throughout the drawings to refer to same or like parts.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation may be combined with one or more features of any other implementation In the present disclosure, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in pulse-based system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet or "phablet" computers, portable navigation aids, J2ME equipped devices, smart TVs, cellular telephones, smart phones, personal integrated communication or entertainment devices, or literally any other device capable of executing a set of instructions and processing an incoming data signal.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and other languages.

As used herein, the terms "connection", "link", "synaptic channel", "transmission channel", "delay line", are meant generally to denote a causal link between any two or more entities (whether physical or logical/virtual), which enables information exchange between the entities.

As used herein the term feature may refer to a representation of an object edge, determined by change in color, luminance, brightness, transparency, texture, and/or curvature. The object features may comprise, inter alia, individual edges, intersections of edges (such as corners), orifices, and/or curvature As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "processor", "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "network interface" refers to any signal, data, or software interface with a component, network or process including, without limitation, those of the FireWire (e.g., FW400, FW800, and/or other FireWire implementation), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, and/or other cellular interface implementation) or IrDA families.

As used herein, the terms "pulse", "spike", "burst of spikes", and "pulse train" are meant generally to refer to, without limitation, any type of a pulsed signal, e.g., a rapid change in some characteristic of a signal, e.g., amplitude, intensity, phase or frequency, from a baseline value to a higher or lower value, followed by a rapid return to the baseline value and may refer to any of a single spike, a burst of spikes, an electronic pulse, a pulse in voltage, a pulse in electrical current, a software representation of a pulse and/or burst of pulses, a software message representing a discrete pulsed event, and any other pulse or pulse type associated with a discrete information transmission system or mechanism.

As used herein, the term "receptive field" is used to describe sets of weighted inputs from filtered input elements, where the weights may be adjusted.

As used herein, the term "Wi-Fi" refers to, without limitation, any of the variants of IEEE-Std. 802.11 or related standards including 802.11a/b/g/n/s/v and 802.11-2012.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, and/or other wireless interface implementation), FHSS, DSSS, GSM, PAN/802.15, WiMAX (802.16), 802.20, narrowband/FDMA, OFDM, PCS/DCS, LTE/LTE-A/TD-LTE, analog cellular, CDPD, RFID or NFC (e.g., EPC Global Gen. 2, ISO 14443, ISO 18000-3), satellite systems, millimeter wave or microwave systems, acoustic, and infrared (e.g., IrDA).

Figure 4A:
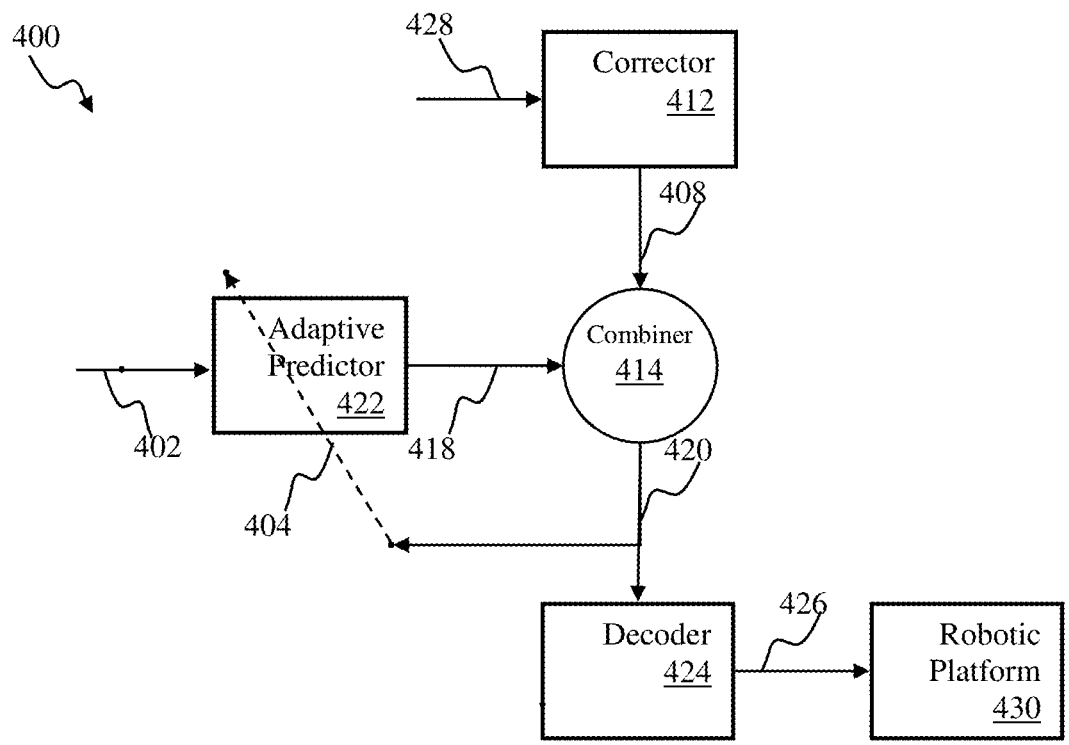
FIG. 4A is a block diagram illustrating an adaptive control system for use with, e.g., the robotic apparatus of FIG. 1, according to one or more implementations.
Figure 4B:
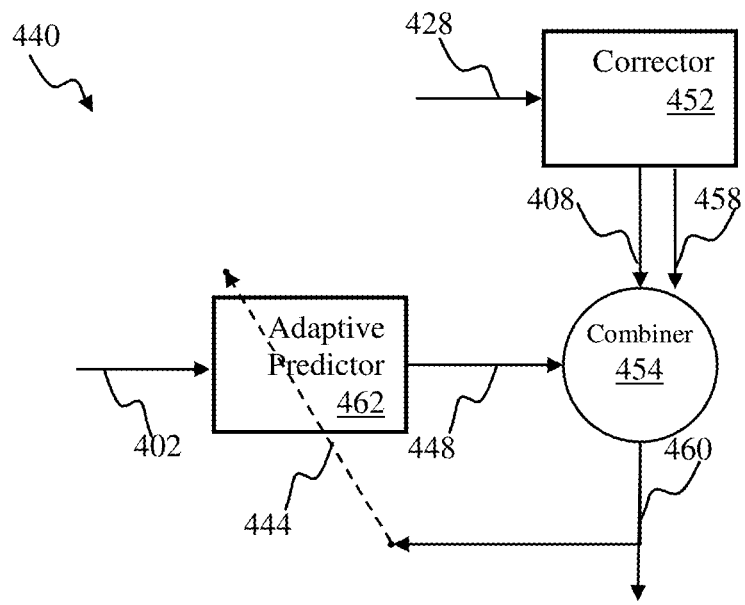
FIG. 4B is a block diagram illustrating an adaptive controller apparatus comprising a mode combiner for use with, e.g., the robotic apparatus of FIG. 1, according to one or more implementations.

FIG. 1 depicts a mobile robotic apparatus that may be configured with an adaptive controller in accordance with one or more implementations of e.g., the learning apparatuses illustrated in FIGS. 4A-4B, infra. The robotic apparatus 160 may comprise a sensor component 166. The sensor component 166 may be characterized by an aperture/field of view 168 (e.g., an extent of the observable world that may be captured by the sensor at a given moment). The sensor component 166 may provide information associated with objects within the field-of-view 168. In one or more implementations, such as object recognition, and/or obstacle avoidance, the output provided by the sensor component 166 may comprise a stream of pixel values associated with one or more digital images. In one or more implementations of e.g., video, radar, sonography, x-ray, magnetic resonance imaging, and/or other types of sensing, the sensor 166 output may be based on electromagnetic waves (e.g., visible light, infrared (IR), ultraviolet (UV), and/or other types of electromagnetic waves) entering an imaging sensor array. In some implementations, the imaging sensor array may comprise one or more of artificial retinal ganglion cells (RGCs), a charge coupled device (CCD), an active-pixel sensor (APS), and/or other sensors. The input signal may comprise a sequence of images and/or image frames. The sequence of images and/or image frame may be received from a CCD camera via a receiver apparatus and/or downloaded from a file. The image may comprise a two-dimensional matrix of red/green/blue (RGB) values refreshed at a 25 Hz frame rate. It will be appreciated by those skilled in the arts that the above image parameters are merely exemplary, and many other image representations (e.g., bitmap, CMYK, HSV, HSL, grayscale, and/or other representations) and/or frame rates are equally useful with the present disclosure. Pixels and/or groups of pixels associated with objects and/or features in the input frames may be encoded using, for example, latency encoding described in co-owned U.S. patent application Ser. No. 12/869,583, filed Aug. 26, 2010 and entitled "INVARIANT PULSE LATENCY CODING SYSTEMS AND METHODS"; U.S. Pat. No. 8,315,305, issued Nov. 20, 2012, and entitled "SYSTEMS AND METHODS FOR INVARIANT PULSE LATENCY CODING"; U.S. patent application Ser. No. 13/152,084, filed Jun. 2, 2011, and entitled "APPARATUS AND METHODS FOR PULSE-CODE INVARIANT OBJECT RECOGNITION"; and/or latency encoding comprising a temporal winner take all mechanism described in U.S. patent application Ser. No. 13/757,607, filed Feb. 1, 2013, and entitled "TEMPORAL WINNER TAKES ALL SPIKING NEURON NETWORK SENSORY PROCESSING APPARATUS AND METHODS", each of the foregoing being incorporated herein by reference in its entirety.

In one or more implementations, object recognition and/or classification may be implemented using a spiking neuron classifier comprising conditionally independent subsets as described in co-owned U.S. patent application Ser. No. 13/756,372 filed Jan. 31, 2013, and entitled "SPIKING NEURON CLASSIFIER APPARATUS AND METHODS USING CONDITIONALLY INDEPENDENT SUBSETS" and/or co-owned U.S. patent application Ser. No. 13/756,382 filed Jan. 31, 2013, and entitled "REDUCED LATENCY SPIKING NEURON CLASSIFIER APPARATUS AND METHODS", each of the foregoing being incorporated herein by reference in its entirety.

In one or more implementations, encoding may comprise adaptive adjustment of neuron parameters, such as neuron excitability which is described in U.S. patent application Ser. No. 13/623,820 entitled "APPARATUS AND METHODS FOR ENCODING OF SENSORY DATA USING ARTIFICIAL SPIKING NEURONS", filed Sep. 20, 2012, the foregoing being incorporated herein by reference in its entirety.

In some implementations, analog inputs may be converted into spikes using, for example, kernel expansion techniques described in co-owned U.S. patent application Ser. No. 13/623,842 filed Sep. 20, 2012, and entitled "SPIKING NEURON NETWORK ADAPTIVE CONTROL APPARATUS AND METHODS", the foregoing being incorporated herein by reference in its entirety. The term continuous signal may be used to describe a non-spiking signal (e.g., analog, n-ary digital signal characterized by n-bits of resolution, n>1). In one or more implementations, analog and/or spiking inputs may be processed by mixed signal spiking neurons, such as co-owned U.S. patent application Ser. No. 13/313,826 entitled "APPARATUS AND METHODS FOR GATING ANALOG AND SPIKING SIGNALS IN ARTIFICIAL NEURAL NETWORKS", filed Dec. 7, 2011, and/or co-owned U.S. patent application Ser. No. 13/761,090 entitled "APPARATUS AND METHODS FOR IMPLEMENTING LEARNING FOR ANALOG AND SPIKING SIGNALS IN ARTIFICIAL NEURAL NETWORKS", filed Feb. 6, 2013, each of the foregoing being incorporated herein by reference in its entirety.

In some implementations of robotic navigation in an arbitrary environment, the sensor component 166 may comprise a camera configured to provide an output comprising a plurality of digital image frames refreshed at, e.g., 25 Hz frame rate. The sensor output may be processed by a learning controller, e.g., as illustrated and described with respect to FIG. 4A.

In some implementations of robotic vehicle navigation, output of the sensor 166 in FIG. 1 may comprise representations of one or more objects (e.g., targets, and/or obstacles). The tasks of the robot may be configured based on a context. In one or more implementations, the context may comprise one or more of robot state (e.g., location or motion information, (position, orientation, speed), platform state or configuration (e.g., manipulator size and/or position), available power and/or other), state of the environment (e.g., object size, location), environmental state (wind, rain), previous state information (e.g., based on historic states of robot motions), and/or other characteristic state information.

Persistent switcher apparatus and methods are disclosed herein, in accordance with one or more implementations. Exemplary implementations may completely or partially alleviate this problem by using a hierarchy of behaviors and a stateful switcher. The switcher may learn what sensory contexts should be associated with changes in behavior, and what contexts shouldn't. The example task may then be trained with simple predictors based on the immediate visual input. Human operator knowledge about how to best divide a task in elementary behaviors may be leveraged.

Figure 2:
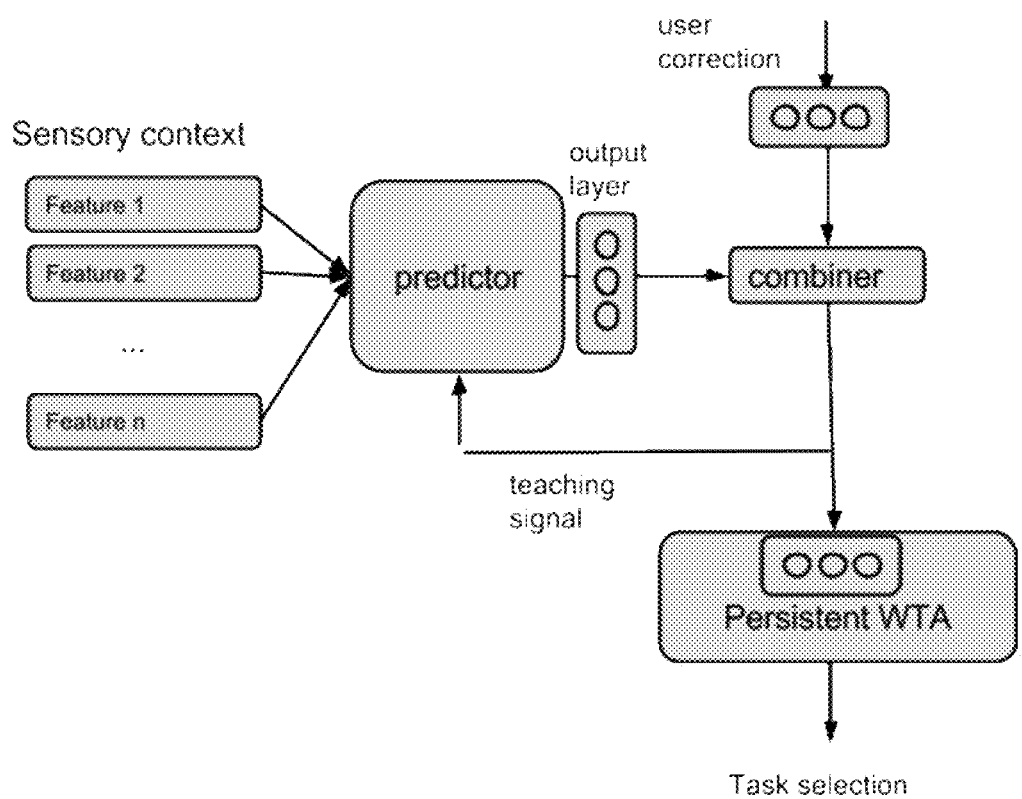
FIG. 2 is functional block diagram illustrating persistent switching apparatus, according to some implementations, according to one or more implementations.

In some implementations, a user (e.g., human operator) may train the system to switch between tasks based on the sensory context. FIG. 2 shows a diagram of the system, according to some implementations. A predictor may assign priorities to the available tasks based on the sensory context; the priorities may be trained by the user via a corrector plus combiner scheme. The predicted priorities may be filtered by a "persistent winner-take-all" module that only switches to a different task if the priority breaches a certain threshold.

FIG. 2 illustrates the task selector, in accordance with one or more implementations. The task selector may receive sensory context (e.g., camera input and/or input from other sensors, other context signals based on internal states or system history (which may be processed to extract interesting features), and/or other information associated with sensory context) and control signals (e.g., "corrections") from the user via a remote controller and/or other control device. In some implementations, the output of the system may be a choice among the available tasks to perform, frame by frame.

The predictor may be configured to output a vector of real values. Individual ones of those values may correspond to a possible task to perform. These values may be interpreted as the "priorities" of the different tasks. In some implementations, the priorities may be non-negative and add up to 1 (e.g., via a soft-max layer).

In some implementations, the predictor may output one value for each possible pair of tasks to switch between (e.g., there may be $m^2$ outputs for m available tasks). This may be useful when a given context needs to be associated to different tasks depending on the task currently being performed.

The user may correct the system by providing an indication as to which task the system should be performing in a certain context. Assuming that the combiner (see below) is of the "overriding" type, user corrections may come as a vector with as many elements as tasks, with value "0" for all elements except "1" for the element corresponding to the task to be associated with the context.

In some contexts the user may want to signify that the system should not switch from whatever task it is performing. In some implementations, this may be done (e.g., in the case of an overriding combiner) by sending a vector of corrections with uniform values not breaching the threshold of the "persistent winner takes all" block. If all the predictor outputs do not breach the threshold in a given context, the "Persistent WTA" block may keep selecting the same task (see below).

The user corrections may be processed in specific ways before entering the combiner depending on the type of combiner and predictor used. For example, if the combiner is overriding and the predictor is a neural network with softmax output, it may be preferable to send [0.9, 0.05, 0.05] instead of [1, 0, 0] as a correction vector to avoid driving the network to saturation.

In some implementations, the combiner for this system may include the override combiner. Responsive to the user sending a correction, the combiner may output the correction, otherwise passing through the predictor signal. An additive combiner may be implemented when the user is aware of the current output of the predictor before it passes through the combiner and the persistent WTA.

The persistent WTA select output of the combiner (a vector of priorities), frame by frame, which of the available tasks should be performed. In some implementations, the persistent WTA may make such selection based on the following rules:

If the maximum of the input priorities is above a certain threshold, switch to the corresponding task.

Otherwise select the same task that had been selected in the previous frame.

The threshold parameter may be tuned to make the system more or less prone to switching. With a high threshold, the system may need very strong sensory evidence to switch from the current task, and vice-versa with a low threshold.

If the predictor outputs values for each possible pair of tasks to switch between, instead of just one value per task, the persistent WTA may work the same but may consider only the values of the pairs whose first task is the current one (the task that was selected in the previous frame).

Apparatus and methods for using cost of user feedback during training of robots are disclosed herein, in accordance with one or more implementations. According to exemplary implementations, a user may want to know about robot's performance without actually letting robot to perform the task autonomously. This may wholly or partially alleviate one or more disadvantages discussed above.

One starting point to solve this task may be to measure a current cost function C of a predictor while its learning to do a task:

$$C(t)=d(y_d(t),y(t)) \qquad \text{(Eqn. 1)}$$

where C(t) represents current cost function at time t, y(t) represents output of the predictor (e.g., the component 422 of FIG. 4A), $y_d$(t) represents desired output of the predictor (signal from the teacher), d represents distance function between desired and actual output (e.g. mean square error, Euclidean distance, and/or cross entropy).

The value of C (t) may be provided or shown to the user as a number and/or in any other graphical form (e.g., progress bar, intensity of the LED, and/or other techniques for conveying a quantity). Based on this number, the user may try to determine whether his corrections and predictions of the system are close or not, which may indicate how well or not the robot learned the task.

When a user shows the robot how to perform the task, he may do it in different ways on different occasions. For example, a user may teach the robot one or more possible obstacle avoidance trajectories which are close to each other. The system may generalize those examples and choose a single trajectory. In some implementations, if the user gives a new example of trajectory and measures costs according to Eqn. (1), the system may provide a large value indicating a mistake, even if on average the robot performs obstacle avoidance very well.

A possible solution may be to time-average (e.g., compute running average or sliding average) the costs so that all occasional prediction errors are not presented to the user. The user may receive a number that represents how many mistakes a predictor did on average for a given time interval (e.g., 1 second, 5 minutes, and/or other time interval).

The numeric values of costs may depend on one or more factors including one or more of the task, the predictor, the robot, the distance function in Eqn. (1), and/or other factors. For example, if a robot is trained to follow a trajectory with a constant linear velocity, then the costs may be include costs of predicting angular velocity (e.g., costs on linear velocity may be small because it may be easy to predict a constant value). However, if a task is obstacle avoidance with backing up from obstacles, then predicting of linear velocity may contribute the costs. Different predictors may achieve different costs on different tasks. If a robot is trained with eight degrees of freedom, a range of costs may be different than costs during training navigation with two degrees of freedom (e.g., a (v, w) control space). Mean square error distance function used in Eqn. (1) may provide costs in different ranges comparing to cross entropy distance function.

In some implementations, in order to present costs to the user, it may be useful to normalize them to interval (0, 1) by the maximum achievable costs in this task (or by some fixed number if maximum costs are infinite like in cross entropy case). Normalizing may provide more independence of the cost value to the distance function and robot. Normalized costs may depend on the task and on the predictor. However, numbers from (0, 1) may be readily represented to the user and compared against each other.

Figure 8:
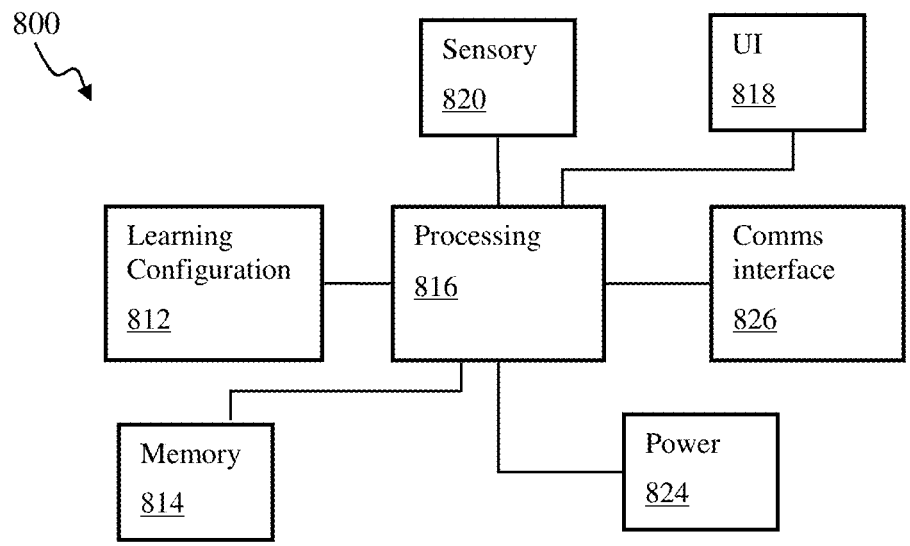
FIG. 8 is a functional block diagram depicting the salient feature detection apparatus of, e.g., FIG. 7, according to one or more implementations.

Some tasks may differ from others in complexity and/or in statistical properties of a teacher signal. For example, compare a task A: navigating through a "right angle" path which consists of a straight line and then sudden turn and then straight line again and a task B: navigating a FIG. 8 path. In task A, costs may be really small even if a prediction procedure always tells robot to drive straight without turning because costs of not turning are too small comparing to costs of not driving straight. A FIG. 8 path is more complex compared to the right angle path because the robot has to turn left and right depending on the context. If a value of costs is provided to the user in the cases of the right angle path and the FIG. 8, the same values of the costs may mean totally different performances on the actual task (small costs on "right angle" may not mean a good performance, while small costs on FIG. 8 path may mean that the robot performs well).

To decrease sensitivity to the variations in the complexity and other properties of the task, a relative may be introduced to "blind" performance measure $P_b$. A "blind" predictor may be used that does not takes into account input of the robot and only predicts average values of control signal. It may compute a running (or sliding) average of control signal. In some implementations, a "blind" performance measure $P_b$ may be expressed as:

$$p_b(t)=1-C(t)/C_b(t) \qquad \text{(Eqn. 2)}$$

where C(t) represents costs computed using Eqn. (1) for a main predictor, $C_b$ (t) represents costs computed using Eqn. (1) for a "blind" predictor. In some implementations, if $p_b$ (t) is close to 1, then the prediction process may perform better than a baseline cost of the "blind" predictor. If $p_b$ (t) is negative, then the main predictor may perform worse than a baseline.

In the example of training a "right angle" path, a blind predictor may provide low costs and be able to better perform the task the main predictor has to perform (which in this case means to perform also a turn and not only go straight). For a FIG. 8 path, a blind predictor may provide a high cost because it is not possible to predict when to switch between left and right turns without input, so relative performance of the main predictor may be large even for relatively high costs values.

A problem of presenting the costs to the user may be that costs may change in time in highly non-linear fashion:

The user may prefer presentation of costs as decreasing in a linear fashion (e.g., a feedback number slowly decreases from 0 to 1 during the training) Otherwise a user may see a huge progress during sudden decrease of the costs function and then there will be almost no progress at all.

The general shape of the costs curve may be universal (or nearly so) among tasks and predictors. A reference predictor may be selected, which is trained in parallel to the main predictor (i.e., the predictor that the robot actually uses to perform actions). A relative performance number may be expressed as:

$$p_r(t)=1-C(t)/C_r(t) \qquad \text{(Eqn. 3)}$$

where C (t represents costs computed using Eqn. (1) for a main predictor, $C_r$ (t) represents costs computed using Eqn. (1) for a reference predictor. If $P_r$ (t) is close to 1, then the main predictor may perform better than the reference predictor. If $P_r$ (t) is negative, then the main predictor may perform worse than the reference.

Figure 3A:
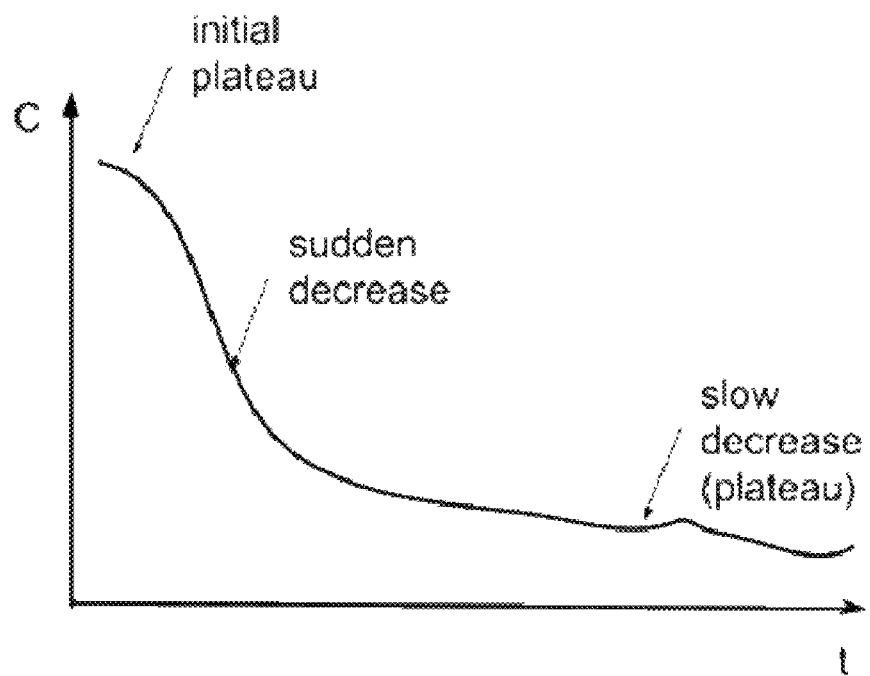
FIG. 3A is a plot illustrating nonlinear dependence of absolute cost as a function of time during training, according to one or more implementations.
Figure 3B:
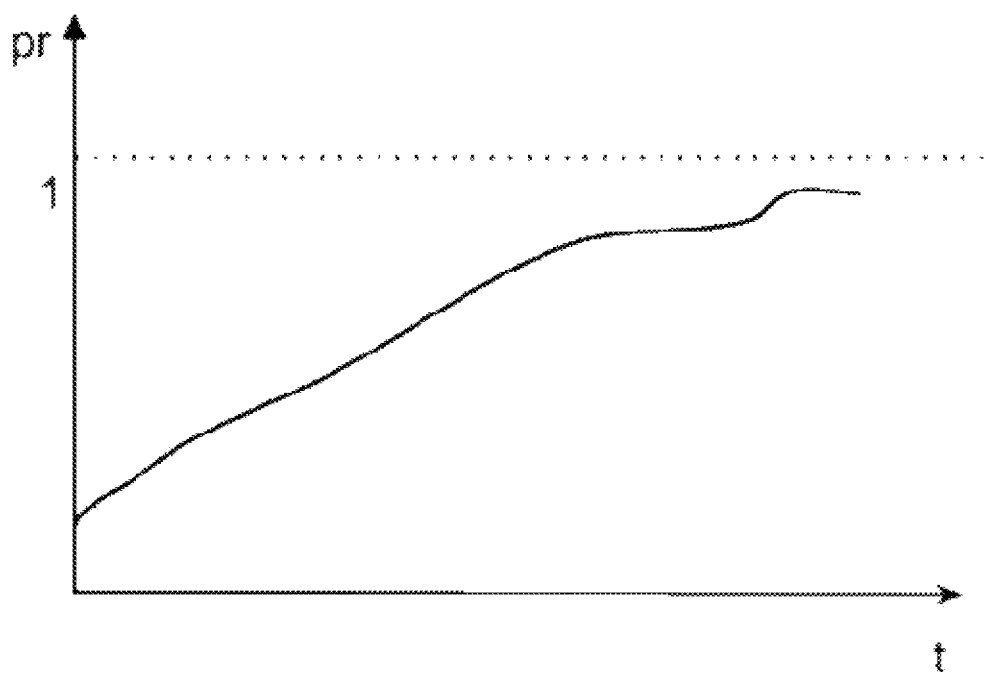
FIG. 3B is a plot illustrating relative cost as a function of time during training, according to one or more implementations.

A reference predictor may be selected such that it generally behaves worse than a main predictor but still follows the dynamics of costs of the main predictor (e.g., curves on FIG. 1 should be close for reference and for the main predictor). In some implementations, a single layer perceptron with sigmoidal outputs and mean square error distance function may be included in a good reference predictor. Linearity of a single layer may be included in some predictor process, and may be sufficient to achieve some performance on range of the tasks such as navigation, manipulation, fetch, and/or other tasks where it exhibits behavior of costs depicted in FIG. 3A. An example of relative performance with this reference predictor is shown on FIG. 3B.

If there is noise in the teacher signal, noise in the environment, and/or the robot has changed, costs may increase because the main predictor has not yet adapted accordingly. However, if relative costs are used, this effect of noise (or robot change) may be diminished because costs of reference predictor may also increase, but relative performance may not change significantly.

Different predictors may perform differently with different tasks. Sometimes a user may try different predictors on the same task to determine which predictor is better for that task. Sometimes a user may train a robot to do different tasks using the same predictor. To disentangle variations in the predictors from variations in the tasks, a relative performance number may be introduced that is independent of the main predictor $p_{rb}$:

$$p_{rb}(t)=1-C_r(t)/C_b(t) \qquad \text{(Eqn. 4)}$$

where $C_b$ (t represents costs computed using Eqn. (1) for a "blind" predictor, $C_r$ (t) represents costs computed using Eqn. (1) for a reference predictor.

The main predictor $P_{rb}$ may not depend on the main predictor the user chose to perform a task. If the reference predictor is fixed, $P_{rb}$ may be used to characterize the task complexity. Consider a case when reference predictor is a linear perceptron. If $p_{rb}$ is close to 1, then the task may be non-trivial so that the blind predictor cannot learn it, but simple enough for the linear predictor to learn it. If $p_{rb}$ is close to zero, then either task may be too complex for the linear predictor to learn or it is trivial so that blind predictor achieves a good performance on it.

In some situations, it may be important to show to the user that something in the training process went wrong (e.g., changes in the environment such as lighting conditions and/or other environmental conditions, the user changing a training protocol without realizing it, and/or other ways in which the training process can be compromised). To achieve that, changes may be detected in the flow of relative performance values ($p_{rb}$ (t), $p_r$ (t), $p_b$ (t)) using step detection algorithms. For example, a sliding average of p(t) may be determined and subtracted from the current value, and then normalized using either division by some max value or by passing into sigmoid function. The value may be presented to the user. An average of steps for different performance values may be determined and presented to the user. If the value is large, then something may have gone wrong, according to some implementations. For example, with $p_{rb}$ (t), if the environment changed but task is the same, then performance of the "blind" predictor may stay the same because it may be unaffected by task changes, but performance of reference predictor may drop.

In the case of using several reference predictors [p0 . . . pn] that are trained in parallel to the main one, performance numbers may be determined from any pair of them:

$$p_{ij}(t)=1-C_i(t)/C_j(t) \qquad \text{(Eqn. 5)}$$

where $C_i$ (t) represents costs computed using Eqn. (1) for a i-th reference predictor, $C_j$ (t) represents costs computed using Eqn. (1) for a j-th reference predictor.

Depending on the properties of those reference predictors, performance numbers may characterize task, main predictor, and/or the whole training process differently. For example, [p0 . . . pn] may include a sequence of predictors so that a subsequent predictor is more "powerful" than a previous one (e.g., "blind", linear, quadratic, . . . , look up table). The set of performance numbers may characterize how difficult is the task (e.g., only look up table predictor gets a good score vs. a task where linear predictor is already doing fine).

Reference predictors [p0 . . . pn] may include a sequence of predictors similar to the main predictor but with different parameters (e.g. learning coefficient). Performance numbers may be indicative of how noisy is the teacher signals and/or environment. In some implementations, if there a lot of noise, only predictors with a small learning coefficient may be able to learn the task. If training signals and features are clean (i.e., low or no noise), then a predictor with high learning coefficient may be able to learn the task.

A matrix of reference numbers $p_{ij}$ (t) for a given set of predictors [p0 . . . pn] for different tasks may be provided into a clustering algorithm, which may uncover clusters of similar tasks. After that during training a new task, this clustering algorithm may provide to the user a feedback that the current task is similar in properties to the task already seen (e.g., so that the user can make a decision on which training policy to pick).

Predictor apparatus and methods are disclosed herein, in accordance with one or more implementations. FIG. 4A illustrates an implementation of adaptive control system 400. The adaptive control system 400 of FIG. 4A may comprise a corrector 412, an adaptive predictor 422, and a combiner 414 cooperating to control a robotic platform 430. The learning process of the adaptive predictor 422 may comprise a supervised learning process, a reinforcement learning process, and/or a combination thereof. The corrector 412, the predictor 422 and the combiner 414 may cooperate to produce a control signal 420 for the robotic platform 410. In one or more implementations, the control signal 420 may comprise one or more motor commands (e.g., pan camera to the right, turn right wheel forward), sensor acquisition commands (e.g., use high resolution camera mode), and/or other commands.

In some implementations, the predictor 422 and the combiner 414 components may be configured to operate a plurality of robotic platforms. The control signal 420 may be adapted by a decoder component 424 in accordance with a specific implementation of a given platform 430. In one or more implementations of robotic vehicle control, the adaptation by the decoder 424 may comprise translating binary signal representation 420 into one or more formats (e.g., pulse code modulation) that may be utilized by given robotic vehicle. U.S. patent application Ser. No. 14/244,890 entitled "LEARNING APPARATUS AND METHODS FOR CONTROL OF ROBOTIC DEVICES", filed Apr. 3, 2014 describes some implementations of control signal conversion.

In some implementations of the decoder 424 corresponding to the analog control and/or analog corrector 412 implementations, the decoder may be further configured to rescale the drive and/or steering signals to a range appropriate for the motors and/or actuators of the platform 430.

In some implementations of the discrete state space control implementation of the corrector 412, the decoder 424 may be configured to convert an integer control index into a corresponding steering/drive command using, e.g. a look up table approach described in detail in, e.g., U.S. patent application Ser. No. 14/265,113 entitled "TRAINABLE CONVOLUTIONAL NETWORK APPARATUS AND METHODS FOR OPERATING A ROBOTIC VEHICLE", filed Apr. 29, 2014, the foregoing being incorporated herein by reference in its entirety.

The corrector 412 may receive a control input 428 from a control entity. The control input 428 may be determined based on one or more of (i) sensory input 402 and (ii) feedback from the platform (not shown). In some implementations, the feedback may comprise proprioceptive signals, such as feedback from servo motors, joint position sensors, and/or torque resistance. In some implementations, the sensory input 402 may correspond to the sensory input, described, e.g., with respect to FIG. 1, supra. In one or more implementations, the control entity providing the input 428 to the corrector may comprise a human trainer, communicating with the robot via a remote controller (wired and/or wireless). In some implementations, the control entity may comprise a computerized agent such as a multifunction adaptive controller operable using reinforcement and/or unsupervised learning and capable of training other robotic devices for one and/or multiple tasks. In one such implementation, the control entity and the corrector 412 may comprise a single computerized apparatus.

The corrector 412 may be operable to generate control signal 408 using a plurality of approaches. In some implementations of analog control for robotic vehicle navigation, the corrector output 408 may comprise target vehicle velocity and target vehicle steering angle. Such implementations may comprise an "override" functionality configured to cause the robotic platform 430 to execute action in accordance with the user-provided control signal instead of the predicted control signal.

In one or more implementations of analog correction provision for robotic vehicle navigation, the control signal 408 may comprise a correction to the target trajectory. The signals 408 may comprise a target "correction" to the current velocity and/or steering angle of the platform 430. In one such implementation, when the corrector output 408 comprises a zero signal (or substantially a null value), the platform 430 may continue its operation unaffected.

In some implementations of state space for vehicle navigation, the actions of the platform 430 may be encoded using, e.g., a 1-of-10 integer signal, where eight (8) states indicate 8 possible directions of motion (e.g., forward-left, forward, forward-right, left, right, back-left, back, back-right), one state indicates "stay-still", and one state indicates "neutral". The neutral state may comprise a default state. When the corrector outputs a neutral state, the predictor may control the robot directly. It will be appreciated by those skilled in the arts that various other encoding approaches may be utilized in accordance with controlled configuration of the platform (e.g., controllable degrees of freedom).

In some implementations of control for a vehicle navigation, the action space of the platform 430 may be represented as a 9-element state vector, e.g., as described in, e.g., the above referenced U.S. Patent Application '113. Individual elements of the state vector may indicate the probability of the platform being subjected to (i.e., controlled within) a given control state. In one such implementation, output 418 of the predictor 422 may be multiplied with the output 408 of the corrector 412 in order to determine probability of a given control state.

The adaptive predictor 422 may be configured to generate predicted control signal $u^P$ 418 based on one or more of (i) the sensory input 402 and the platform feedback (not shown). The predictor 422 may be configured to adapt its internal parameters, e.g., according to a supervised learning rule, and/or other machine learning rules.

Predictor realizations comprising platform feedback, may be employed in applications such as, for example, where: (i) the control action may comprise a sequence of purposefully timed commands (e.g., associated with approaching a stationary target (e.g., a cup) by a robotic manipulator arm), or where (ii) the platform may be characterized by platform state parameters (e.g., arm inertia, and/or motor response time) that change faster than the rate of action updates.

Parameters of a subsequent command within the sequence may depend on the control plant state; a "control plant" refers to the logical combination of the process being controlled and the actuator (often expressed mathematically). For example, control plant feedback might be the exact location and/or position of the arm joints which can be provided to the predictor.

In some implementations, the predictor 422 may comprise a convolutional network configured to predict the output 420 of the combiner 414 given the input 402. The convolutional network may be combined with other components that learn to predict the corrector signal given other elements of the sensory context. When the corrector 412 output comprises a zero signal (or null value), the combiner output 420 may equal the predictor output 418. When the corrector provides a non-zero signal, a discrepancy may occur between the prediction 418 and the output 420 of the combiner 414. The discrepancy may be utilized by the predictor 422 in order to adjust parameters of the learning process in order to minimize future discrepancies during subsequent iterations.

The sensory input and/or the plant feedback may collectively be referred to as sensory context. The sensory context may be utilized by the predictor 422 to produce the predicted output 418. By way of a non-limiting illustration, one exemplary scenario of obstacle avoidance by an autonomous rover uses an image of an obstacle (e.g., wall representation in the sensory input 402) combined with rover motion (e.g., speed and/or direction) to generate Context_A. When the Context_A is encountered, the control output 420 may comprise one or more commands configured to avoid a collision between the rover and the obstacle. Based on one or more prior encounters of the Context_A—avoidance control output, the predictor may build an association between these events as described in detail below.

The combiner 414 may implement a transfer function h(x) where x includes the control signal 408 and the predicted control signal 418. In some implementations, the combiner 414 operation may be expressed, e.g., as described in detail in co-owned U.S. patent application Ser. No. 13/842,530 entitled "ADAPTIVE PREDICTOR APPARATUS AND METHODS", filed Mar. 15, 2013, as follows:

$$\hat{u} = h(u, u^P). \quad \text{(Eqn. 6)}$$

Various realizations of the transfer function of Eqn. 6 may be utilized. In some implementations, the transfer function may comprise one or more of: addition, multiplication, union, a logical 'AND' operation, a logical 'OR' operation, and/or other operations.

In one or more implementations, the transfer function may comprise a convolution operation, e.g., a dot product. In spiking network realizations of the combiner function, the convolution operation may be supplemented by use of a finite support kernel (i.e., a mapping function for linear space to a non-linear space) such as Gaussian, rectangular, exponential, etc. In one embodiment, a finite support kernel may implement a low pass filtering operation of input spike train(s). In some implementations, the transfer function h may be characterized by a commutative property. (Eqn. 7)

In one or more implementations, the transfer function of the combiner 414 may be configured as follows:

$$h(0, u^P) = u^P. \quad \text{(Eqn. 8)}$$

In some implementations, the transfer function h may be configured as:

$$h(u, 0) = u. \quad \text{(Eqn. 9)}$$

In some implementations, the transfer function h may be configured as a combination of realizations of Eqn. 8-Eqn. 9 as:

$$h(0, u^P) = u^P, \text{ and } h(u, 0) = u, \quad \text{(Eqn. 10)}$$

In one exemplary implementation, the transfer function satisfying Eqn. 10 may be expressed as:

$$h(u, u^P) = (1-u) \times (1-u^P) - 1. \quad \text{(Eqn. 11)}$$

In one such realization, the combiner transfer function is configured according to Eqn. 8-Eqn. 11, to implement additive feedback. In other words, output of the predictor (e.g., 418) may be additively combined with the control signal (408) and the combined signal 420 may be used as the teaching input (404) for the predictor. In some implementations, the combined signal 420 may be utilized as an input (context) into the predictor 422, e.g., as described in co-owned U.S. patent application Ser. No. 13/842,530 entitled "ADAPTIVE PREDICTOR APPARATUS AND METHODS", filed Mar. 15, 2013, incorporated supra.

In some implementations, the combiner transfer function may be characterized by a delay expressed as:

$$\hat{u}(t_{i+1}) = h(u(t_i), u^P(t_i)), \quad \text{(Eqn. 12)}$$

where $\hat{u}(t_n)$ denotes combined output (e.g., 420 in FIG. 4A) at time t+Δt.

As used herein, symbol $t_i$ may be used to refer to a time instance associated with individual controller update events (e.g., as expressed by Eqn. 12), for example $t_1$ denoting time of the first control output, e.g., a simulation time step and/or a sensory input frame step. In some implementations of training autonomous robotic devices (e.g., rovers, bi-pedaling robots, wheeled vehicles, aerial drones, robotic limbs, and/or other robotic devices), the update periodicity Δt may be configured to be between 1 ms and 1000 ms.

In some implementations, the combiner transfer function may be configured to implement override functionality (e.g., override combiner). The "override" combiner may detect a non-zero signal provided by the corrector, and provide a corrector signal as the combined output. When a zero (or no) corrector signal is detected, the predicted signal may be routed by the combiner as the output. In some implementations, the zero corrector signal may be selected as not a value (NaN); the non-zero signal may comprise a signal rather than the NaN.

In one or more implementations of a multi-channel controller, the corrector may simultaneously provide "no" signal on some channels and "a" signal on others, allowing the user to control one degree of freedom (DOF) of the robotic platform while the predictor may control another DOF.

It will be appreciated by those skilled in the art that various other realizations of the transfer function of the combiner 414 may be applicable (e.g., comprising a Heaviside step function, a sigmoid function, such as the hyperbolic tangent, Gauss error function, logistic function, and/or a stochastic operation). Operation of the predictor 422 learning process may be aided by a teaching signal 404. As shown in FIG. 4A, the teaching signal 404 may comprise the output 420 of the combiner 414. In some implementations wherein the combiner transfer function may be characterized by a delay (e.g., Eqn. 12), the teaching signal at time $t_i$ may be configured based on values of u, $u^P$ at a prior time $t_{i-1}$, for example as:

$$u^d(t_i) = h(u(t_{i-1}), u^P(t_{i-1})). \quad \text{(Eqn. 13)}$$

The training signal $u^d$ at time $t_i$ may be utilized by the predictor in order to determine the predicted output $u^p$ at a subsequent time $t_{i+1}$, corresponding to the context (e.g., the sensory input x) at time $t_i$:

$$u^P(t_{i+1})=F[x_i,W(u^d(t_i))]. \qquad \text{(Eqn. 14)}$$

In Eqn. 14, the function W may refer to a learning process implemented by the predictor, e.g., a perceptron, and/or a look-up table.

In one or more implementations, such as illustrated in FIG. 4A, the sensory input 406, the control signal 408, the predicted output 418, the combined output 420 and/or plant feedback may comprise spiking signals, analog signals, and/or a combination thereof. Analog to spiking and/or spiking to analog signal conversion may be effectuated using, mixed signal spiking neuron networks, such as, for example, described in co-owned U.S. patent application Ser. No. 13/313,826 entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, and/or co-owned U.S. patent application Ser. No. 13/761,090 entitled "APPARATUS AND METHODS FOR GATING ANALOG AND SPIKING SIGNALS IN ARTIFICIAL NEURAL NETWORKS", filed Feb. 6, 2013, incorporated supra.

Output 420 of the combiner e.g., 414 in FIG. 4A may be gated. In some implementations, the gating information may be provided to the combiner by the corrector 412 using, e.g., an "override" indication in order to cause the robotic platform 430 to execute actions according to the user-provided control instead of the predicted control signal.

In one such realization of spiking controller output, the control signal 408 may comprise positive spikes indicative of a control command and configured to be combined with the predicted control signal (e.g., 418); the control signal 408 may comprise negative spikes, where the timing of the negative spikes is configured to communicate the control command, and the (negative) amplitude sign is configured to communicate the combination inhibition information to the combiner 414 so as to enable the combiner to 'ignore' the predicted control signal 418 for constructing the combined output 420.

In some implementations of spiking signal output, the combiner 414 may comprise a spiking neuron network; and the control signal 408 may be communicated via two or more connections. One such connection may be configured to communicate spikes indicative of a control command to the combiner neuron; the other connection may be used to communicate an inhibitory signal to the combiner network. The inhibitory signal may inhibit one or more neurons of the combiner the one or more combiner input neurons of the combiner network thereby effectively removing the predicted control signal from the combined output (e.g., 420 in FIG. 4).

The gating information may be provided to the combiner by another entity (e.g., a human operator controlling the system with a remote control and/or external controller) and/or from another output from the corrector 412 (e.g., an adaptation block, an optimization controller). In one or more implementations, the gating information may comprise one or more of: a command, a memory address of a register storing a flag, a message, an inhibitory efficacy, a value (e.g., a weight of zero to be applied to the predicted control signal by the combiner), and/or other information capable of conveying gating instructions to the combiner.

The gating information may be used by the combiner network to inhibit and/or suppress the transfer function operation. The suppression (or 'veto') may cause the combiner output (e.g., 420) to be comprised solely of the control signal portion 418, e.g., configured in accordance with Eqn. 9. In one or more implementations the gating information may be used to suppress ('veto') provision of the context signal to the predictor without affecting the combiner output 420. In one or more implementations the gating information may be used to suppress ('veto') the feedback from the platform.

In one or more implementations, the gating signal may comprise an inhibitory indication that may be configured to inhibit the output from the combiner. Zero combiner output may, in some realizations, may cause zero teaching signal (e.g., 414 in FIG. 4A) to be provided to the predictor so as to signal to the predictor a discrepancy between the target action (e.g., controller output 408) and the predicted control signal (e.g., output 418).

The gating signal may be used to veto predictor output 418 based on, for example, the predicted control output 418 being away from the target output by more than a given margin. The margin may be configured based on an application and/or state of the trajectory. For example, a smaller margin may be applicable in navigation applications wherein the platform is proximate to a hazard (e.g., a cliff) and/or an obstacle. A larger error may be tolerated when approaching one (of many) targets.

In one or more implementations, the gating/veto functionality may be implemented on a "per-channel" basis in a multi-channel controller wherein some components of the combined control vector may comprise predicted components, while some components may comprise the corrector components.

By way of a non-limiting illustration, if the turn is to be completed and/or aborted (due to, for example, a trajectory change and/or sensory input change), and the predictor output still produces turn instructions to the plant, the gating signal may cause the combiner to veto (ignore) the predictor contribution and pass through the controller contribution.

Predicted control signal 418 and the control input 408 may be of opposite signs. In one or more implementations, a positive predicted control signal (e.g., 418) may exceed the target output that may be appropriate for performance of as task. The control signal 408 may be configured to include negative signaling in order to compensate for over-prediction by the predictor.

Gating and/or sign reversal of controller outputs may be useful, for example, where the predictor output is incompatible with the sensory input (e.g., navigating towards a wrong target). Rapid changes in the environment (compared to the predictor learning time scale caused by e.g., appearance of a new obstacle, target disappearance), may require an "override" capability for the controller (and/or supervisor) to 'override' predictor output. In one or more implementations compensation for over-prediction may be controlled by a graded form of the gating signal.

In some implementations, the predictor learning process may be configured based on one or more look-up tables (LUT). Table 1 and Table 2 illustrate the use of look up tables for learning obstacle avoidance behavior.

Table 1 and Table 2 present exemplary LUT realizations characterizing the relationship between sensory input (e.g., distance to obstacle d) and control signal (e.g., turn angle α relative to current course) obtained by the predictor during training Columns labeled N in Table 1 and Table 2, present use occurrence N (i.e., how many times a given control action has been selected for a given input, e.g., distance). Responsive to the selection of a given control action (e.g., turn of 15°) based on the sensory input (e.g., distance from an obstacle of 0.7 m), the counter N for that action may be incremented. In some implementations of learning comprising opposing control actions (e.g., right and left turns shown by rows 3-4 in Table 2), responsive to the selection of one action (e.g., turn of +15°) during learning, the counter N for that action may be incremented while the counter for the opposing action may be decremented.

As seen from the example shown in Table 1, the controller may produce a turn command as a function of the distance to obstacle falling to a given level (e.g., 0.7 m). As shown, a 15° turn is most frequently selected during the training for sequence. In some implementations, the predictor may be configured to store the LUT (e.g., Table 1) data for use during subsequent operation. During operation, the most frequently used response (e.g., turn of) 15° may be output for a given sensory input. In some implementations, the predictor may output an average of stored responses (e.g., an average of rows 3-5 in Table 1).

TABLE 1

| d | α ° | N |
|---|---|---|
| 0.9 | 0 | 10 |
| 0.8 | 0 | 10 |
| 0.7 | 15 | 12 |
| 0.7 | 10 | 4 |
| 0.7 | 5 | 1 |
| ... | | |
| 0.5 | 45 | 3 |

TABLE 2

| d | α ° | N |
|---|---|---|
| 0.9 | 0 | 10 |
| 0.8 | 0 | 10 |
| 0.7 | 15 | 12 |
| 0.7 | −15 | 4 |
| ... | | |
| 0.5 | 45 | 3 |

In some implementations, the predictor 422 learning process may be configured to detect targets and/or obstacles based on sensory input (e.g., 402 in FIG. 2). In some implementations, the detection may be configured based on an operation of a multi-layer perceptron and/or a convolutional network.

Training apparatus and methods are disclosed herein, in accordance with one or more implementation. Exemplary implementations may facilitate identifying multiple solutions (also referred to herein as teaching mode) that have a value when training a robot. Depending on one or more of the type of robot, the task, the state of training, and/or other information, the teacher may switch from one teaching mode to another one to teach a behavior in the most effective manner.

In some implementations, the control signal may include a combination of a correction signal and a prediction signal. The correction signal may be given by a teacher (e.g., a human user controlling the robot and/or an algorithm mastering the task). The prediction signal may be learned while performing the task by a module called Predictor. The combination of the two signals may be performed by the combiner (e.g., ModeCombiner in the diagram below).

FIG. 4B illustrates an adaptive controller apparatus comprising a mode combiner for use with, e.g., the robotic apparatus of FIG. 1, according to one or more implementations.

There may be multiple behaviors the robot can perform when the teacher sends a correction signal. Examples of those behaviors may include one or more of:
Execute the correction and learn the association between the context and the correction;
Execute the correction but do not learn the association;
Integrate both the correction and the prediction (e.g., by adding them) and execute the resulting command;
Ignore the correction and execute the prediction; and/or
Other behaviors.

There may be one or more ways the robot can behave when the teacher is not sending any correction. Examples of those behaviors may include one or more of:
Execute the association it learned in the past (the prediction);
Don't do anything; and/or
Other behaviors.

Some implementations may provide five different modes that use a combination of what the robot does whether the teacher sends a correction or not. Those five combinations may assist teaching a behavior in the most effective manner.

In some implementations, the available modes may include one or more of Control, Listen, Override, Correct, Autonomous, and/or other modes. Exemplary implementations of various modes are described in the table below.

TABLE 3

| Mode | Action of the robot in presence of training input | Action of the robot in absence of training input |
|---|---|---|
| Control | Executes the action in accordance with the training input; Does not learn the association | Idle |
| Listen | Executes the action in accordance with the training input; Learns the association | Idle |
| Override | Executes the action in accordance with the training input; Learns the association | Executes the action in accordance with the prediction |
| Correct | Combine the teaching input and the prediction and execute the action un accordance with the combined signal. Learn the resulting association | Executes the action in accordance with the prediction |
| Autonomous | Ignore the teaching input and execute the action in accordance with the prediction | Executes the action in accordance with the prediction |

In some implementations, the available modes may be embodied in and/or effectuated by the combiner (also referred to herein as ModeCombiner).

The combiner mode may be changed either by the teacher (e.g., the human teaching the robot), and/or by an internal mechanism that determines the state the combiner should be in based on the internal of the system.

According to some implementations, the teacher may switch from one teaching mode to another one using the iPhone App, as depicted in the figure below.

Figure 18:
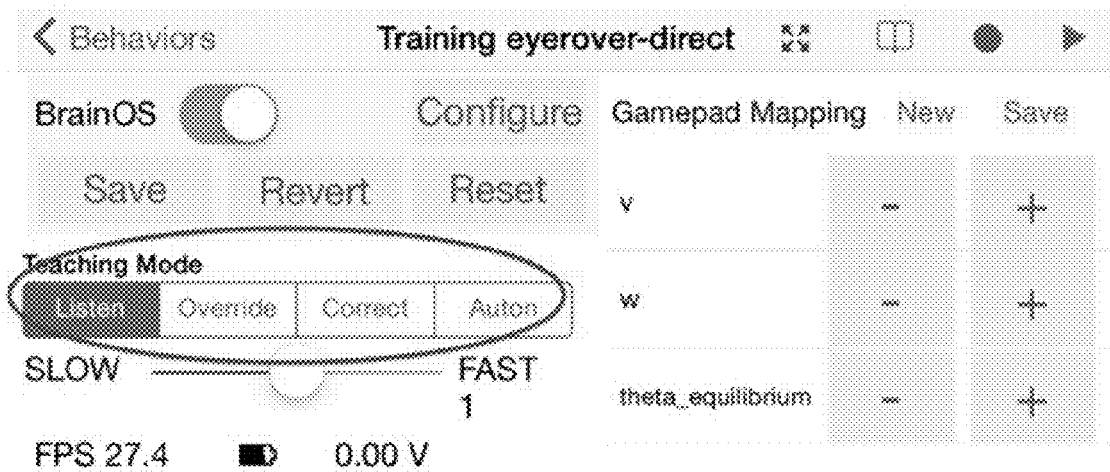
FIG. 18 presents one exemplary implementation of a correction screen with Listen mode activated, and Override Correct and autonomous mode available from the teacher control screen, in accordance with one or more implementations.

FIG. 18 illustrates an exemplary correction screen with Listen mode activated, and Override Correct and autonomous mode available from the teacher control screen, in accordance with one or more implementations.

In control mode, the robot may be remote controlled. Responsive to the teacher sending a correction, the robot may execute the command but may not learn the association. If the teacher is not sending any correction, then the robot may stay still. This mode may be useful when the teacher wants to control the robot without teaching (e.g., if the teacher is repositioning the robot to a starting position, but the teacher does not want the robot to do that on its own).

In listen mode, the robot may be "listening" to or otherwise observing what the teacher teaches, and may not do anything on its own. However, the robot may learn an association. But if the teacher stops sending a command, the robot may stay still and wait for the next command. In some implementations, teaching the robot may begin with the listen mode. Once enough examples have been provided and the robot has learned something, the override mode may be used.

In the override mode, the robot may execute what it has learned, unless a command is sent by the teacher. As soon as the teacher starts sending commands, the robot may stop taking the initiative and may let the teacher control it. For example, if the robot is turning left but the teacher wants the robot to turn right and provides a right turn command, then the robot may head the teacher's command, perform the action, and try to remember it for the next time the same situation occurs. Once a behavior only needs fine tuning, the correct mode may be used.

In the correct mode, the robot may integrate what the teacher commands with what the robot already knows. In some implementations, the robot may sum the teacher's command with what the robot already knows to get a final motor command. The teacher's correction may operate in this case as a deviation from the predicted command determined by the robot.

By way of non-limiting illustration, the robot may be driving full speed in a course. The teacher may want to teach the robot not to go so fast. A natural reaction for the teacher might be to press a "go-back button" on a gamepad used to provide commands to the robot. If the teacher does that in the override mode, which may tell the robot to drive backward, not to decrease its speed (the teacher still wants the robot to move forward in this context). The correct mode may be appropriate for this situation. The robots might say, "I like this blue trash bin over there, I am driving there as fast as I can," and the teacher may say, "Hey champ, you are going a little bit too fast, I would suggest that you reduce your speed." Both variables may be added or otherwise combined, and at the end the robot might think something like, "Well, I still like this bin, but maybe I should go there a little bit more carefully."

The autonomous mode may provide a way for the teacher to send a correction to the robot. In this mode, the learned behavior may be expressed without any changes or learning.

Figure 19:
FIG. 19 presents one exemplary implementation of operational sequence for a learning robotic device, in accordance with one or more implementations.

FIG. 19 illustrates one set of transition between teaching modes while learning a new task, in accordance with one or more implementations.

At operation 1902, the module may operate in the CONTROL mode. The teacher may tele-operate the robot and position it in a desired state.

At operation 1904, the teacher may switch to the LISTEN mode to initiate learning. The teacher may show a few examples of the task to the robot, but may not want the robot to interfere with the teacher's teaching during this process.

At operation 1906, after a stage of training, the teacher may switch to the OVERRIDE mode. The teacher may let the robot operate autonomously while retaining capability of providing correction(s) when the robot is not expressing the target behavior.

At operation 1908, the teacher may switch to the CORRECT mode. In this mode, the teacher may only provide small corrections (e.g., delta corrections) to optimize the behavior.

At operation 1910, once the teacher may determine that the behavior has been learned by the robot with a sufficient accuracy (e.g., based on an error determined with a based on a comparison of a target action performance and actual action performance), the teacher may switch the robot to the AUTONOMOUS mode, which may prevent any intervention from the teacher, and also provide a validation mode to test performance level.

In some implementations, switching from one mode to another may be done manually by the teacher (e.g., through a Smartphone App and/or other control mechanism). In some implementations, switching between modes may be based on an internal variable representing the state system (e.g., time, number of correction given, amplitude of the last n-corrections, quality of predictions, and/or other information).

Apparatus and methods for hierarchical learning are disclosed herein, in accordance with one or more implementations. In supervised learning, a user may train simple tasks by demonstrating example tasks to the system. To achieve an acceptable performance of a complex task by the system, the user may provide additional information to the system, in addition to examples. In particular, with the system, the user may organize simple "low level" behaviors into hierarchies and train extra "high level" classifiers or "switchers" to control which low level behaviors should be active in a given context. In some implementations, the user may select which particular information will be considered as relevant for a particular task. The user may select which particular prediction method will be used for a particular behavior.

For example, a task of playing fetch may be quite complex: the robot may be supposed to find an object, grasp it, and bring it back to base. In response to the robot not "seeing" the target, the robot may perform a random exploration behavior avoiding obstacles. In response to the robot being close to the target, the robot may perform a positioning maneuver and grasp the target. If the target is in the robot's gripper, the robot may find its way to the base avoiding obstacles and then release the object. The whole task may be highly nonlinear and/or noisy, so a very powerful classifier may infer the right sequence of actions from just the examples and be resistant to noise. The classifier may need to determine which particular input is important for a particular task. For example, a state of the gripper may not be relevant to target search behavior. Additional training may be needed to show the predictor that the search behavior should be performed independently of the state of the gripper.

According to exemplary implementations, the user may train a component of the fetch behavior. For example, the user may train how to search for a target and/or how to approach it while avoiding obstacles (e.g., "target approach"). The user may train the robot to perform a grasping behavior in various contexts (e.g., "grasping a target"). The user may assume the robot successfully grasped the target and train it to find its way to the base ("base approach"). While training a particular behavior, the user may concentrate on a particular behavior and may not show any examples of other behaviors thus making a prediction task for the classifier substantially easier (e.g., less computationally intensive). The user may have an opportunity to select which input is relevant for a particular behavior. For example, in some implementations, only the target and obstacle detection may be relevant to train a target approach, and/or only base and obstacle detection may be relevant to train a base approach. The user may select which actuators are controlled by a particular behavior. For example, navigation tasks may not need to learn to control the gripper. The user may have an opportunity to use a specialized predictor for different low level tasks. For example, a non-linear classifier may be used for target approach and a linear classifier may be used for grasping.

After achieving a reasonable performance in individual tasks, the user may create a hierarchy from these behaviors. The figure below shows one exemplary hierarchy, in accordance with one or more implementations.

Figure 9:
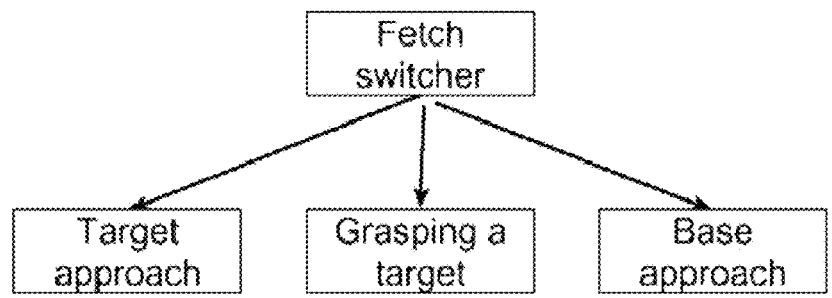
FIG. 9 is a functional block diagram depicting a fetch switching computerized apparatus, according to one or more implementations.
Figure 10A:
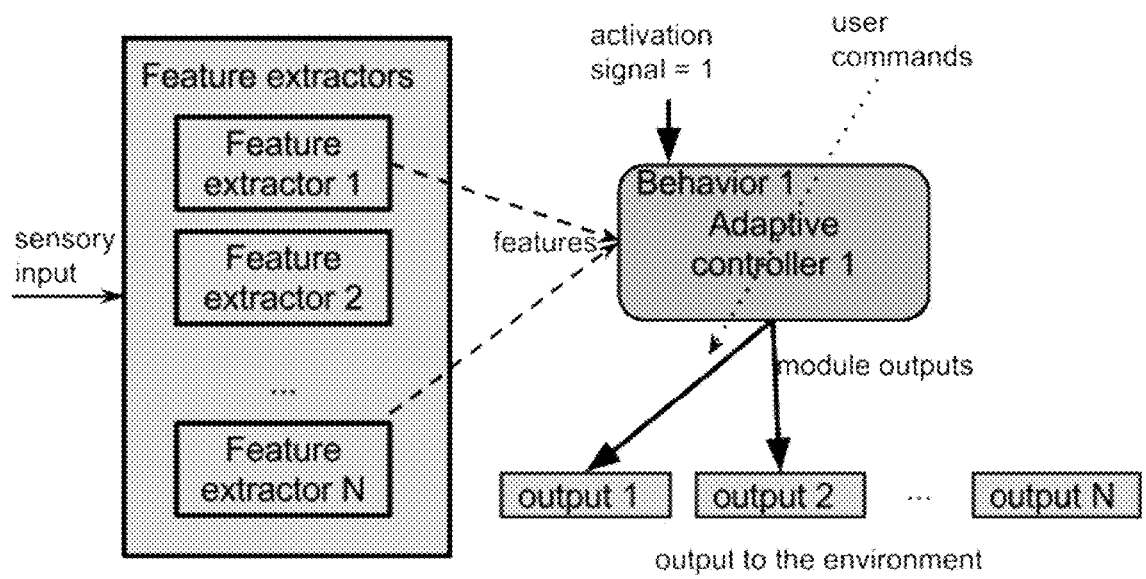
FIGS. 10A-10D illustrate BrainOS system comprising action selection mechanism, according to one or more implementations.
Figure 10B:
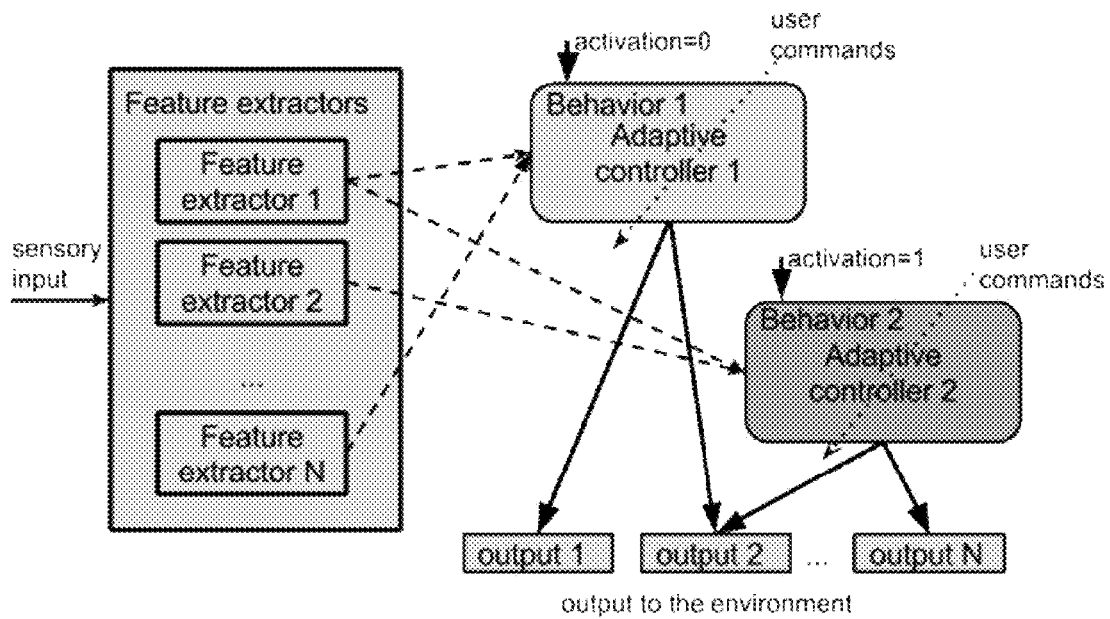
Figure 10C:
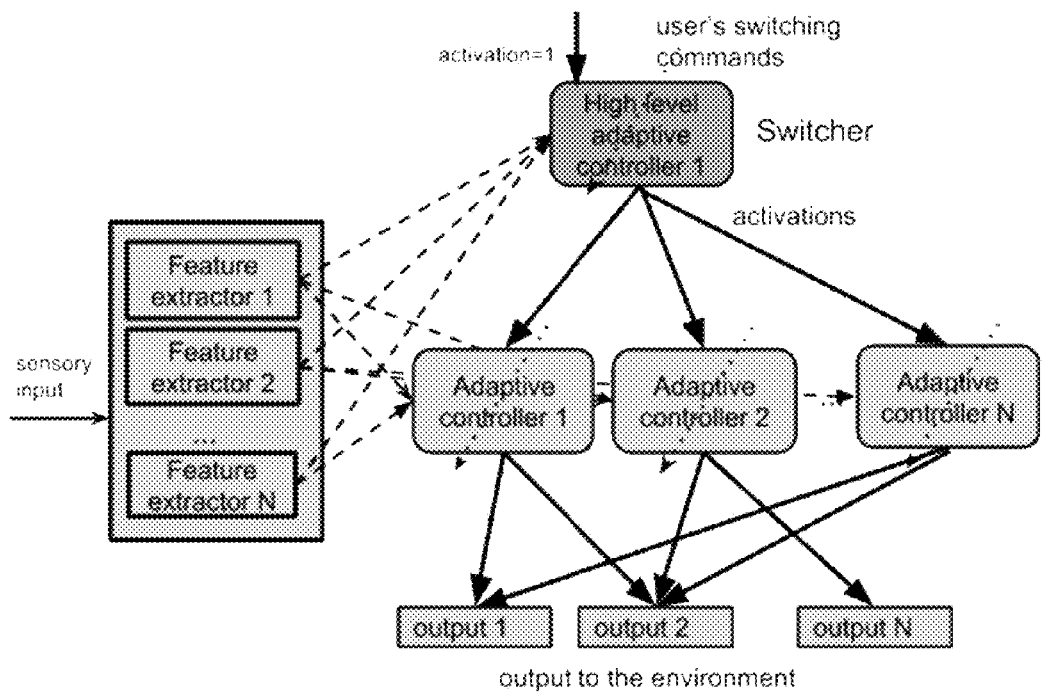
Figure 10D:
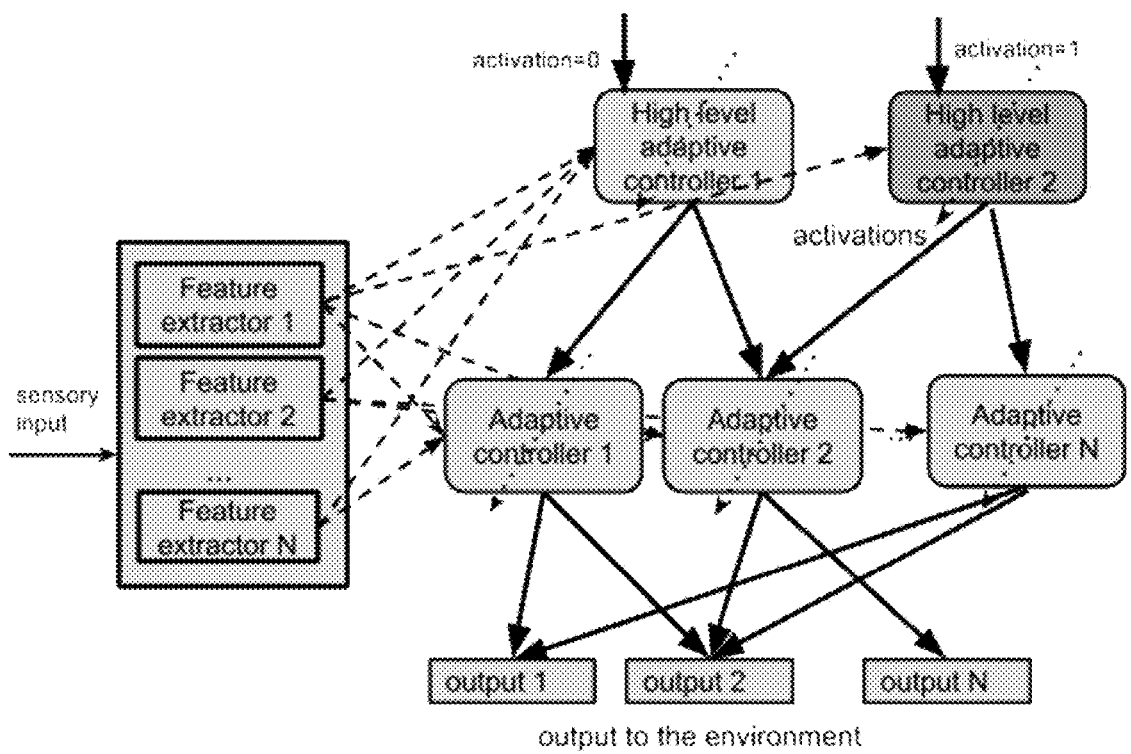
Figure 11A:
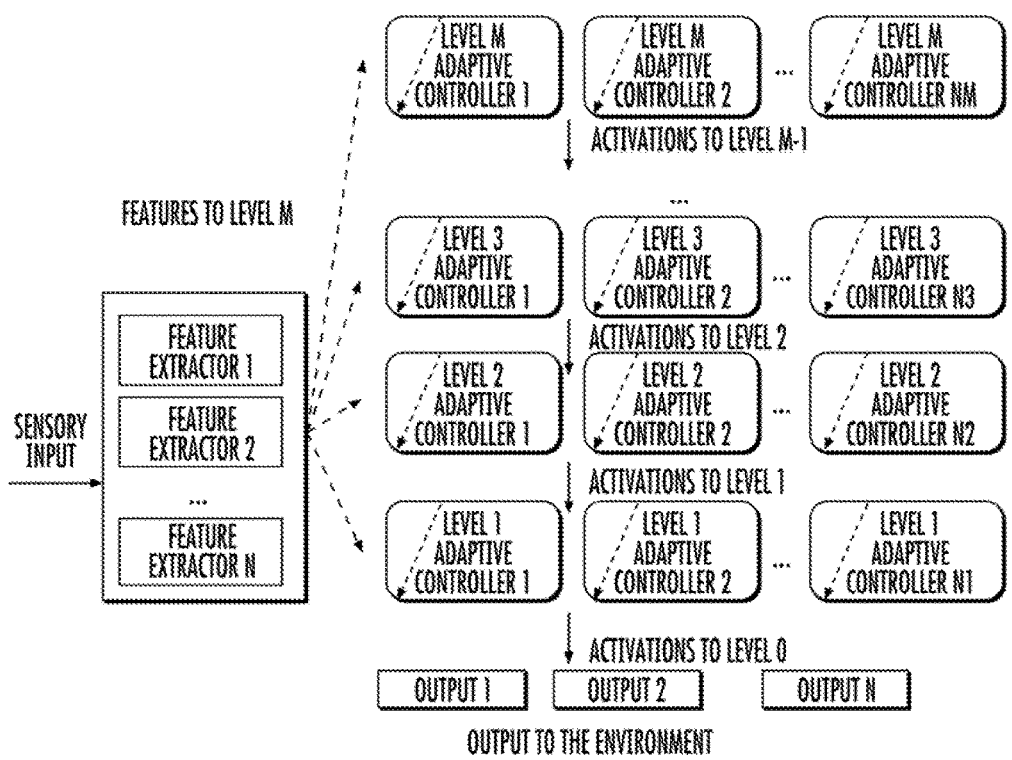
FIGS. 11A-11B present functional block diagrams depicting hierarchical learning architecture of the BrainOS, according to one or more implementations.
Figure 11B:
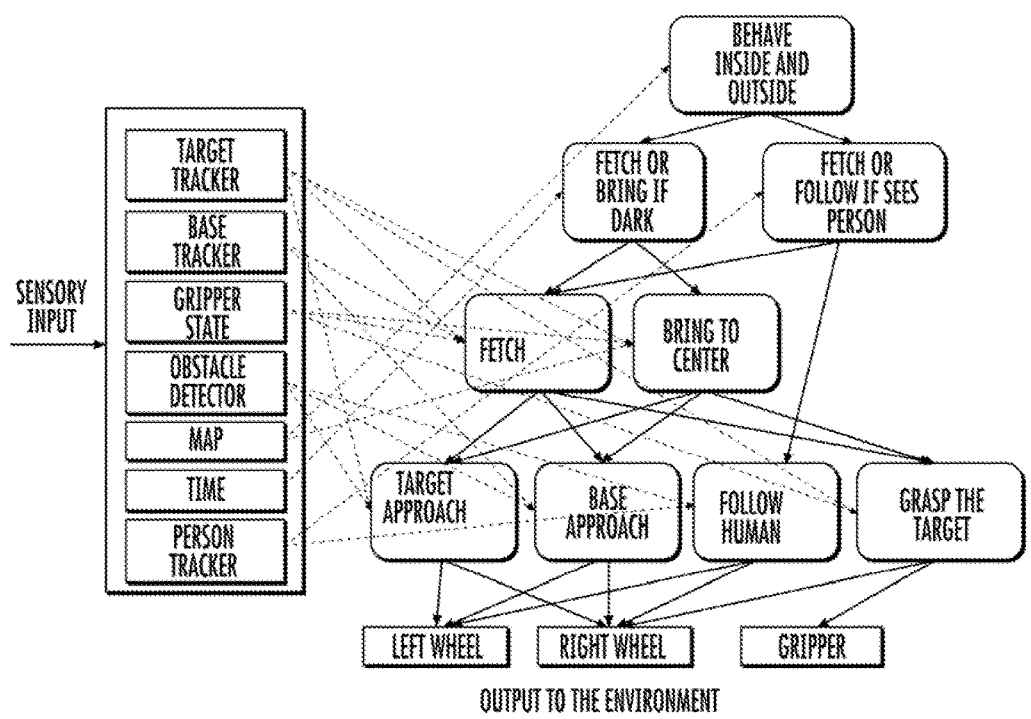
Figure 12A:
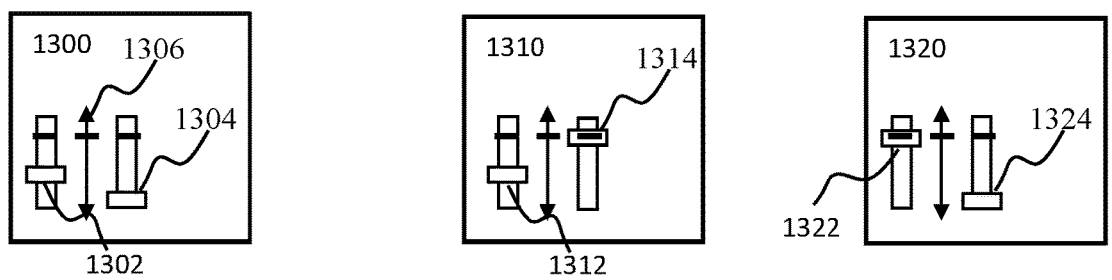
FIGS. 12A-12B are graphical illustrations depicting touchfader user interface for implementing supervised training of BrainOS, according to one or more implementations.
Figure 12B:
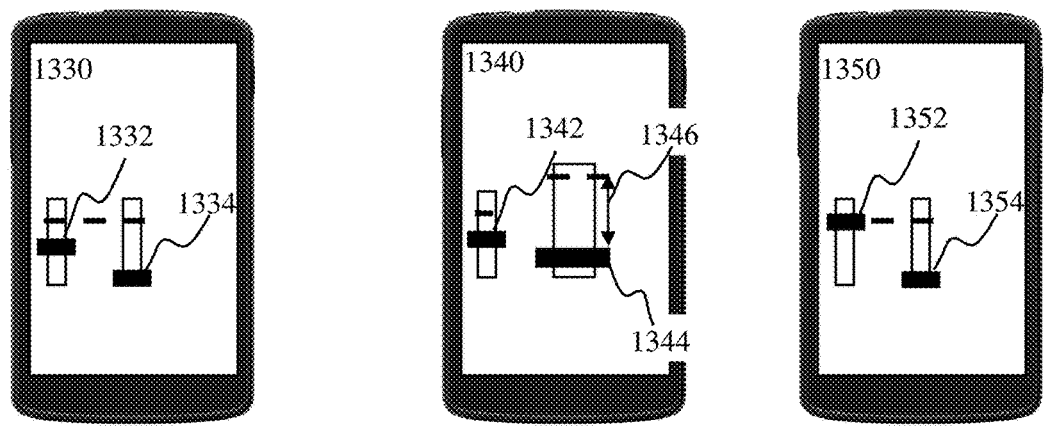

According to the hierarchy depicted in FIG. 9, the "Fetch switcher" may be a high level behavior that activates one or more low level behavior. Such activation may depend on the context. The user may train the "Fetch switcher" using supervised learning. For example, the user may demonstrate to the switcher which behavior it should select in a particular situation. The user may use a user interface for such demonstrations, according to some implementations. In some implementations, if the target is far or not visible, the user may send a "select target approach" command. If the target is close, the user may send a "select grasping a target" command. A classifier included in the switcher may learn to predict which module to select depending on visual context. The user may select which input is important for switching (e.g., obstacle detection may not be necessary in some situations).

Exemplary implementations of the system may support hierarchy graphs of different complexity. The following figure illustrates one example of a graph including one module, in accordance with one or more implementations.

The system may be configured to learn from user commands to control the environment (e.g. robot) by paying attention to features provided by the first and the last feature extractor. For example, the user may control the robot using a gamepad (or other input device used to provide "user commands") to approach the target while avoiding the obstacles ("Behavior 1") using input from target tracker ("FE 1") and from obstacle detector ("FE 1"). After a while "Adaptive controller" of type "1" (e.g., kNN classifier) may learn to approach the target autonomously generating correction torques on robot's wheels ("output1" and "output2") and may not control the gripper ("output N"). "Sensory input" may include input from the cameras and encoders.

Referring still to the figure above, the module may receive an activation signal. The activation signal may indicate whether a module should be active. In some implementations, the activation signal may include or convey a binary number where "0" means the module is not active and "1" means that module is active. If the module is active (highlighted green on the figure), then the module may process input features and/or teacher commands, and may provide an output. A non-active module may not by executed, which may save computational time on other operations.

The user may have an ability to perform managing operations on "Behavior 1". For example, the user may perform operations including one or more of change a name of a module, reset a module to naive state, revert a module to a particular point in history, delete a module, save/load locally, upload, download, and/or other operations. The user may change outputs and FE1. Such changes may depend on whether it is compatible with a trained behavior (e.g., dimensionality of features and outputs is preserved), in some implementations. The user may train a target approach. The user may change input from a target tracker to a base tracker so that robot will approach to base. A robot with multiple grippers may be trained to grasp with gripper 1 and user wired output from the adaptive module form gripper 1 to gripper 2.

After is user is done training a particular behavior, he may create another module and activate it. Such creation is depicted in the figure below, in accordance with one or more implementations.

The system may be configured to learn the second behavior from the user. Figure above shows that the user may select a different set of input features and a different set of outputs for "Behavior 2". The user may select a different type of the adaptive controller ("2"). For example, the user may control the robot using a gamepad (or other input device used to provide "user commands") to turn and grasp the target ("Behavior 2") using input from target tracker ("FE 1") and state of the gripper ("FE 2"). "Adaptive controller" of type "2" (e.g., perceptron classifier) may learn to turn the robot appropriately and grasp the target by autonomously effectuating correct torques on the robot's wheel ("output 2") and gripper ("output N"), while not controlling another wheel ("output 1"). "Sensory input" may include input from the cameras and encoders.

The user may perform the same managing operation with "Behavior 2". The user may manually (e.g., using a user interface) select which module should be active at a given time by sending different activation signals. "Behavior 2" may be active on the figure above (highlighted green) because it receives activation signal 1 and "Behavior 2" may not be active because it receives activation signals 0. The user may decide to train a target approach more by activating behavior 1, training it, and activating behavior 2 again. The user may have good two behaviors and uses manual switching (e.g., via a user interface) to give high level commands to the robot (e.g., "kick", "punch", "escape" in robotic fighting game).

After user is done training a set of "low level" behaviors, he may create a hierarchy with a switcher module on top, in accordance with some implementations. One example of such a hierarchy is depicted in the figure below.

The system may be configured to learn to switch between low level behaviors from the user's input. The figure above shows that the user may select a different set of input features for the switcher and a different set of modules to switch between (all low level behaviors are selected on the figure above). The user may train the switcher to switch between "Target approach", "Base approach", and "Grasp the target" based on features from one or more of the target tracker, the base tracker, the gripper state, and/or based on other information. The switcher may use different adaptive components (e.g., a stateful switch).

The output to the switcher may be wired to activation input ports of low level behaviors. In some implementations, the output of the switcher may be binary, so that switcher activates and/or deactivates particular modules. Deactivated modules may not be executed to save computational resources. In some implementations, the switcher may activate only a single module at a time.

The user may perform the same or similar managing operation as the switcher. The user may change which low level modules are controlled by the switcher. For example, the user may train fetch with a "Base approach" behavior so the robot does not drop the object near the base. The user may change output of the switcher to use "Base approach with dropping object". The user may customize complex behavior by changing which low-level modules are controlled by the switcher.

After the user is done training a single complex behavior, he may train another switcher to switch between different modules and therefore obtain the second complex behavior available in the system. This is illustrated in the figure below, in accordance with one or more implementations.

The switchers may have a different set of low-level modules to switch between. The user may activate different high-level behaviors (e.g. using a user interface) depending on what is the objective. For example, the first high level behavior may be find an object and bring it to the base, and the second high level behavior may be to take an object near base and bring it to the center of the room. In this case, several low level behaviors may be reused (e.g., grasping). The user may switch between bringing an object to the base or to the center of the room depending on the time of the day.

After training high-level switchers, the user may train even more high level switcher on top and then go on as much as he like creating arbitrary deep complex behaviors. This is illustrated in the figure below, in accordance with one or more implementations.

There may be no requirement that activations from level K should go to level K-1, in some implementations. It may be possible to send activations to any module in the system (e.g., from K level to level 1 or 0) as long as the graph of activations does not have loops, according to some implementations.

If activations are binary signals, then at individual time steps there may be an active path in the graph the leads from higher level to the outputs. Modules in an active path may be executed, while other modules may be dormant.

Referring to the figure below, which illustrates a dog behavior, the user may train fetch (e.g., two level behavior), stay close to a human (e.g., simple behavior), and bring object to center of the room. The user may train the third level switchers (e.g., one that switches between stay close to the person if person is identified and do fetch otherwise). The switcher may bypass the second level to activate the "follow a person" behavior. Another switch may switch between bring object to the center of the room if it is dark outside and do fetch otherwise. The user may trains a fourth level switcher that switches between do "fetch and close to human strategy" if robot is outside and do "fetch and bring object to the center" if inside the house.

Individual modules may support an interface of getting features, human teaching signal, and activation signal. Different modules may include different logic.

Some implementations may include float activations (e.g., from 0 to 1) so that a module scales its output accordingly. This scheme may allow organizing an adaptive weighted mixture of behaviors depending on the context.

In some implementations, e.g., such as described above in connection with FIGS. 4 and/or 10A-10B a random k-nearest neighbors (RKNN) approach may be used for associating sensory context with one or motor actions. In some implementations, the RKNN methodology may comprise online learning of predicting output y (e.g., motor commands) based on the input (e.g., plurality of features detected in sensory input).

The RKNN process may utilize a plurality of sensory inputs in order to predict motor command for controlling operation of a robot. In some implementations, the sensory input may comprise inputs characterized by different degrees of redundancy. In some implementations, the redundancy may be characterized by number of degrees of freedom (e.g., independent states) that may be conveyed by the input. By way of an illustration, a binary input (for example "ON"/"OFF") indicative of wheel rotation (or lack thereof), proximity sensor output (ON, OFF), battery level below threshold, and/or other binary input may be characterized by lower level of redundancy compared to other inputs (e.g., video, audio). In some implementations of robotic vision based navigation, the input space may be regarded as having high dimensionality and/or highly redundant, compared to other inputs (e.g., audio, touch). In one or more implementations, an input characterized by number of dimensions that may at least 10 times that of be greater than number of dimensions of another input may be referred to as highly dimensional and/or highly redundant, compared to the other input.

When a highly redundant input may be augmented with data of lower redundancy, the highly redundant data may overwhelm the less redundant data when determining response of a KNN classifier.

The RKNN process may partition available data into subsets comprising a given number of features from the lower-dimension/lower redundancy data. The given number of features associated with lower-dimension/lower redundancy data may be referred to as the mandatory feature(s). As used herein the term feature may be used to describe one or more integer or floating point values characterizing the input, e.g., the presence or absence of an edge, corner, shape, texture, color, object, at particular locations in the image, values of pixels in an image, patches of color texture, brightness in the image, and/or in the image as a whole; properties of the mentioned features, such as size, orientation, intensity, predominance with respect to the surround, of an edge, corner, shape, texture, color, object; the position of one of the features in the image or the relative position of two or more of the above mentioned features; changes in features across consecutive frames—changes in position (optic flow), intensity, size, orientation; the pitch, intensity, spectral energy in specific bands, formants of sounds, the temporal changes thereof, disparity measure between two or more images, input from proximity sensors (e.g., distance, proximity alarm, and/or other), motor feedback (e.g., encoders position), motion sensor input (e.g., gyroscope, compass, accelerometer), previous motor commands or switching commands, a binary/Boolean categorical variable, an enumerated type, a character/string, and/or practically any characteristic of the sensory input.

Mandatory-feature RKNN approach may be utilized for determining associations between occurrence of one or more features (also referred to as context) and control output configured to cause an action by a robotic device.

Predicted output associated with individual subsets may be combined (e.g., averaged) to produce predicted output of the RKNN process. Selecting the number of neighbors within a subset, the subset size, and/or the number of subsets may be used to trade-off between speed of computations, and accuracy of the prediction.

By way of an illustration of operation of a robotic device controller (e.g., 400 in FIG. 4A), sensory input (e.g., 402 comprising a sequence of video frames, inertial motion measurement, motor actuator feedback) may be analyzed using RKNN process in order to determine (predict) motor control signal (418). Sensory input may comprise a plurality of features (e.g., representations of objects determined using video data). In some implementations, the RKNN process may comprise configuring a plurality of N KNN classifiers to process randomly selected subsets of features. For a given classifier $C_i$ (e.g., 1408 in FIG. 14), a random subset $x_i$ of features may be selected from a pool of potential features $x=\{x_1 \ldots x_n\}$. As used herein, the term "classifier" may be used to describe a data processing operation configured to provide an output y (e.g., motor control command) based on analysis of a plurality of inputs $x_i$ (e.g., pixels of a digital image).

During training, for a given occurrence of the input x (e.g., sensory features) and the output y (e.g., training input/correction signal) the associations may be determined using methodology described with respect to FIGS. 14-15 below.

The selection process may comprise, for a given classifier $C_i$ of the plurality of classifiers (i=1 ... N):
a) selecting a subset $x_i$ of features x, wherein individual subsets may comprise a mandatory feature (e.g., $x_1$ in FIG. 14); and
b) appending the entry $(x_i, y)$ to the classifier $C_i$.

Figure 14:
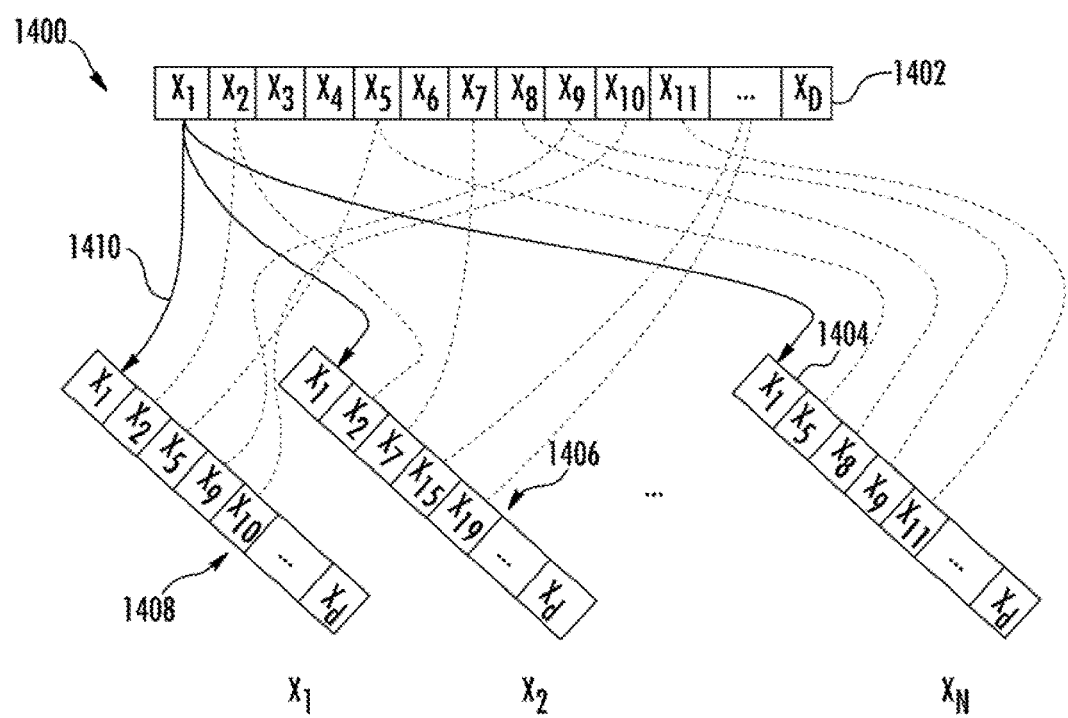
FIG. 14 is a block diagram illustrating selection of a plurality of subsets configured using mandatory feature RKNN approach according to one or more implementations.
Figure 15:
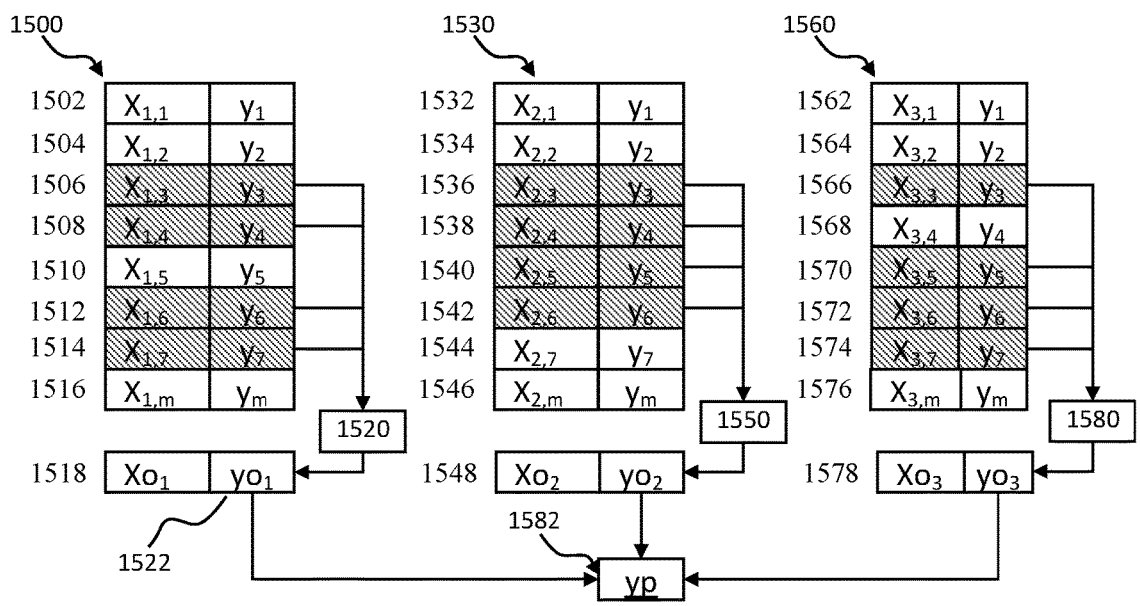
FIG. 15 illustrates determination of a predicted output by an RKNN classifier apparatus, according to one or more implementations.

In some implementations, individual classifiers Ci may comprise a table (e.g., the tables 1500, 1530, 1560 in FIG. 15). In the implementation illustrated in FIG. 14, the first feature $x_1$ may denote the mandatory feature that may be selected for classifiers Ci in every KNN classifier's feature set. The rest of the d−1 features may be selected at random from the population of features (e.g., the input of D features, where D>d). In one or more implementations, a single classifier C1 may be configured based on a randomly selected d−1 features from highly redundant input and one (or more) features from less redundant input.

During operation, in order to compute the output y for a given input x, one or more (k) entries within individual classifiers Ci may be used to determine N output values yi of the output y. For a given classifier Ci, individual output yi may be determined based on a first statistical operation of the k-values of y obtained during training. In one or more implementations, the first statistical operation may comprise determination of a mean, median, mode, adaptively weighted mean, and/or other operation. The output y may be determined using a second statistical operation configured based on the N outputs yi of individual classifiers. In one or more implementations the second statistical operation may comprise determination of a mean, median, mode, adaptively weighted mean, and/or other operation.

FIG. 15 illustrates an exemplary configuration for producing output yp configured based on input x using N=3 classifiers and k=4 nearest neighbors. Tables 1500, 1530, 1560 in FIG. 15 may represent three classifier Ci instances corresponding to, e.g., index selection described by elements 1408, 1406, 1404. Individual rows 1502, 1504, 1506, 1508, 1510, 1512, 1514, 1516, 1532, 1534, 1536, 1538, 1540, 1542, 1544, 1546, 1562, 1564, 1566, 1568, 1570, 1572, 1574, 1576 may denote training pairs (x,y) produced during training at time instances t1, t2, t3, t4, t5, t6, t7, tm. In tables 1500, 1530, 1560, $X_{ij}$ may denote input wherein:
index i may denote the classifier (i=1 ... 3);
index j may denote the time instance (j=1 ... n);
yj may denote the training signal, Xo may denote input during operation;
$yo_i$ may denote individual classifier output; and
yp may denote the predicted signal.

For a given time instance, the inputs $X_{1,1}$, $X_{2,1}$, $X_{3,1}$ in rows 1502, 1532, 1562, respectively, may be produced using a respective plurality of input features (e.g., the input 1402 in FIG. 14). Rows 1518, 1548, 1578, may denote data pairs (x,y) corresponding to classifier operation configured to produce a predicted output yp based on occurrence of the input Xo.

Hashed rectangles in FIG. 15 (e.g., as in row 1506) may denote the nearest neighbors as determined during operation of a respective classifier (e.g., 1500). Components 1520, 1550, 1580 may denote operation that may be used to determine classifier output. In one or more implementations, the operations of components 1520, 1550, 1580 may comprise of one or more statistical operations that may comprise determination of a mean, median, mode, adaptively weighted mean, adaptively weighted selection, and/or other methodologies that may be used to determine classifier output (e.g., 1522) based on a plurality (e.g., 4 in FIG. 15) nearest neighbors (e.g., 1506, 1508, 1512, 1514). In some implementations, output $yo_1$ $yo_2$ $yo_3$ of individual classifiers 1500, 1530, 1560 may differ from one another due to different nearest neighbor selection. As illustrated in FIG. 15, rows 1506, 1508, 1512, 1514 may be selected by the classifier 1500, rows 1536, 1538, 1540, 1542 may be selected by the classifier 1530, rows 1566, 1570, 1572, 1574 may be selected by the classifier 1560. Outputs of individual classifiers 1500, 1530, 1560 may be utilized in order to determine the predicted output yp using component 1582. In one or more implementations, the operations of the component 1582 may comprise of one or more statistical operations that may comprise determination of a mean, median, mode, adaptively weighted mean, and/or other methodologies that may be used to determine the output 1582).

The dimension d of the subset xi may be determined based on the dimension D of the input x as follows, in some implementations:

$$d = \text{floor}(\sqrt{D}).  \quad \text{(Eqn. 15)}$$

Selecting processing parameters (e.g., d, N, k, and/or statistical operations) a trade-off between speed and accuracy may be adjusted.

With heterogeneous, multimodal feature vectors, adjusting processing parameters (e.g., d, N, k) may cause modification of the relative impact of the different types of features. By way of an illustration, if D=1024*1024*3+3, d may be determined using Eqn. 15, (d=1773). Accordingly, individual classifier may be characterized by a probability of p=0.0017 of using an audio feature. In order for an audio feature to be of influence with a level of certainty (e.g., greater than 50%) an impractically large ensemble size N may be required to see any effects of the audio features.

In some implementations of on-line learning for robot navigation, the input vector x may be configured by concatenating the RGB values of the pixels in an image (e.g., obtained using video camera 166 in FIG. 1) and an additional 1-channel binary signal derived from the motor state. The mandatory feature (e.g., the feature x1 described above with respect to FIG. 14) may be selected to comprise the 1-dimensional binary motor state.

In order to facilitate contributions from different types of signals for determining a distance measure between features in a metric space (e.g., Euclidian distance), data from highly redundant input (e.g., the RGB pixel values) may be normalized. Various other distance measures (metrics) may be utilized, e.g., Mahalanobis, Manhattan, Hamming, Chebyshev, Minkowski, and/or other metrics.

In some implementations, the normalization may comprise shifting and/or scaling input features to a given value range (e.g., A1=64 to A2=196 for an 8-bit pixel value, 0 to 1 range, and/or other range). In one or more implementations, the normalization may be configured based on determining an on-line estimate of the mean and standard deviation of feature values to obtain z-score for individual feature (pixel). In one such implementation, for a given pixel (e.g., pixel at location (i1,i2)) a pair of values may be stored in history memory: one for the pixel mean and another for the pixel standard deviation. In some implementations, one or more parameters related to history of the input (e.g., pixel statistics) may be computed over a given interval, and/or the total duration of training. In one or more implementations, the learnings process may be configured to enable a user to reset contents of the parameter (e.g., pixel statistics).

In some implementations, data for one or more inputs may be scaled by a parameter NF, where NF is configured based on the overall number of features of a given feature types (i.e., the number of pixels in a subset t). In some implementations, the scaling parameter may be selected from the range between $\sqrt{NF}$ and 10×NF.

In some implementations, feature scaling operation may comprise determining an average distance measure for a plurality of input feature instances (e.g., distance between 2-100 images for images acquired at 25 fps) and scaling the input in accordance with the average distance measure. Various scaling implementations may be employed, e.g., scaling the less redundant input, scaling the highly redundant input, and or combination thereof. The scaling operation may enable reducing disparity between contributions to the distance determination from a highly redundant input (e.g., video and/or other input) and less redundant input (e.g., audio, touch sensor, binary, and/or other input).

The feature scaling may be configured based on an observed and/or an expected characteristic or characteristics of a feature that may be salient to the action. By way of an illustration of an implementation of vision based robotic navigation, size of a target, e.g., number of pixels and/or cumulative pixel value corresponding to a ball 174 in FIG. 1, may be used to scale pixel values within a visual frame such that pixels of the target associated with the rescaled input may contribute comparably to the distance determination as a binary input feature (e.g., indicative of wheel rotation (or not), proximity sensor output (ON, OFF), battery level below threshold, and/or other binary input). In some implementations, the scaling configured based on observed and/or expected characteristic of a feature may be referred to as input equalization.

When determining feature-action associations, traditional RKNN methodologies of the prior art may discount data provided via sensor modalities (e.g., audio, touch) characterized by fewer dimensions (fewer features) compared to other modalities (e.g., video). In some implementations of the present disclosure, a normalization operation may be applied to data of individual sensory modalities. The normalization operation may be used to increase and/or decrease contribution of data of one modality relative contribution of data of another modality to the RKNN distance determination. In some implementations, the normalization may comprise selecting a given number of mandatory features (e.g., the feature x1 described above with respect to FIG. 14). Selecting a number m of mandatory features may ensure that at least m out of d features may contribute to distance determination. In the exemplary implementation described above with respect to FIG. 14, probability of the mandatory occurrence in the feature subset $x_i$ is equal one: P=1. Probability of occurrence of the remaining features in the subset $x_i$ is P0<1.

In some applications wherein data from two modalities with greatly different number of features (e.g., video and audio) may be used with RKNN, distance between any two samples may be dominated by the sensory modality with greater number of features (e.g., video).

Equalization may be applied so that contribution of individual sensory modality on expected distances may be comparable relative contribution from another modality data. In some implementations, the equalization may comprise determining an on-line estimate of the mean and standard deviation of individual features; using the on-line estimates to calculate a normalizing constant Cs for individual sensory modality s such that the expected Euclidean distance between two samples, measured only using the features in modality s is 1.0. Weighting data of a given modality (to further reduce the mean squared error) as training parameters that may be optimized during training RKNN approach may be employed for determining the relative importance of the features for producing a given output. Feature relevance may be determined based on an error measure produced by individual KNN classifiers that contain those features. In some implementations, more relevant (e.g., "better") feature for a given output, may correspond to a lower error of individual KNN classifier(s) that may contain that feature.

In some implementations, e.g., such as described with respect to FIGS. 14-15, computational load on a feature detection system may be reduced by selecting a small number of classifiers N, e.g., N<D/d, so that a portion of the total available features may be used by a given classifier instance. In some implementations, the number of classifiers may be selected from range between 3 and 10, and number of used features may be selected between 5% and 50% of the total available features. By way of an illustration, for input comprising a digital frame of 12×12 pixels and three color channels (e.g., RGB, YUV, and/or other color model), using N=5 classifiers corresponds to d=floor($\sqrt{12 \times 12 \times 3}$)=20, features per classifier. Accordingly, d*N/D=5*20/432=23% of the available features from the original data may be used.

In one or more implementations, the computational load for a classification system may be characterized by being able to perform between 10 and 20 classifications per second (CPS) processing video input comprising a sequence of RGB frames of 12×12 pixel resolution refreshed at 25 frames per second. The processing system may comprise an embedded computer system comprising a processing component (e.g., Qualcomm Snapdragon 805/806) comprising a CPU component capable of delivering 210 Mega-Floating-point Operations Per Second (MFLOPS) and a GPU component capable of delivering 57 GFLOPS with maximum combined power draw of no more than about 2.5 W.

In some implementations, the RKNN may be utilized in order to determine a feature ranking parameter at a target rate (e.g., 15 CPS) while conforming to the processing load capacity and/or power draw limit by periodically re-initializing individual KNN classifiers on a rotating basis (i.e., not all at once) with a random set of features.

In order to re-populate the KNN classifier subsets (e.g., 1404, 1406, 1408 in FIG. 14), a history buffer may be utilized in order to store previously occurring training data (e.g., instances of the input 1402 in FIG. 14). Upon producing the updated random indexes, the feature relevance may be obtained using the history buffer data. In some implementations, an updated set of features may be determined randomly "just in time," or everything could be scheduled at once when the whole ensemble is first initialized to deterministically establish how much data would be used to calculate feature importance.

In some implementations of RKNN classifiers, feature assignment for a KNN classifier may be biased using a random process. By way of an illustration, random process used for selection of indexes for a classifier may be biased to increase probability of features with a higher utility within the input (e.g. 1402 in FIG. 14) to be included in the subset (e.g., the subsets 1404, 1406, 1408). The magnitude of the bias regulating the trade-off between how quickly the subset may converge to a set of features versus how much time the subset may spend exploring new combinations of features.

In one or more implementations of RKNN, ensembles evolutionary algorithms (EA) may be employed. The evolving population may comprise population subsets of the classifiers. The genotype/phenotype characterizing the EA process may comprise the particular subset of features chosen for a given classifier. Low-utility classifiers may be culled from the population. New classifiers are may be produced by recombining and/or mutating the existing genotypes in the population of classifiers. The EA approach may produce a higher-performing ensemble of KNN classifiers, compared to existing approaches.

Apparatus and methods for behavioral undo during training of robots are disclosed herein, in accordance with one or more implementations. In some implementations, a robotic device may comprise a controller operating a software component (e.g., the BrainOS® software platform) configured to enable training A user may control/training the robot with a remote device (e.g., comprising a Gamepad® controller and an iOS® application, and/or a handset device (e.g., a smartphone)). Training of the robot's controller may be based on the user observing robot's actions and sending one or more target control commands to the robot via the training handset. The trained controller of the robot may comprise a trained configuration configured to enable autonomous operation (e.g., without user input) by the robotic device. The trained configuration may be stored. A saved configuration may be loaded into the robot being trained thereby providing one or more trained behaviors to the robot. In some implementations, the trained configuration may be loaded to one or more other robots in order to provide learned behaviors. Subsequent to loading of the saved configuration, the controller learning process may match process configuration being present during saving of the configuration.

In some implementations, the BrainOS configuration may be stored (saved) automatically based on timer expiration (e.g., periodic saving) and/or based on an event (e.g., triggered by a user and/or based on a number of issued control commands).

The autosave timer interval T may be configured by the user via, e.g., interface of the training handset. In some implementations, the user may configure the controller process to save BrainOS configuration when the user may issue a command (correction) to the robot using the training handset. In one or more implementations, the training configuration may be saved upon receipt of n commands from the user (n≥1).

In some implementations, user commands (corrections) may arrive in one or more clusters (e.g., a plurality of commands) that may be interleaved by periods of user inactivity (e.g., training a race car to traverse a racetrack). In one or more implementations, a given command (e.g., the first, the last, and/or other command) in the cluster may trigger saving of the configuration.

In one or more implementations, the BrainOS may be configured to execute periodic and event-based autosave mechanisms contemporaneously with one another.

Trained behaviors of the robotic device may be configured based on learning of associations between sensory context (e.g., presence of an obstacle in front of the robotic vehicle) and a respective action (e.g., right turn) during training It may be beneficial to remove one or more trained behaviors from the trained configuration of the controller. In some implementations, the trained behavior removal may be based on one or more of performance below a target level, changes of the robot configuration (e.g., replacement of a wheel with a skate), changes in the robot's environment, learning of erroneous associations, and/or other causes.

The BrainOS software platform may be configured to save one or more parameters characterizing the learning process and/or the learned behaviors. In some implementations, the saved parameters may be used to produce (recreate) the BrainOS instance, for example, specify the sensory processing algorithms used for learning, describe learning algorithms. In one or more implementations, the saved parameters may be used to characterize learning parameters (e.g., the learning rate, weights in an artificial neuron network, entries in a look up table, and/or other parameters).

For example, the configuration saving may comprise storing of weights of a neural network may characterize mapping of the sensory input to motor outputs; and/or weights of feature extractor network component that may be used to process the sensory input.

The BrainOS software platform may be configured to enable users to selectively remove a learned behavior (and/or a portion thereof) via an undo and/or time machine operation.

At a given time, a user indication may be used to trigger an UNDO operation. In some implementations, the UNDO operation may comprise loading of the previously saved configuration. By loading at time t1 the configuration saved at time t0<t1, the robot controller effectively 'forgets' what it learned in time interval t0<t<t1.

The user UNDO indication may be configured based on one or more of the user activating a user interface element (e.g., a physical and/or virtual touch-screen button), a voice command, a gesture, and/or other actions, in one or more implementations. One or more undo indications may be utilized in order to remove multiple behaviors (and/or multiple versions of a given behavior). By a way of an illustration, pressing Ctl+Z in a MS Word® may effectuate UNDO of successive edits. Similarly, providing a plurality of UNDO indicating may cause removal of multiple learned associations.

Figure 5:
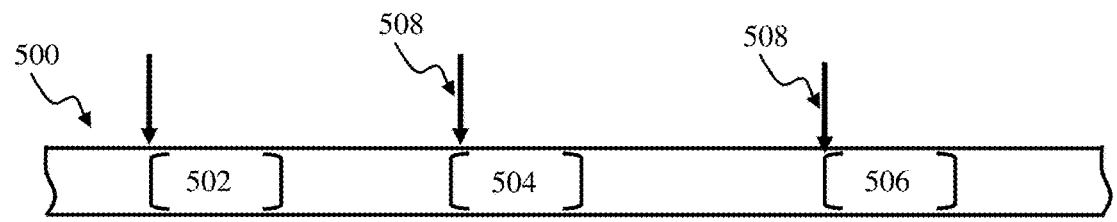
FIG. 5 is a functional block diagram illustrating use of a timeline comprising multiple bookmarks for implementing training undo functionality, according to one or more implementations.
Figure 6:
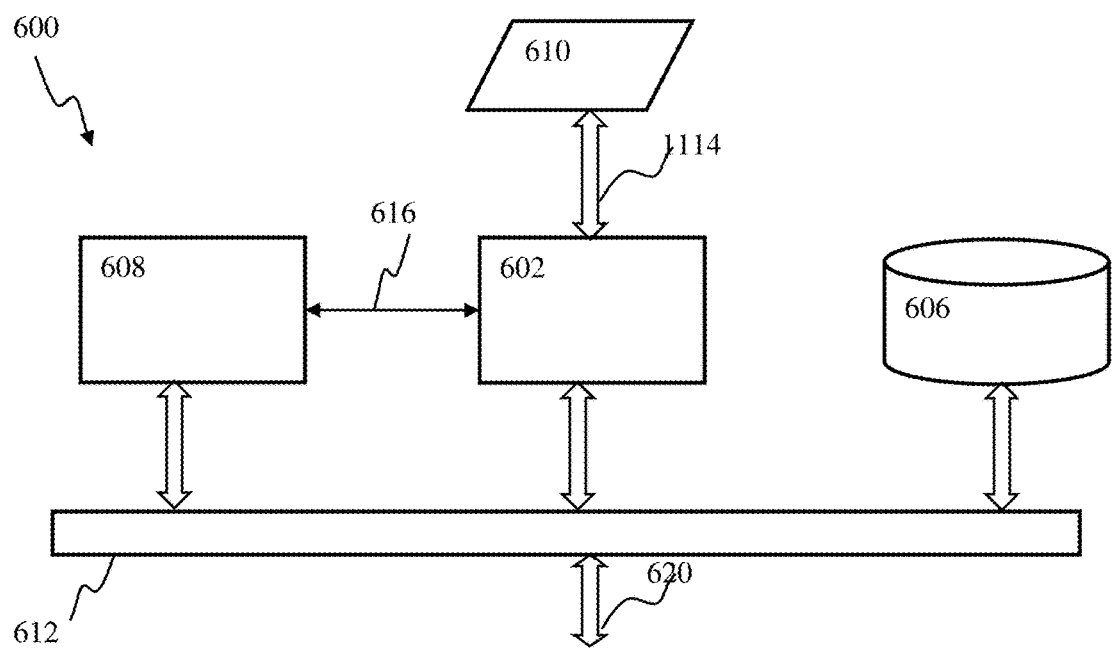
FIG. 6 is a functional block diagram depicting a computerized data processing system configured for salient feature detection, according to one or more implementations.
Figure 7:
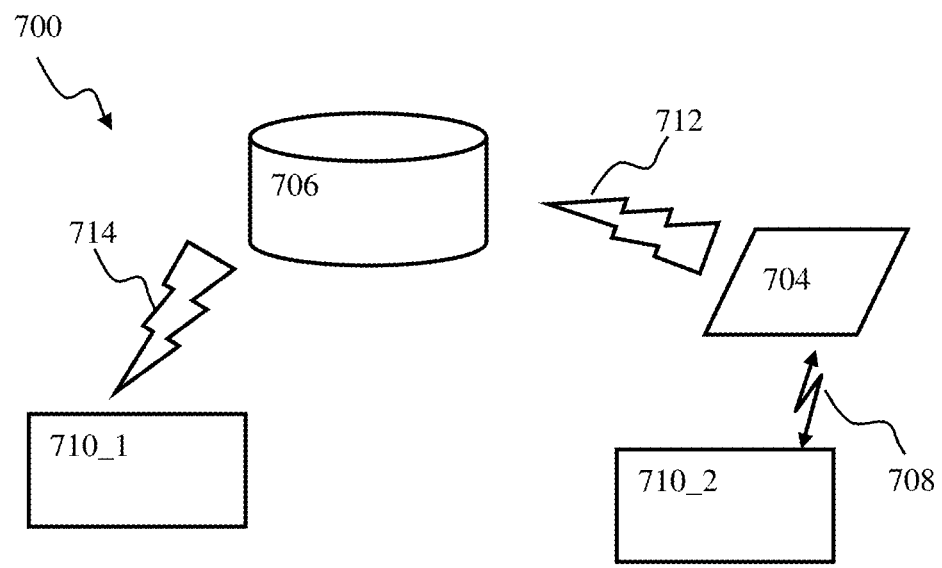
FIG. 7 is a functional block diagram depicting a system comprising salient feature detection apparatus, according to one or more implementations.

In one or more implementations, the undo operation may be effectuated using a timeline comprising, e.g., a plurality of bookmarks (e.g., shown in FIG. 5) indicative of one or more date/time, context, action, and/or other attributes of association learning. A user may select a given bookmark in order to restore (undo) the learning configuration to the state corresponding to time of the bookmark. For example, user may tap on a selected marker (representing a saved state) a slider may be used to navigate on this timeline combination of above.

Combiner apparatus and methods are disclosed herein, in accordance with one or more implementations. In some implementations of supervised training of robots, control instructions (also referred to as corrections) produced by the trainer (e.g., human) may be combined with control instructions produced by the robot controller instructions (predictions).

In some implementations, the trainer may be provided with the control of the robot during training Upon completion of the training, the robot may be configured to operate autonomously. In one or more implementations, training may comprise periods of autonomous operation and periods of learning, wherein trainer's control input may be combined with the robot's internally generated control.

The BrainOS software platform may be configured to enable online learning wherein trainer's input may be combined with the internally produced control instructions in real time during operation of the robotic device. That is, the input from the trainer may be applied to have an "on-line"

effect on the robot's state during training. The robot not only learns to move forward in this sensory context, but it also actually moves forward into some new sensory context, ready to be taught from the new location or configuration.

By way of an illustration, when training a remotely controlled car using a joystick, the car may be trained to navigate a straight trajectory (e.g., autonomously move forward). Subsequently, a trainer may elect to commence training of one or more turn behaviors (e.g., turn left/right/turnaround/drive in a circle and/or other maneuvers). The trainer may use the joystick to provide left/right turn commands to the car to train it to turn. In one or more implementations, the trainer may assume the control during the turn action and/or provide the turn instructions incrementally (e.g., in three 30° increments to complete 90° turn).

Conversely, the car may be trained to follow a circle. In order to train the car to follow a straight line the trainer may utilize the joystick to provide the training input. In some implementations, the trainer may utilize the joystick forward position in order to override the car internal control input and to cause it to proceed forward. In one or more implementations, the trainer may utilize the joystick left/right position in order to provide an additive control input so as to guide the car to proceed in a straight line.

Controller of the robot may comprise a combiner component configured to effectuate the process of combining the training input (correction) with the internally generated control (prediction). In some implementations, the combiner may be configured to allocate a greater priority (e.g., larger weight) to the correction input, e.g., to implement "the trainer is always right" mode of operation. When the robotic platform (e.g., the car) may comprise multiple degrees of freedom (DOF), the training process may be configured to operate (e.g., train) a given DOF at a given time.

In some implementations, the combiner component may be operable in accordance with a Full Override process, wherein input by the trainer takes precedence (e.g., overrides) the internally generated (predicted) control signal. When operable in the override mode, the controller may learn the context-action association and produce predicted control signal. However, the prediction may not be acted upon. By way of an illustration of training a robot to traverse an obstacle course, the full override combiner may enable the trainer to communicate to the controller of the robot which actions to execute in a given portion of the course given the corresponding sensory context (e.g., position of obstacles). Use of the Full Override combiner process may reduce number of trials required to attain target level of performance, reduce probability of collisions with obstacles thereby preventing damage to the robot.

In some implementations, the combiner component may be operable in accordance with an Additive Combiner process. When operable in the Additive Combiner mode, the trainer's control input may be combined with the predictor output. In some implementations, the trainer's input and the predicted control may be configured in "delta" space wherein the controllable parameter (e.g., correction 408 in FIG. 4A) may be used to modify the existing state of the system (e.g., comprising motor torque and/or robot platform acceleration) rather than indicating a target value (setpoint). In some implementations, the delta control approach may be utilized with a continuously varying robot state parameter (e.g., speed, orientation). In one or more implementations, the delta control approach may be used for manipulating a discrete state (e.g., training a controller of an elevator).

For example, if the target angle is 45°, the trainer's input may initially exceed the target angle in order to reduce learning time. Subsequently as the robot begins to move its current trajectory towards the target (e.g., towards 45°), the trainer may reduce the input angle in order to prevent overshooting the target trajectory angle.

The Additive Combiner process may advantageously enable training of a one DOF at a given time instance thereby facilitating training of robotic devices characterized by multiple DOF. During training of the robot using the Additive Combiner process, the trainer and the robot contribute to the output (execute action). The trainer may adjudge the learning progress based on a comparison of the trainer's contribution and the action by the robot. The Additive Combiner process may facilitate provision of small corrections (e.g., heading change of a few degrees to direct the robot trajectory along 45° heading). In some implementations wherein default state of the robot's controller may be capable of providing control output that may operate the robot within a range from the target trajectory (e.g., drive forward in a straight line). The Additive Combiner may provide an economical approach to correcting the default trajectory to the target trajectory. By way of an illustration, natural predisposition of a randomly-initialized neural network may be sufficient for some behaviors (e.g., the neural network may have a tendency to turn away from certain obstacles without training.) This means that memory resources (e.g., weights) of the learning controller process may not have to be modified in some cases. When the predictor may select an action that may be acceptable to the trainer, network memory modifications may not be required. The network may be idiosyncratic in the way it performs certain tasks or actions, but reduced computational resources are required for achieving performance.

During training of a robot by a human trainer using the Additive Combiner, the teacher may encounter an appealing experience as the robot may begin to take over (assist) as the training progresses. Such experience may encourage the trainer (particularly a novice) to perform training of robots.

In some implementations, the combiner (e.g., 418 of the controller 400 in FIG. 4A) may be operable in a Touchfader Override (TO) mode. When operable the TO mode the combiner may weigh the trainer's input (408) with a greater weight compared to the predicted signal (418) thereby implementing the override functionality. The TO combiner implementation may comprise a user interface configured to (i) convey to the trainer configuration of the combiner (e.g., weights associated with the teaching input and predictor output); and enable the trainer to provide small (e.g., less than 20% of the combined value) corrective adjustments. The interface illustrated in FIGS. 13A-13B may be utilized with, e.g., delta-based control (e.g., varying motor torque) and/or position-based control (e.g., varying robot's position).

Figure 13:
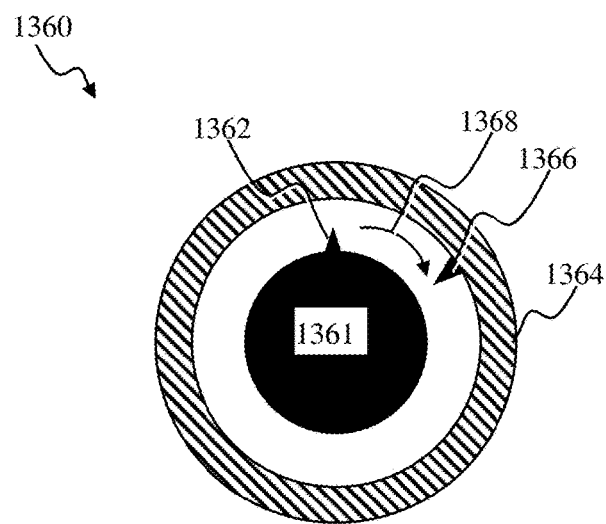
FIG. 13 is a graphical illustration depicting a mechanical touchfader user interface, according to one or more implementations.

In some implementations, e.g., such as illustrated in FIG. 13C, the Touchfader combiner may comprise a physical interface wherein the current value of the control changes may be provided in a manner visible to the user by moving the physical element (a physical slider, a knob (e.g., 1361 in FIG. 13C, and/or another control element). The trainer may apply a small amount of force to the physical control element in order to make slight adjustments (corrections), or a large force to make substantial adjustments (overrides).

In some implementations, e.g., such as illustrated in FIG. 13B, the Touchfader may comprise a proximity sensitive interface (e.g., a touchscreen) effectuated using a static (e.g., built in appliance) and/or portable computing device (e.g., a smartphone). In some implementations, the touchscreen interface may provide magnification of controllable element (e.g., area around the location of the current control) this simulates the resistance of the physical control, but on an easier-to-implement touch screen.

In some implementations, the touchfader combiner may comprise overriding control methods, the user can implement "virtual additive" function by touching the screen just a bit to the left or to the right of the slider's current position.

In one or more implementations, the combiner (e.g., 414 in FIG. 4A) may comprise an Additive-Override Hybrid (AOH) process. The AOH process may function as an additive process for small (e.g., 10% or less of the total value) corrections. For inputs that are in excess of the threshold, the AOH process may implement an overriding combiner functionality. In some implementations wherein the predictor p, and the teaching c (corrector) signals may be configured in the range between −1 And 1, the AOH process logic may be expressed as follows:

If $p > R \times c$, $b = c$;

else $b = p + c$;    (Eqn. 16)

where b denotes the combiner output (e.g., 430 in FIG. 4A), and R denotes the threshold (selected from the range between 0 and 0.2 in some implementations). In one or more implementations, the AOH combiner may comprise an interpolation operation configured to provide a smooth transition between branches of the logical expression of Eqn. 16.

In some implementations, the interpolation may be expressed as follows:

$$b = p + c - p\left(\frac{|p - c|}{|p| + |c|}\right)$$    (Eqn. 17)

where
 p, predictor signal in [−1 1];
 b, motor control (combiner output) signal in [−1 1];
 c, corrector signal in [−1 1].

In some implementations, the combiner may be operable in accordance with the Threshold Nonlinearity (TN) process. The TN combiner process may be configured to provide additive and override functionality depending on the relative magnitude of the correction and prediction components. In some implementations, the TN combiner operation may be configured as follows:

$b = p + c$, $b = 1$ when $b > 1$;

$b = -1$ when $b < -1$;    (Eqn. 18)

where
 p, predictor signal in [−1 1];
 b, motor control (combiner output) signal in [−1 1];
 c, corrector signal in [−2 2] range.

The combiner of Eqn. 18 may be operated to provide additive functionality. A threshold nonlinearity of the combiner of Eqn. 18 may be configured such that large corrector input (in excess of the maximum magnitude of the predicted component, e.g., 2) may be used to override the predictor component. By way of an illustration of an autonomous robot approaching an obstacle, when predicted output (e.g., −1) may cause a collision with the obstacle, an additive combiner with maximum correction signal value of 1 may be unable to prevent the collision. Using corrector signal range (e.g., from −2 to 2) that may exceed the predictor signal range (e.g., from −1 to 1) and the combined signal range (e.g., from −1 to 1). In the above example, the correction input of 2 may be used to effectively override the (erroneous) predicted output and guide the robot away from the obstacle.

The combiner of Eqn. 18 may be employed with the delta control process wherein the controllable parameter (e.g., correction 408) may be used to modify the current value of the system state (e.g., vehicle acceleration, motor torque, and/or other parameter) rather than indicating a target value (setpoint). In some implementations, the delta control approach may be utilized with a continuously varying robot state parameter (e.g., speed, orientation). In one or more implementations, the delta control approach may be used for manipulating a discrete state space controller (e.g., controlling an elevator, a pick and place manufacturing robot, a shelve stocking robot and/or other control application).

Systems and methods for training path navigation are disclosed herein. In some implementations, a robot may be trained to follow a path. The image shift determination may inform the robot of whether the robot is too far off to the left or right. The robot may adjust its heading to compensate. A PID controller may be used to add necessary negative feedback to make the system stable in following the path, in some implementations. Prior information about where in the training sequence the robot is currently operating may guide the robot in making correct inferences about new camera images, and may help the robot narrow the search space to gain computational efficiency.

One or more implementations described herein may provide a mechanism for enabling a robot to learn navigating a target trajectory while reducing deviation from a target path. In some implementations, the robot may comprise a robotic vehicle (e.g., 160 in FIG. 1) comprising a camera (e.g., 166). The robot may comprise a controller configured to store a sequence of images obtained during training phase. In some implementations, the images may be stored in an ordered buffer in a non-volatile memory (e.g., memory 814 in FIG. 8).

Figure 20A:
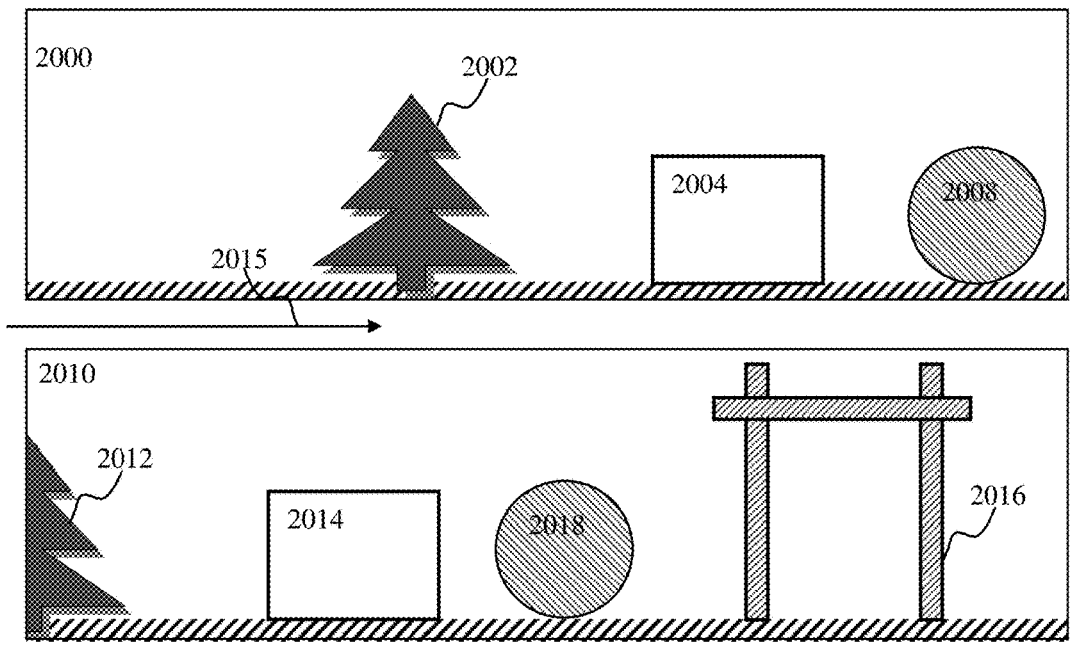
FIG. 20A presents exemplary images for use with training of path navigation, in accordance with one or more implementations.

FIG. 20A illustrates exemplary images for use with training of path navigation. Images 2000, 2010 may be obtained with a variety of sensors, e.g., a video camera, IR camera, RADAR, SONAR, LiDAR, ultrasonic imager, and/or other device. In some implementations, the camera may be spanning the entire horizontal view field of 360 degrees. A 360 degree horizontal view field may provide additional information about robot's environment and enable cyclical shift of images.

In one or more implementations, images 2000, 2010 may be obtained with a camera 166 mounted on a robotic vehicle 160 of FIG. 1. Images 2000, 2010 may comprise representations of visual field that may be obtained at times t1<t2, respectively. The image 2000 may comprise representations one or more objects, e.g., a tree 2002, a rectangle, a ball 2008, and/or other objects. During motion of the vehicle 160 relative position and/or orientation of the camera and the visual scene may change. By way of an illustration, the vehicle 160 may execute a right turn. The image 2010 may be obtained subsequent to the turn execution. Representation of objects in the image 2010 may be shifted relative representations of the same objects in the frame obtained prior to the turn execution. Additional object representations (e.g., 2016 in FIG. 20A) may appear, while representations of some object that may be present in one image (e.g., 2000)

may be absent from the subsequent image (e.g., 2010). Comparing image 2010 to image 2000, representations of the tree 2012 the rectangle, 2014, and the ball 2018 are shifted (horizontally) within the frame 2010 relative representations, 2002, 2004, 2008 in the frame 2010. The amount of the shift may be configured based on relative motion between the images (e.g., motion speed and time interval t2–t1 between the images). It may be further noticed from comparing images 2000 and 2010 that the ball 2018 in image 2010 may be disposed closer to the rectangle 2014 compared to distance between respective object representations 2008, 2004 in image 2000.

During training, images (e.g., raw and/or pre-processed) may be stored in a memory buffer (training buffer). In one or more implementations, preprocessing operations may comprise resampling, cropping, light balancing, and/or feature extraction. Motor commands issued by a trainer corresponding to time instances when the images are acquired may be stored. Additional sensory information (e.g., vehicle motion information, ambient environment information, vehicle operational parameters) corresponding to time instances when the images are acquired may be stored.

During autonomous operation, control process of the robot may be configured to compare a given (e.g., the most recent, current) image with one or more the images from the training buffer. In some implementations, the matching process may comprise comparing the given image to every image in the training buffer.

For computational efficiency reasons, it may not be desirable and/or feasible to compare each new camera image with every one of the stored images seen during training, according to some implementations. The robot may take advantage of the prior information about what are the likely regions of the path where it might be located, and only search those regions. The robot may search a random sample of other regions in case the prior information is inaccurate or invalidated for some reason.

In order to reduce computational requirements of the image match process, the given image may be compared to a subset of images from the training buffer using image match process described in detail below.

In some implementations, the search space may be narrowed using a form of particle filtering, where the robot maintains a plurality of particles indicating the likely parts of the path. That is, individual particle points at a particular image from the training buffer. As a new camera image arrives, the robot may search those images in the training buffer which are close to the particles. Individual particles may be moved to a nearby location in the training buffer where the stored image matches closely with the newly arrived image. Particles with poor match with the new image may be deleted. New particles may be created, either in the vicinity of the other particles, or from randomly sampled locations in the training buffer, shown in FIG. 22.

The comparison subset of images may comprise a plurality of previously matched images and a plurality of randomly selected images (e.g., 20 in some implementations). The previously matched images may correspond to one or more tracked sequences (also referred as particles). The particle characterized by the best match (e.g., comprising previously used image) may be referred to as the primary particle. In some implementations, the best match image may be complemented by one or more second best image matches, corresponding to secondary particles.

The given image may be compared to images of the primary particle set. In some implementations, the primary particle set may comprise a previously used image I0 (e.g., 2000 in FIG. 20A), one or more (e.g., 2) images preceding the I0 image in time in the training buffer, and one or more (e.g., 5) images following the I0 image in time in the training buffer.

In one or more implementations, the given image may be compared to images of one or more secondary particle set(s). A secondary particle set may comprise the previously identified second best IS1 and one or more (e.g., 2) images following the IS1 image in time in the training buffer. In some implementations, the secondary particle set may further comprise one or more (e.g., 2) images preceding the IS1 image in time in the training buffer. In one or more implementations, additional secondary particle sets of images may be configured in the manner that is described above. The particle sets and the randomly selected images may be referred to as the match search set.

In some implementations, the given image may be compared to images (e.g., 10-50) that may be randomly selected from images in the training buffer.

Image match process may be configured as follows, in accordance with one or more implementations. The amount of shift (e.g., in x and/or in y directions) between the given image and individual images of the match search set may be determined using the phase correlation approach. To determine whether the new image is shifted left or right compared with a stored image, a cross-correlation between the two images (e.g., 2000, 2010 in FIG. 20A) may be determined. The argmax of the cross correlation (e.g., maximum of the correlation magnitude) may correspond to the most likely (x,y) shift amount. Arrow 2015 in FIG. 20A denotes amount of shift between the images 2000 and 2020. If the images are identical except for a shift, then the cross-correlation may be 1 at the corresponding x,y shift.

In some implementations, the cross-correlation between two images may be determined by utilizing the spatial frequency domain. A windowing function (e.g., Hann, Gaussian, cosine, Hamming, and/or other windowing function) may be applied to individual images to produce windowed image and reduce edge effects. A fast-Fourier transform (FFT) may be performed on the windowed images to obtain a spatial frequency representation of the images. Normalized cross-power spectrum may be determined from the two spatial frequency representations. An inverse FFT may be applied to transform the cross spectrum to x,y domain and to obtain the cross-correlation. The argmax of the cross-correlation may be determined in order to obtain x,y coordinates (shift values) corresponding to maximum cross-correlation. In some implementations wherein x,y dimension may correspond to integer values (e.g., 1 pixel), the cross-correlation matrix may be interpolated onto a grid with greater resolution (e.g., 0.5 or 0.25 pixel grid).

Image shift parameters determined from the image correlation operation may be used when determining which image(s) from the match search set may be considered as a match to the given image. In some implementations, the given image may be shifted by amount determined from the image matching operation. By way of an illustration, image 2010 may be shifted to the right by amount depicted by arrow 2015 in FIG. 20A. The shifted image may be trimmed from the edge towards which the shift is performed (e.g., right edge of the image 2010 in FIG. 20A). The matching image (e.g., 2000 in FIG. 20A) may be trimmed on the left by the amount if the shift.

Figure 20B:
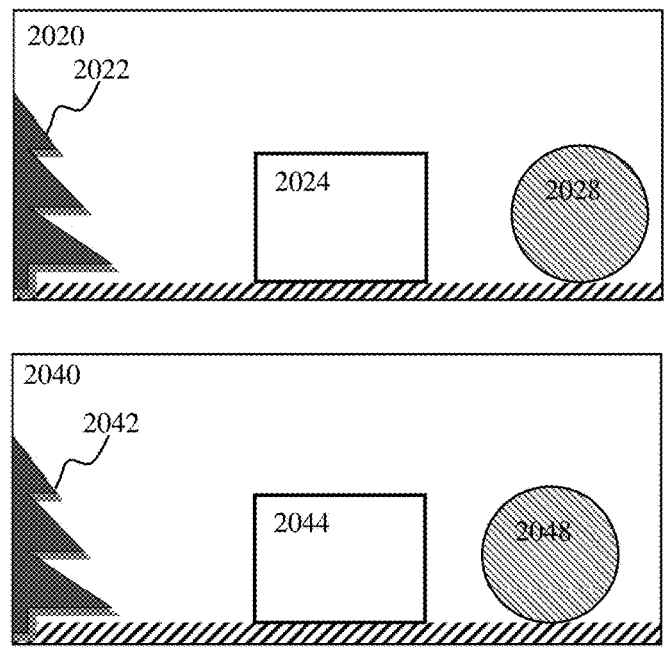
FIG. 20B illustrates using image shift and/or crop for determining image match, in accordance with one or more implementations.

FIG. 20B illustrates output of the shift and trim operation. Frame 2020 depicts the trimmed version of the image 2000; frame 2040 depicts the shifted and trimmed version of the image 2010 in FIG. 20A. It is noteworthy that matching images may not necessarily be identical to one another. Variability between matching images may exist. By way of an illustration, the ball 2018 in the image 2010 may be disposed closer to the rectangle 2014 relative the ball 2008 position in the image 2000. Accordingly, the shifted/ trimmed frames 2020, 2040 in FIG. 20B may comprise differences.

A similarity metric may be determined between the shifted/trimmed frames (e.g., 2020, 2040 in FIG. 20B). In some implementations, the similarity may be determined by performing pixel-wise difference between the overlapping regions (e.g., the frames 2020, 2040 in FIG. 20B) of the given image and the matching image. A norm of the image difference in the overlapping region may be determined for individual images from the matching search set. An image corresponding to the lowest norm may be referred to as the best match.

As the robot is following a learned path, it may expect to receive approximately the same camera images in the same order as seen during training. In practice, the robot may not be expected to instantaneously jump from one part of the path to another part. It may be useful to determine and take into account prior information about which sequence number(s) of the training buffer are the most likely to be selected as the best match. The assigned likelihood of a new camera image actually being taken from the same location as a particular image in the buffer of training images, may be related to how well the new image matches up with the stored image as well as how likely that location was in the first place according to the prior information, as shown and described with respect to FIG. 21.

In some implementations, history of the image matching process may be utilized in order to determine best match image. By way of an illustration, if a match search set image with the best match score (e.g., the lowest norm) belongs to the primary particle set than it may be selected as the best match. If the image with the best match score belongs to the secondary particle set than it may be selected based on an evaluation of image history parameter. In some implementations, image history parameter evaluation may be performed as follows:

(i) a running window average match score may be determined by averaging over last N images within individual particle sets. In some implementations, the averaging window size may be selected equal 3 for video images acquired at 40 ms intervals and vehicle navigation speeds between 0.1 and 2 m/s. Other window lengths (e.g., 4-20 images) may be utilized and/or configured in accordance with expected navigation speed and/or video acquisition rate;

(ii) the average match score for individual secondary particle sets may be compared to individual match scores from the match search set;

(iii) best match image from the secondary particle set may be selected if it has the best match score (e.g., lower norm) of individual match scores from the match search set and the window averaged match score is better (e.g., lower norm) compared to the window-averaged match score of the primary particle.

The primary and/or secondary particle sets may be discontinued (discarded). In some implementations, the discarding may be configured based on a comparison of the match score for a given particle with the match score for randomly selected images. If image match score for a given particle is worse than individual scores for the randomly selected images the given particle may be discontinued. The discontinued particle may be replaced with the random image associated with the highest score.

Figure 21:
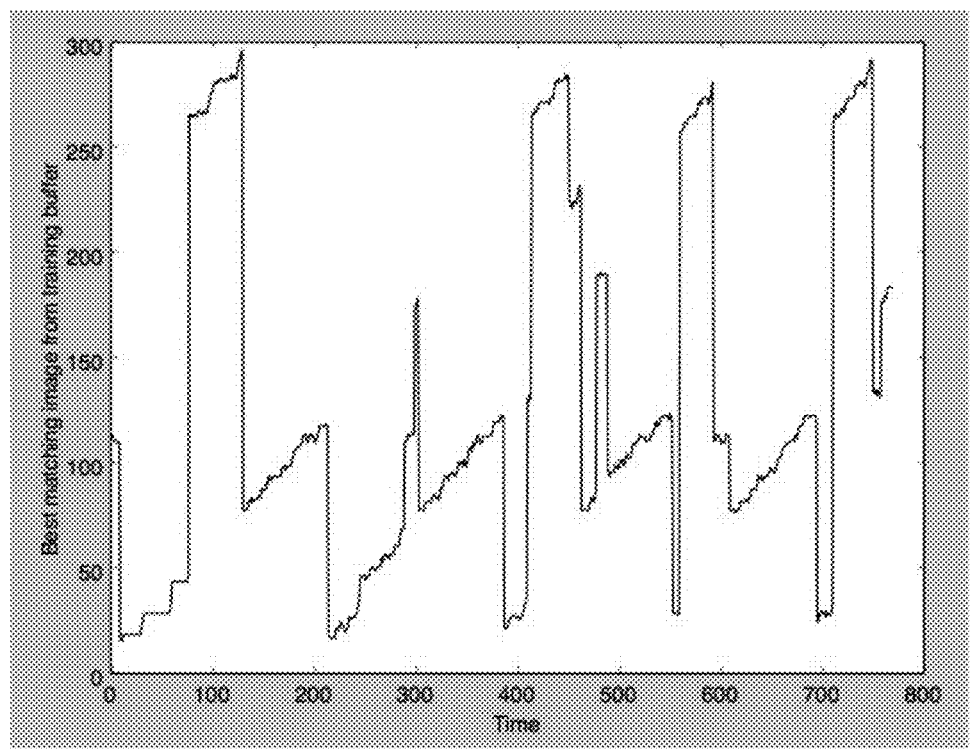
FIG. 21 is a plot presenting data illustrating output of image matching operation in accordance with one or more implementations.

FIG. 21 is a plot presenting data obtained by the initial Assignee of the instant application illustrating image matching obtained by assignee thereof during operation of an exemplary robotic vehicle. Horizontal axis denoted elapsed time during path navigation, vertical axis denoted best match image index determined from the training buffer. Training buffer corresponding to FIG. 21 comprises images obtained based on navigating a target trajectory by the vehicle three times.

Figure 22:
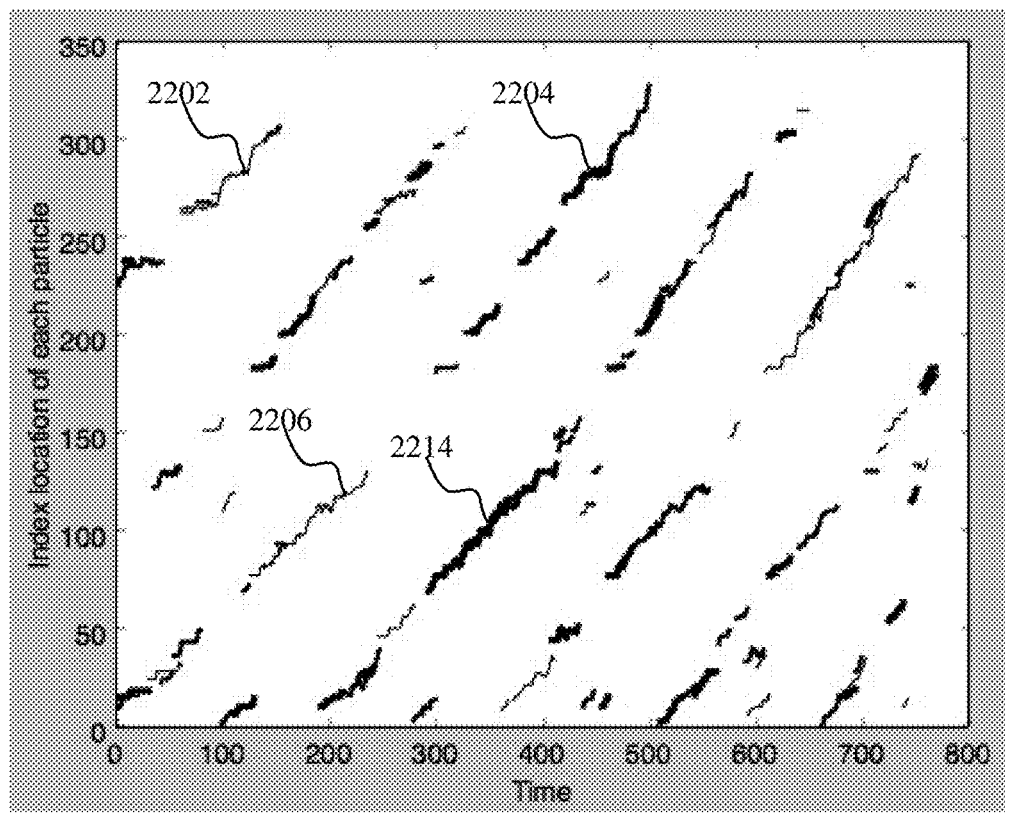
FIG. 22 is a plot presenting data related to the sequence number of the image from the training buffer chosen to be the most likely match as a function of time.
Figure 23:
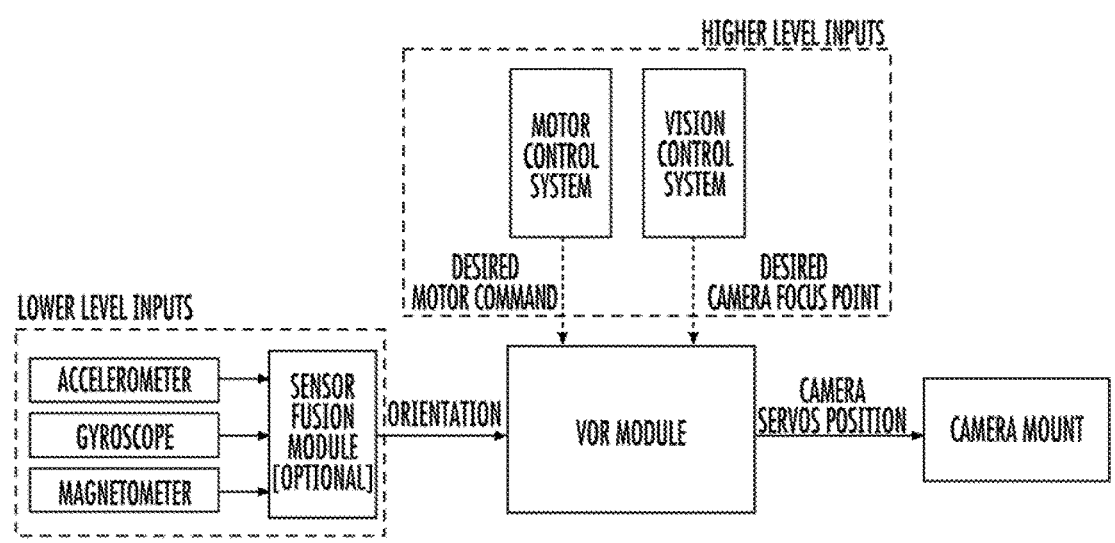
FIG. 23 is a functional block diagram illustrating VOR apparatus in accordance with one implementation.

FIG. 22 is a plot presenting data related to the sequence number of the best matched image from the training buffer selected using three particle sets. Segments denoted 2204, 2214, 2202, 2206 denote the primary and/or the secondary particle sets. The x-axis denotes the time step, and the y-axis is the sequence number of the image in the training buffer that the particle is pointing to. Particles with a lifetime of less than 10 steps are not shown in FIG. 22.

Using this method, the estimate that the vehicle is in a given location may be based on data associated with previous frames, as accrued by each particle. For example, assuming independent noise across frames, a more robust estimate of the error in position could be achieved by calculating the product of the likelihood that the sensor data came from a given particle over the recent frames. Likelihood may be approximated using an exponentiated energy model. Likelihood may be explicitly calculated with a parametric statistical model. Particle deletion may be implemented using a temporally decaying cumulative log probability that deletes a given particle when the probability is lower than a fixed threshold. Additional techniques in rejection sampling (e.g. similar to Metropolis-Hastings process) sampling may be used to define a threshold.

The best match image obtained using image match methodology (e.g., such as described herein) may be used to determine changes (corrections) to motor commands during path navigation by a robotic vehicle. By way of an illustration, if the best match image (e.g., 2000 in FIG. 20A) may appear to be shifted right relative the given image (e.g., 2010) this may correspond to vehicle heading adjustment by the controller to the left. If the shift 2015 is to the left, the heading may be adjusted to the right.

Exemplary implementations of the methodology described herein may be applicable to controlling trajectory of a robotic device due to (i) position mismatch (e.g., the robot being located physically to the left of a target location); and/or (ii) due to orientation mismatch (e.g., the robot being in the same physical location while oriented towards the left of the target trajectory). To illustrate, assuming the camera faces straight ahead, the center of the image may be the spot which the robot is headed towards. Thus, if this spot is to the left of the spot where the robot is supposed to be headed towards (as defined by the camera image seen during training), then the robot may need to adjust its heading rightwards.

During operation when the robot may follow a target trajectory the shift amount determined using the image matching process may be close to 0 (this configuration may be referred to as "the robot stays on track"). In some implementations the shift amount may be utilized as an error metric by the control process of the robot. The steering signal (which may be adjusted leftwards or rightwards) may be selected as the control variable for the process. A negative feedback loop may be used in order to reduce the error metric to (and/or maintain at) a target level operation of the robot. In some implementations, the target error level may comprise zero displacement.

A PID controller may be used in order to reduce/maintain the error metric during operation of the robot. In some implementations, motor commands at a given time step may be obtained by taking the stored motor commands from the training buffer that may correspond to the best matching stored image. Those motor commands may be combined with the output from the PID controller in order to stabilize operation of the robot.

Systems and methods for providing VOR for robots are disclosed herein, in accordance with one or more implementations. Exemplary implementations may provide VOR-like functionality for a robot. In some implementations, VOR for a robot may refer to the stabilization of the camera image while the robotic body is moving. In existing robotic platforms where the movement of the system might be subject to unexpected disturbances (e.g. quad copter, two-wheeled robot (e.g., a Segway-type configuration), and/or other robotic platforms), this stabilization may improve the quality of the camera signal. Exemplary implementations may, for example, reduce blurring associated with the motion of a camera. The cleaned camera image may be later used for various applications (e.g., recording of stable video footages, clean sensors data for better post processing, and/or other applications).

Image stabilization (IS) may include a family of techniques used to compensate for pan, tilt, and roll (e.g., angular movement, equivalent to yaw, pitch and roll) of the imaging device. That family of techniques may include one or more of optical image stabilization, digital image stabilization, stabilization filters, orthogonal transfer CCD, camera stabilizer, and/or other techniques.

In some implementations, a camera stabilizer may utilize a set gimbal device. According to some implementations, a gimbal may be a pivoted support that allows the rotation of an object about a single axis. A set of three gimbals mounted with orthogonal pivot axes may be used to allow an object mounted on the innermost gimbal to remain independent of the rotation of its support.

The system may use a physical camera stabilizer to solve the problem of stabilizing the camera mount, in some implementations. This approach may enable VOR-like functionality on a robot with low cost sensors (e.g., gyroscope, accelerometer, compass, and/or other sensors) and low cost actuators (e.g., open loop control system, no feedback from the servos, and/or other actuators). In comparison, existing systems typically either use a fairly complex and expensive mechanical system (e.g., a gimbal camera) and/or a computationally expensive software solution that are not adapted to small robots with embedded low-powered processing boards.

Exemplary implementations may be not computationally expensive and may provide one or more of the following properties: change the center of the visual field dynamically, compensate selectively for unexpected movements versus desired movements, dynamic activation and deactivation of the VOR-like functionality, compensate for sensory motor delays if couple with a predictive model, and/or other properties.

Some implementations may assume that the camera to be stabilized is mounted on a set of one, two, or three servos, wherein an individual servo is allowed to rotate the camera on one axis (e.g., pan, tilt, or roll). The combination of servos may provide up to three degree of freedom for the stabilization of the movement of the camera.

The figure below illustrates an exemplary architecture used to accomplish the VOR-like functionality stabilization of a camera image, in accordance with one or more implementations.

The VOR-like functionality module may integrate inputs from sensors (e.g., state of the system, blue box) and higher level signal (e.g., sensorimotor control systems, red box) to determine the correction and desired position of the camera to stabilize the image (e.g., camera servos position, right part of the diagram).

The state of the robot may be provided one or more sensors that provide the global orientation of the robot and/or a derivative of the global orientation in multiple axes. Some implementations may include one or more of a gyroscope, an accelerometer, a magnetometer, and/or other sensors. A gyroscope may include a device that measures orientation changes, based on the principles of angular momentum. Some implementations may utilize a three-axis gyroscope, which may provide the velocity of change in the three directions x, y, and z. An accelerometer may include an electromechanical device that measures acceleration forces. These forces may be static, like the constant force of gravity pulling at your feet, or they could be dynamic, caused by moving or vibrating the accelerometer. By measuring the amount of static acceleration due to gravity, the angle the device is tilted at with respect to the earth may be determined. A magnetometer may include a device that measures the direction of the magnetic field at a point in space. In some implementation, the system may include a three-axis magnetometer.

The higher level inputs may be provided by a sensorimotor control process, which may control the desired movement of the robot (e.g., output of the motor control system) and/or the desired focus point of the camera (e.g., output of the vision control system).

The motor control system may represent any process and/or devices configured to send a motor command to the robot. A motor command may, for example, be represented in a different space (e.g., a desired set point, a new desired linear and angular velocity for a wheeled robot, a torque command, and/or other representations). A motor control system may, for example, include one or more of a wireless joystick connected to the robot, a process that configured to follow a pre-defined path, a learning system, and/or other control mechanisms.

The vision control system may represent any process and/or device configured to update the focus point of the camera to be stabilized, and/or to switch on and off the VOR-like functionality module. In some implementations, a vision control system may include a handheld computing device (e.g., a tablet computer, a Smartphone, and/or other handheld device) where the user can tap on the screen displaying the camera stream the position where the camera image should be center, and/or an automatic tracker that follows an object of interest in the visual field.

Figure 24:
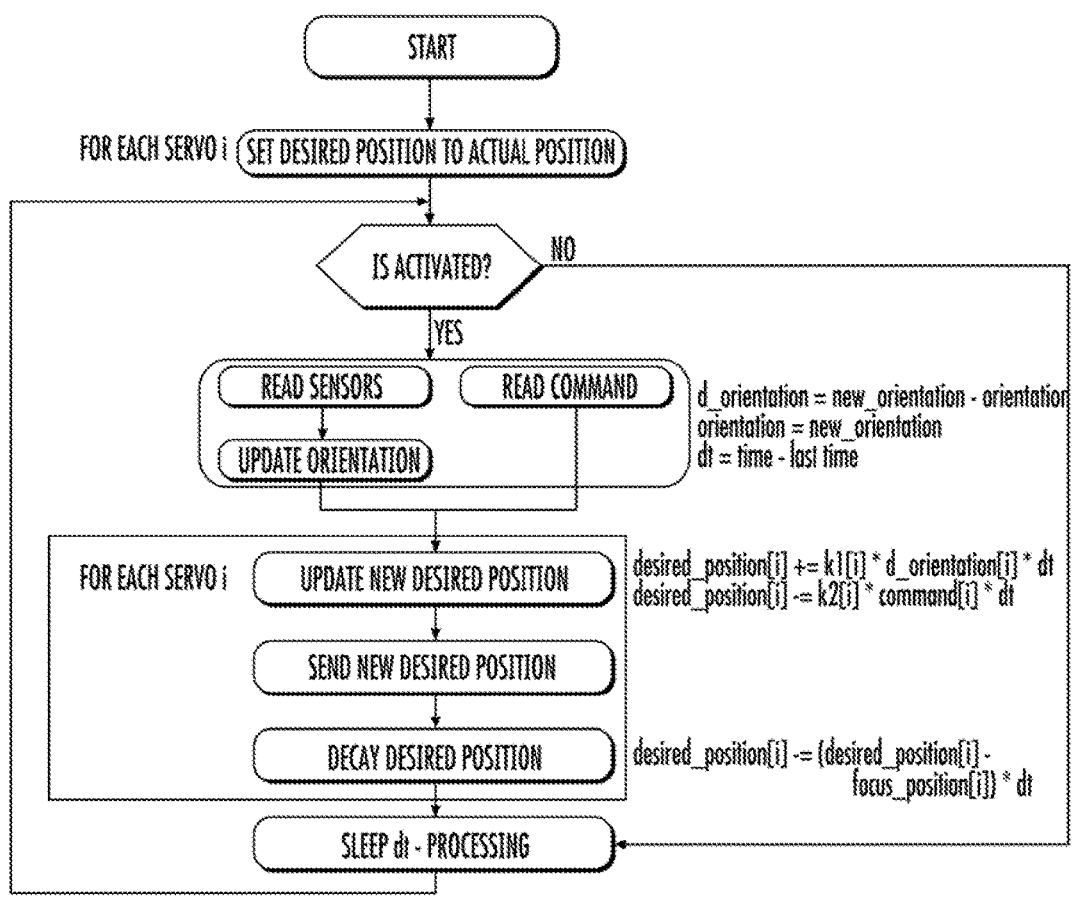
FIG. 24 presents a logical flow diagram describing operations of the VOR process, in accordance with one or more implementations.

At individual time steps, the VOR-like functionality module may receive the change of orientation since the last step, as well as the new motor commands. In this stage, the focus point may be assumed to be fixed and be set for each servo. FIG. 24 presents a logical flow diagram describing operations of the VOR process, in accordance with one or more implementations. Depending on the frequency and amplitude of movement, the VOR module may need to run at a high frequency (e.g., at 100 Hz and/or other frequencies).

In some implementations, the process may run in an infinite loop, and may exit the loop responsive to the main program of the robot being stopped. Before entering the loop, the desired position for individual servos may be set to the actual position of the servo. This may suggest that, in the absence of movement, the servo should not be moved.

If the VOR module is activated, new sensors values may be provided, a new orientation of the robot may be updated, and the change of orientation on dt may be determined, according to some implementations. The motor command may be sent to the robot and signals to the next module may be provided in order to update a new desired position.

The next stage of the VOR process may be to update the new desired position of individual servos. The desired position may account for (i) un-expected movement (such displacement should be compensated) versus (ii) desired movement where the VOR-like functionality should be counter-compensated. For a given servo i, this may be achieved by a twofold process, in some implementations. First, the desired position of the given servo may be added to or otherwise combined with the velocity of change for the particular axis multiplied by dt and a gain that is servo dependent (k1[i]). Second, the amplitude of the desired movement may be removed along individual axes multiplied by dt and a gain that is also servo dependent (k2[i]). Some implementations may assume knowledge of how a given motor command will affect the camera movement in each direction.

The new desired position may be provided to individual servos of the camera mount. The desired position may be decayed so that it slowly gets back to the focus point overtime. This may facilitate compensating over time drift due to error measurement stemming from noise in the sensors. The gain k1 and k2 may not have to be perfect, in some implementations.

In some implementations, k1 and/or k2 may not be a constant to achieve perfect compensation, but instead may exhibit a slow drift toward the focus point.

In some implementations, the focus point of the camera may change dynamically by another process using the VOR module. Some implementations may include coupling the VOR system with a tracker (e.g., OpenTLD, MIL, and/or other tracker) such that the image is stabilized on the object of interest. Some implementations may involve coupling the VOR system with a user interface to control camera position. Such an interface may be a physical interface (e.g., a head-mounted device such as an Oculus Rift) configured to allow the user moves his/her head to define the new position and get the feedback from the camera on the head screen. Some implementations may include coupling the VOR system with a vision control system, making sure that the robot will look to a direction perpendicular to the acceleration vector (in the horizon).

The focus position of the camera may be a variable that can be updated by the vision control system. In this case, in the absence of unexpected movement, the "decay desired position" module may cause the camera to drift to the new position.

Compensation for sensory-motor delays may be included in implementations of the system. Some implementations may include a predictive module configured to prevent sensorimotor delays and/or components of un-desired movement that can be predicted based on the input of other sensors (once it is integrated). For example, according to some implementations, if the system goes into an oscillatory behavior, most of the oscillation may be predicted and compensated once it kicks on.

In some implementations, information from the gyroscope may be utilized to compensate for movement. In some implementations, a sensor fusion process may be utilized to integrate that information and improve the compensation.

The sensor fusion module may obtain a measurement from one or more of an accelerometer, magnetometer, gyroscope, and/or other source. The sensor fusion module may integrate the measurement(s) using a sensor fusion process to give an accurate estimation of the orientation of the system in space. The following figure illustrates an exemplary sensor fusion process, in accordance with one or more implementations.

FIGS. 25A and 25B present exemplary code in the Python language that may be utilized with a two-wheeled, self-balancing, robotic platform (e.g., similar to a Segway-type configuration), compensating for pan and tilt, in accordance with one or more implementations.

Implementations of the principles of the disclosure may be applicable to a wide assortment of applications including computer-human interaction (e.g., recognition of gestures, voice, posture, face, and/or other interactions), controlling processes (e.g., processes associated with an industrial robot, autonomous and other vehicles, and/or other processes), augmented reality applications, access control (e.g., opening a door based on a gesture, opening an access way based on detection of an authorized person), detecting events (e.g., for visual surveillance or people or animal counting, tracking)

A video processing system of the disclosure may be implemented in a variety of ways such as, for example, a software library, an IP core configured for implementation in a programmable logic device(e.g., FPGA), an ASIC, a remote server, comprising a computer readable apparatus storing computer executable instructions configured to perform feature detection. Myriad other applications exist that will be recognized by those of ordinary skill given the present disclosure.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A method of determining a control signal for a robot, the method being performed by a special purpose computing platform having one or more processors executing instructions stored by a non-transitory computer-readable storage medium, the method comprising:

receiving first input features of a first type and second input features of a second type;

determining a subset of features by randomly selecting at least one of the first input features and at least one of the second input features;

comparing individual features of the subset to corresponding features of a plurality of training feature sets, individual ones of the plurality of training feature sets comprising a number of training features, the number being equal to or greater than a quantity of features within the subset of features;

based on the comparison, determining a similarity measure for a given training set of the plurality of training feature sets, the similarity measure characterizing a similarity between individual features of the subset and one or more features of the given training set;

responsive to the similarity measure breaching a threshold, selecting one or more training sets from the plurality of training feature sets;

determining one or more potential control signals for the robot, individual ones of the one or more potential control signals being associated with a corresponding training set of the plurality of training feature sets; and determining the control signal based on a transformation obtained from the one or more potential control signals;

wherein:

individual ones of the plurality of training feature sets comprise at least one feature of the first type and at least one feature of the second type;

the individual ones of the plurality of training feature sets are obtained during a training operation of the robot, the training operation being performed responsive to receiving a training signal from the robot; and individual ones of the one or more potential control signals are determined based on the training signal and the one or more features of the given training set.

2. The method of claim 1, wherein the similarity measure is determined based on a difference between values of individual features of the subset and one or more values of the one or more features of the given training set.

3. The method of claim 1, wherein the similarity measure is determined based on a distance metric between the individual features of the subset and the one or more features of the given training set.

4. The method of claim 3, wherein selecting one or more training sets comprises selecting a training set associated with a smallest distance metric.

5. The method of claim 3, wherein selecting one or more training sets comprises selecting N training sets associated with a lowest percentile of the distance metric, N being greater than two.

6. The method of claim 5, wherein the transformation comprises a statistical operation performed on individual ones of the one or more potential control signals associated with the selected N training sets.

7. The method of claim 6, wherein the statistical operation is selected from the group consisting of mean and percentile.

8. The method of claim 5, wherein the transformation comprises a weighted sum of a product of individual ones of the one or more potential control signals and a corresponding distance measure associated with the selected N training sets.

9. The method of claim 1, wherein:

the control signal is configured to cause the robot to execute the action;

the first input type comprises a digital image type comprising a plurality of pixel values; and the second input type comprises a binary indication type associated with the action being executed.

10. The method of claim 9, wherein:

the training comprises a plurality of iterations configured based on the training signal; and a given iteration is characterized by a control command and a performance measure associated with the action execution based on the control command.

11. The method of claim 9, wherein:

the plurality of pixels comprises at least 10 pixels; and the random selection is performed based on a random number generation operation.

12. A self-contained robotic apparatus, the apparatus comprising:

a platform comprising a motor;

a first sensor component configured to provide a signal configured to convey a video frame comprising a plurality of pixels;

a second sensor component configured to provide a binary sensor signal characterized by one of two states;

a memory component configured to store training sets, a given training set comprising an instance of the video frame, an instance of the binary sensor signal, and an instance of a motor control indication configured to cause the apparatus to execute an action; and one or more physical processors configured to operate a random k-nearest neighbors learning process to determine a motor control indication, the one or more physical processors configured to:

determine a subset of features comprising the binary sensor signal and a set of pixels randomly selected from the plurality of pixels;

scale individual pixels of the set of pixels by a scaling factor;

scale features of the subset of features by a scaling factor;

compare individual scaled features of the subset to corresponding features of individual ones of the training sets;

based on the comparison, determine a similarity measure for a given training set, the similarity measure characterizing a similarity between the individual scaled features of the subset and features of the given training set;

based on an evaluation of the similarity measure, select one or more of the training sets;

determine one or more potential control signals for the robot, individual ones of the one or more potential control signals being associated with a corresponding training set; and determine the control signal based on a transformation obtained from the one or more potential control signals;

wherein:

individual ones of the plurality of training feature sets comprise at least one feature of the first type and at least one feature of the second type;

individual ones of the plurality of training feature sets are obtained during training operation of the robot, the training operation being performed responsive to receiving a training signal from the robot; and individual ones of the one or more potential control signals are determined based on the training signal and the features of the given training set.

13. The apparatus of claim 12, wherein:

the one or more physical processors are configured to scale features by a multiplication of a first input by the scaling factor; and the scaling factor is determined based on a number of pixels in the subset.

14. The apparatus of claim 13, wherein the scaling factor is determined based on a ratio of a range of pixel values to a range of the binary values.

15. The apparatus of claim 12, wherein:

the action comprises target-approach-obstacle-avoidance; and the one or more physical processors are configured to scale features based on a size of an obstacle or an object as the obstacle or object appears in the video frame.

16. The apparatus of claim 12, wherein the one or more physical processors are configured to scale features by specific pixels.

17. A non-transitory computer-readable storage medium having instructions embodied thereon, the instructions being executable by a processor to selecting an outcome of a plurality of outcomes by at least:
- determine a history of sensory input;
- apply a transformation to an instance of the sensory input, the transformation being configured to produce a scaled input based on an analysis of the history;
- determine a set of features comprising features of a first type randomly selected from the scaled input and at least one feature of a second type;
- compare individual features of the set of features to corresponding features of a plurality of training feature sets, individual ones of the plurality of training feature sets comprising a number of training features, the number being equal to or greater than the quantity of features within the set of features;
- based on the comparison, determine a similarity measure for a given training set of the plurality of training feature sets, the similarity measure characterizing a similarity between features of a subset and features of the given training set;
- responsive to the similarity measure breaching a threshold, select one or more training sets from the plurality of training sets;
- determine one or more potential control signals for the robot, individual ones of the one or more potential control signals being associated with a corresponding training set of the plurality of training sets; and
- determine the control signal based on a transformation obtained from the one or more potential control signals;

wherein:
- individual ones of the plurality of training feature sets comprise at least one feature of the first type and at least one feature of the second type;
- individual ones of the plurality of training feature sets are obtained during training operation of the robot, the training operation being performed responsive to receiving a training signal from the robot; and
- individual ones of the one or more potential control signals being determined based on the training signal and the features of the given training set.

18. The storage medium of claim 17, wherein:
the analysis of the history comprises a determination of a feature mean and a feature standard deviation; and
the transformation comprises subtracting the feature mean and dividing the outcome by the feature standard deviation.

19. The storage medium of claim 17, wherein:
the set of features comprises a plurality of set features, individual ones of the set features characterized by a pointer; and
the feature mean and the feature standard deviation is configured for a respective pointer.

20. The storage medium of claim 19, wherein:
the features of the first type comprise a matrix of values;
the pointer identifies a value within the matrix; and
the feature mean and the feature standard deviation are configured for a given location within the matrix.

* * * * *